(12) United States Patent
Miyamoto et al.

(10) Patent No.: US 8,902,200 B2
(45) Date of Patent: Dec. 2, 2014

(54) TOUCH PANEL SYSTEM AND ELECTRONIC DEVICE

(75) Inventors: Masayuki Miyamoto, Osaka (JP); Shinichi Yoshida, Osaka (JP); Akira Nishioka, Osaka (JP); Manabu Yumoto, Osaka (JP); Kengo Takahama, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 130 days.

(21) Appl. No.: 13/589,257

(22) Filed: Aug. 20, 2012

(65) Prior Publication Data

US 2013/0321343 A1    Dec. 5, 2013

Related U.S. Application Data

(60) Provisional application No. 61/653,200, filed on May 30, 2012.

(51) Int. Cl.
*G06F 3/042*    (2006.01)

(52) U.S. Cl.
USPC .......................................................... 345/175

(58) Field of Classification Search
CPC ...................................................... G06F 3/042
USPC .......................................................... 345/175
See application file for complete search history.

(56) References Cited

U.S. PATENT DOCUMENTS

| 5,923,320 A | 7/1999 | Murakami et al. |
| 2011/0148785 A1 | 6/2011 | Oda et al. |

FOREIGN PATENT DOCUMENTS

| JP | 8-106358 A | 4/1996 |
| JP | 2001-125744 A | 5/2001 |
| JP | 2011-128982 A | 6/2011 |

*Primary Examiner* — William Boddie
*Assistant Examiner* — Towfiq Elahi
(74) *Attorney, Agent, or Firm* — Birch, Stewart, Kolasch & Birch, LLP

(57) ABSTRACT

A touch panel system includes a touch panel having sense lines, and drive lines which intersect the sense lines and form capacitance with the sense lines, a touch panel controller for processing signals of the sense lines, and a drive line driving circuit for driving the drive lines in parallel. The touch panel controller includes a subtracting section for finding differences in signals between the sense lines adjacent to each other, a decoding section for calculating a distribution of differences between the capacitances by calculating an inner product of code sequences for driving the drive lines in parallel and difference output sequences which correspond to the code sequences, a touch detecting section for obtaining touch information based on the distribution of differences between the capacitances calculated by the decoding section, and a region setting section for setting an effective region in the touch panel based on the touch information.

32 Claims, 49 Drawing Sheets

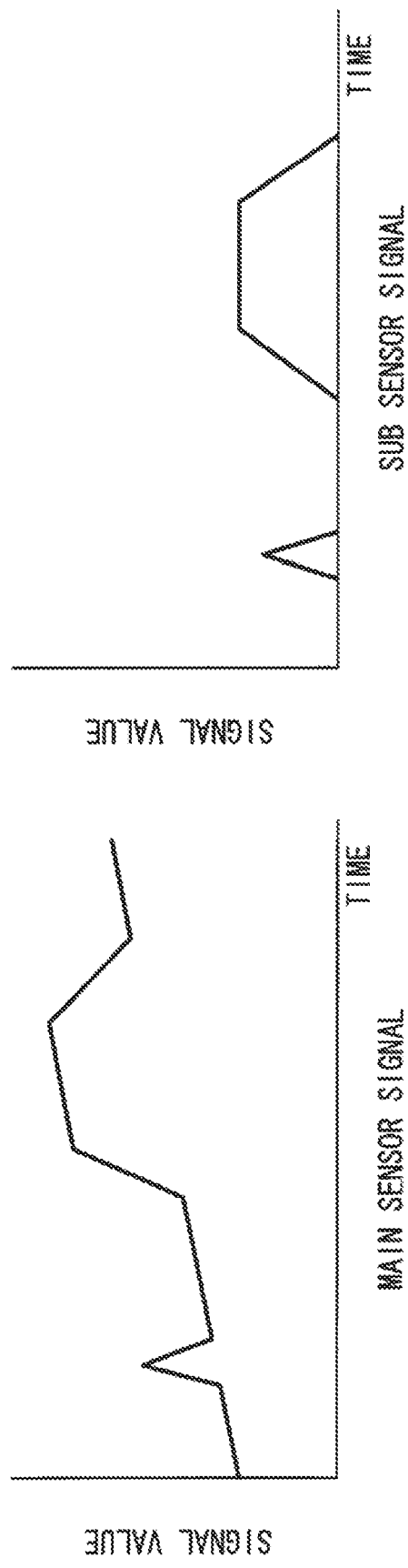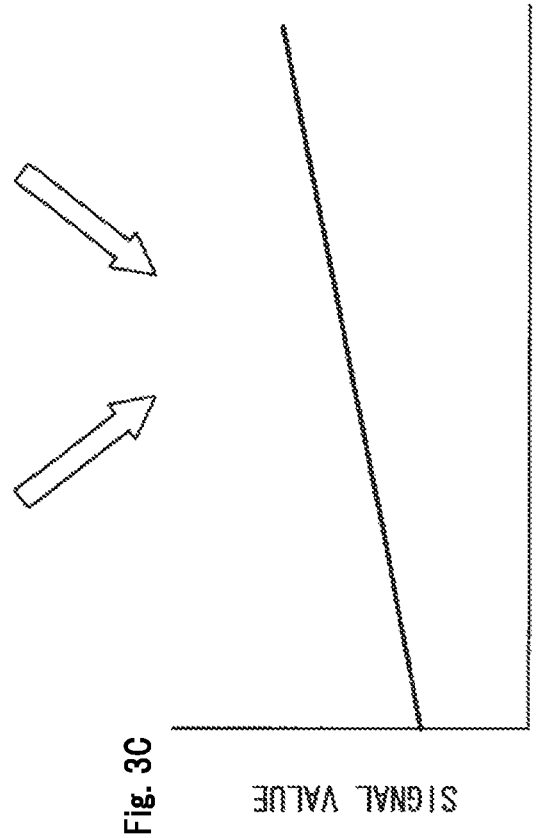

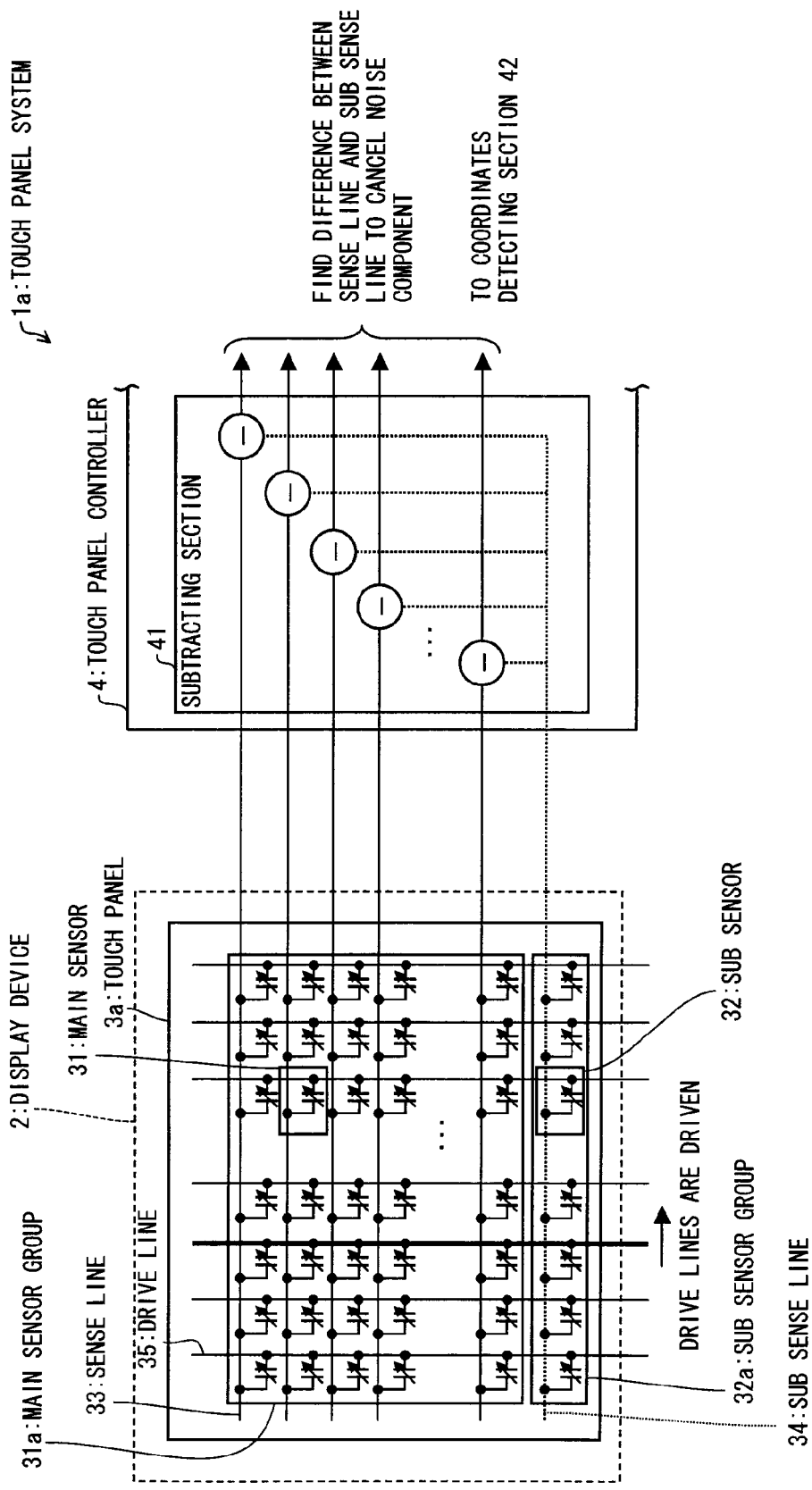

FIG. 28A

|    | S1 | S2 | S3 | S4 | S5 | S6 | S7 |
|----|----|----|----|----|----|----|----|
| D1 | 0  | +  | −  | 0  | 0  | 0  | 0  |
| D2 | 0  | 0  | 0  | +  | 0  | −  | 0  |
| D3 | 0  | 0  | +  | −  | 0  | 0  | 0  |
| D4 | −  | 0  | 0  | 0  | +  | +  | 0  |
| D5 | 0  | −  | 0  | 0  | 0  | +  | 0  |

FIG. 28B

|    | S1 | S2 | S3 | S4 | S5 | S6 | S7 |
|----|----|----|----|----|----|----|----|
| D1 | 0  | 1  | 1  | 0  | 0  | 0  | 0  |
| D2 | 0  | 0  | 0  | 1  | 1  | 1  | 0  |
| D3 | 0  | 0  | 1  | 1  | 0  | 0  | 0  |
| D4 | 1  | 0  | 0  | 0  | 1  | 1  | 1  |
| D5 | 1  | 1  | 0  | 0  | 0  | 1  | 1  |

FIG. 28C

|    | S1 | S2 | S3 | S4 | S5 | S6 | S7 |
|----|----|----|----|----|----|----|----|
| D1 | 0  | 1  | 1  | 0  | 0  | 0  | 0  |
| D2 | 0  | 0  | 0  | 1  | 1  | 1  | 0  |
| D3 | 0  | 0  | 1  | 1  | 0  | 0  | 0  |
| D4 | 1  | 0  | 0  | 0  | 1  | 1  | 1  |
| D5 | 1  | 1  | 0  | 0  | 0  | 1  | 1  |

TOUCH PANEL SYSTEM AND ELECTRONIC DEVICE

CROSS REFERENCE TO RELATED APPLICATION

This Nonprovisional application claims the benefit of U.S. Provisional Patent Application No. 61/653,200, filed on May 30, 2012 the entire contents of which are hereby incorporated by reference.

BACKGROUND OF THE INVENTION

1. Field of the Invention

The present invention relates to a touch panel system and an electronic device including the touch panel system. Particularly, the present invention relates to a touch panel system and an electronic device each of which is capable of reliably and effectively removing (canceling) a noise generated by a display device, etc.

2. Description of the Related Art

Recently, introduction of touch panel systems to various kinds of electronic devices has been growing rapidly. For example, the touch panel systems are introduced to portable information devices such as smartphones and automatic vending machines such as automatic ticket machines.

The touch panel system is typically configured to include (i) a display device and (ii) a touch panel stacked on an upper side (front surface) of the display device. Therefore, a sensor provided on the touch panel is likely to be affected not only by a noise such as a clock generated in the display device but also by other noises coming from the outside. Such the noises lead to impairment in detection sensitivity for a touch operation.

Japanese Unexamined Patent Application Publication No. 2001-125744 (published on May 11, 2001, and referred to as a "publicly known document 1" hereinafter) describes a touch panel system (coordinates input device) including a countermeasure against such noises. The touch panel system of the publicly known document 1 includes a noise processing section for removing a noise. FIG. 19 is a block diagram illustrating a noise processing section 100 included in the touch panel system of the publicly known document 1. As shown in FIG. 19, the noise processing section 100 includes a filter section 101, a logical inversion section 102, and an adding section 103. The filter section 101 receives an output signal (analog signal) from a sensor provided in a touch panel (not illustrated). The filter section 101 extracts, as a noise signal, an AC signal component included in the input signal. The logical inversion section 102 inverts by 180° the phase of the noise signal thus extracted. The adding section 103 adds, to the input signal which is supplied to the filter section 101 and which includes the noise signal, the noise signal whose phase has been inverted by 180°.

Thus, according to the touch panel system of the publicly known document 1, the noise signal extracted by the filter section 101 is inverted, and the signal thus inverted is added to the input signal (analog signal) supplied from the sensor. Namely, to the noise component included in the input signal supplied from the sensor, such a signal is added which has the same level as the noise component and whose phase has been inverted. This cancels the noise superimposed on the input signal supplied from the sensor. This makes it possible to reduce effects given by the noise included in the input signal supplied from the sensor.

However, the touch panel system of the publicly known document 1 has a problem of being incapable of removing noises other than an AC signal component.

Specifically, as described above, with respect to an input signal supplied from the sensor, the touch panel system of the publicly known document 1 regards as a noise an AC signal component included in the input signal. The filter section 101 extracts the AC signal, and thereafter the logical inversion section 102 inverts the phase of the AC signal by 180°. Further, the adding section 103 adds the inverted signal to the input signal which includes the AC signal component. Thus, for the noise processing according to the publicly known document 1, the process performed by the filter section 101 for extracting the AC signal component is the most important.

However, the publicly known document 1 fails to disclose details of the configuration of the filter section 101. Therefore, it is unknown how much noise the touch panel system of the publicly known document 1 can remove. Furthermore, the publicly known document 1 regards as a noise an AC signal component included in an analog signal. Namely, the touch panel system of the publicly known document 1 basically assumes removal of an impulse noise only, and does not assume, as the subject of removal, noises other than the impulse noise. Therefore, the touch panel system of the publicly known document 1 cannot reliably cancel a wide variety of noises other than the impulse noise.

Furthermore, it is desired to reduce power consumption and enhance detection sensitivity in a touch panel system.

SUMMARY OF THE INVENTION

The present invention was made in view of the foregoing problem of the conventional technique, and an object of the present invention is to provide a touch panel system and an electronic device each of which is capable of reliably removing a wide variety of noises, reducing power consumption and enhancing detection sensitivity for a touch operation.

In order to attain the foregoing object, a touch panel system of the present invention includes: a touch panel including a plurality of sense lines, and a plurality of drive lines provided so as to intersect the sense lines and form capacitances with the sense lines; a drive line driving circuit for driving the drive lines in parallel; a touch panel controller for processing signals of the sense lines and generating touch information; and a region setting section for setting an effective region in the touch panel based on the touch information, wherein the touch panel controller includes: a subtracting section for finding differences in signals between respective pairs of the sense lines adjacent to each other; a decoding section for calculating a distribution of differences between the capacitances by calculating an inner product of (i) each of code sequences for driving the drive lines in parallel and (ii) each of difference output sequences which difference output sequences are calculated by the subtracting section and correspond to the code sequences; and a touch detecting section for generating the touch information based on the distribution of differences between the capacitances which is calculated by the decoding section, the region setting section updates the effective region set in the touch panel to set a new effective region based on the touch information, and there is carried out at least one of: a first operation in which the drive line driving circuit selectively drives the drive line passing through the effective region set currently; and a second operation in which the touch panel controller selectively processes the signal of the sense line passing through the effective region set currently.

According to the above configuration, the subtracting section obtains differences in signal values between the respective pairs of the sense lines adjacent to each other. Namely, each difference is found between the adjacent sense lines, which have a higher correlation in terms of noise. This removes a noise component from the output signal supplied from the sense lines, thereby extracting a signal derived from the touch operation itself. This makes it possible to reliably remove (cancel) a wide variety of noises reflected in the touch panel. Further, according to the above configuration, the touch panel is parallel driven, and the decoding section decodes the values of the differences between the capacitances which values are found by the subtracting section. Consequently, signals of the capacitances are multiplied by a code length (i.e., multiplied by N). Therefore, signal strengths of the capacitances are increased, regardless of the number of drive lines. Further, provided that necessary signal strengths are merely equal to those of the conventional method, it is possible to reduce the number of times that the drive lines should be driven. This makes it possible to reduce power consumption.

Furthermore, according to the above configuration, it is possible to prevent the drive lines from being uselessly driven by performing the first operation. Therefore, it is possible to reduce the power consumption taken for the driving operation of the drive lines, and furthermore, to suppress an occurrence of a noise, resulting in an enhancement in detection sensitivity for a touch operation. In addition, by driving the drive lines restrictively, it is possible to enhance detection accuracy of a touched position. Furthermore, it is possible to prevent the useless processing for signals by performing the second operation. Therefore, it is possible to reduce the power consumption taken for the processing for signals. In addition, by restrictively processing the signal of the sense line passing through the effective region, it is possible to enhance the detection accuracy of the touched position.

The touch panel system of the present invention may further include a switch for switching the signals of the sense lines inputted to the subtracting section so that the subtracting section finds a first difference in signals between a sense line Sn and a sense line Sn+1 or a second difference in signals between the sense line Sn and a sense line Sn−1, the first difference is expressed by (Sn+1)−Sn, the second difference is expressed by Sn−(Sn−1), the sense line Sn is selected from the plurality of sense lines, and the sense line Sn+1 and the sense line Sn−1 are two sense lines adjacent to the sense line Sn.

In the touch panel system of the present invention, the switch includes two terminals and is arranged such that one of the two terminals is selected, the code sequences for driving the drive lines in parallel are the following code sequences (a component is 1 or −1) for driving the first drive line through the Mth drive line in parallel, $$d_1 = (d_{11}, d_{12}, \ldots, d_{1N})$$
$$d_2 = (d_{21}, d_{22}, \ldots, d_{2N})$$
$$\vdots$$
$$d_M = (d_{M1}, d_{M2}, \ldots, d_{MN}),$$

the difference output sequences "$S_{j,P}$ (j=1, ..., [L/2], P=1,2) (L indicates the number of sense lines, [n]=an integer part of n)" which difference output sequences correspond to the code sequences, are defined as follows, $S_{j,1}$: an output sequence for $d_1$ through dm when the switch selects one of the two terminals $S_{j,2}$: an output sequence for $d_1$ through dm when the switch selects the other one of the two terminals, and the decoding section may calculate an inner product of (i) each of the code sequences for driving the drive lines in parallel and (ii) each of the difference output sequences, which difference output sequences correspond to the code sequences.

In the touch panel system of the present invention, the subtracting section may include a first analog-to-digital converting section for converting analog signals into digital signals, and find the first difference and the second difference by converting analog signals supplied from the sense lines into digital signals through the first analog-to-digital converting section, and thereafter finding differences between the digital signals.

According to the above configuration, it is possible to remove a noise by converting, into digital signals, analog signals outputted by the touch panel and thereafter performing subtracting operations.

In the touch panel system of the present invention, the subtracting section may include a second analog-to-digital converting section for converting analog signals into digital signals, and find the first difference and the second difference by finding differences between analog signals supplied from the sense lines and thereafter converting the differences between the analog signals into digital signals though the second analog-to-digital converting section.

According to the above configuration, it is possible to remove a noise by performing subtracting operations on analog signals outputted by the touch panel, without converting the analog signals into digital signals, and thereafter converting the resulting signal into a digital signal.

In the touch panel system of the present invention, the subtracting section includes a total differential amplifier for finding the first difference and the second difference by finding the differences between the analog signals supplied from the respective pairs of the sense lines adjacent to each other.

According to the above configuration, it is possible to remove a noise by performing subtracting operations on analog signals outputted by the touch panel, without converting the analog signals into digital signals, by use of the total differential amplifier, and thereafter converting the resulting signal into a digital signal.

The touch panel system of the present invention may further comprises a non-touch operation information storage section for storing a first distribution of differences between the capacitances which first distribution is calculated by the decoding section when no touch operation is performed, and a calibration section for subtracting (i) the first distribution stored in the non-touch operation information storage section from (ii) a second distribution of differences between the capacitances which second distribution is calculated by the decoding section when a touch operation is performed.

According to the above configuration, the non-touch operation information storage section stores a distribution of differences between the capacitances which is obtained as a result of the decoding process by the decoding section when no touch operation is performed. The calibration section subtracts (i) the distribution of differences between the capacitances stored in the non-touch operation information storage section from (ii) a distribution of differences between the capacitances calculated when a touch operation is performed. That is, the calibration section performs the subtracting operation of (the distribution of differences between the capacitances calculated when a touch operation is performed)−(the distribution of differences between the capacitances calculated when no touch operation is performed). This makes it possible to cancel an offset inherent in the touch panel.

In the touch panel system of the present invention, the touch detecting section may determine the presence or absence of a touch operation based on a comparison of (i) the differences in signals between the respective pairs of the sense lines adjacent to each other which differences are found by the subtracting section and (ii) positive and negative threshold values.

According to the above configuration, based on a difference between signals of sense lines adjacent to each other from which difference a noise signal has been removed, the touch detecting section determines the presence or absence of a touch operation. This makes it possible to accurately determine the presence or absence of the touch operation.

In the touch panel system of the present invention, the touch detecting section may create, based on the comparison of (i) the differences in signals between the respective pairs of the sense lines adjacent to each other which differences are found by the subtracting section and (ii) the positive and negative threshold values, an increase and decrease table which indicates, in ternary, a distribution of differences between the capacitances, and the touch detecting section may convert the increase and decrease table into a binary image, so as to generate the touch information.

According to the above configuration, a difference between signals of sense lines adjacent to each other from which difference a noise signal has been removed is inputted to the touch detecting section. The touch detecting section creates an increase and decrease table which indicates, in ternary, the distribution of differences between the signals of the sense lines by comparing (i) the difference between the signals of the sense lines adjacent to each other with (ii) the positive and negative threshold values stored in the touch detecting section. Furthermore, the touch detecting section binarizes the increase and decrease table, so that the increase and decrease table is converted into the binary image. Consequently, the candidates of the touched position are extracted to the binary image thus converted. Thus, by recognizing the touch information (the touch size, the touched position, etc.) based on the binary image, it is possible not only to determine the presence or absence of the touch operation but also to recognize the touch information more accurately.

It is preferable that the touch panel system of the present invention further comprises an adding section for adding up the differences found by the subtracting section, the touch panel includes at least one sub sense line, the subtracting section further finds a third difference in signals between the sub sense line and the sense line adjacent to the sub sense line, and the adding section adds up the first difference, the second difference, and the third difference.

According to the above configuration, the sense line and the sub sense line are provided in (on) the same surface of the touch panel. Consequently, each of (i) an output signal supplied from the sense line and (ii) an output signal supplied from the sub sense line includes various kinds of noise signals reflected in the touch panel. Furthermore, the subtracting section finds a difference between (i) the output signal supplied from the sense line which signal includes a signal derived from a touch operation and a noise signal and (ii) the output signal supplied from the sub sense line which signal includes a noise signal. This removes the noise component from the output signal supplied from the sense line, thereby extracting the signal derived from the touch operation itself. Therefore, it is possible to reliably remove (cancel) a wide variety of noises reflected in the touch panel. Furthermore, the signal (noise signal) of the sub sense line is also removed from the output signal of each sense line. Therefore, it is possible to more reliably remove noises.

Furthermore, according to the above configuration, the sense line and the sub sense line are adjacent to each other, that is, they are arranged closely to the utmost extent, so that they are arranged in almost the same condition. For this reason, it can be considered that the noise signal value included in the output signal of the sub sense line is the same as that included in the output signal of the sense line. Consequently, it is possible to more reliably remove noise components reflected in the touch panel through the subtracting operation by the subtracting section. Therefore, the detection sensitivity for the touch operation can be more enhanced.

In the touch panel system of the present invention, the subtracting section may include a third analog-to-digital converting section for converting analog signals into digital signals. The subtracting section may convert, into digital signals, analog signals supplied from the sense lines or the sub sense line through the third analog-to-digital converting section, and thereafter find differences between the digital signals, so as to find the first difference, the second difference, and the third difference.

According to the above configuration, it is possible to remove a noise by (i) converting analog signals outputted by the touch panel into a digital signal, and thereafter (ii) performing subtracting operations on the digital signal.

In the touch panel system of the present invention, the subtracting section may include a fourth analog-to-digital converting section for converting analog signals into digital signals. The subtracting section may find differences between analog signals supplied from the sense lines or the sub sense line, and thereafter convert the differences between the analog signals into digital signals through the fourth analog-to-digital converting section, so as to find the first difference, the second difference, and the third difference.

According to the above configuration, it is possible to remove a noise by (i) performing subtracting operations on analog signals outputted by the touch panel, without converting the analog signals into digital signals, and thereafter (ii) converting the resulting signal into a digital signal.

It is preferable that, in the touch panel system of the present invention, the subtracting section further includes a total differential amplifier for finding the first difference, the second difference, and the third difference by finding differences between analog signals supplied from the sense lines or the sub sense line.

According to the above configuration, it is possible to remove a noise by (i) performing subtracting operations on analog signals outputted by the touch panel, without converting the analog signals into digital signals, by use of the total differential amplifier, and thereafter (ii) converting the resulting signal into a digital signal.

It is preferable that, in the touch panel system of the present invention, the total differential amplifier has an input common-mode voltage range which is rail to rail.

According to the above configuration, the total differential amplifier capable of rail-to-rail operation is provided. The total differential amplifier can operate in a voltage range from a power source voltage (Vdd) to GND. Therefore, an output signal from the total differential amplifier is free from the problem of output saturation.

In the touch panel system of the present invention, the adding section may add the first difference, the second difference, and the third difference in such a manner that individual adding operations are carried out in the order of increasing distance between a sense line involved in a certain adding operation and the sub-sense line, and the adding section may use a result of one adding operation in a next adding operation.

According to the above configuration, the adding section carries out individual adding operations in the order of increasing distance between a sense line involved in a certain adding operation and the sub-sense line while using the result of each adding operation. Therefore, it is possible to speed up the adding operations.

In the touch panel system of the present invention, the sub sense line may be configured not to detect a touch operation performed with respect to the touch panel.

According to the above configuration, a signal derived from a touch operation is not detected on the sub sense line. Therefore, an output signal supplied from the sub sense line does not include the signal derived from the touch operation. This prevents a case where the signal value derived from the touch operation is reduced by the subtracting operation performed by the subtracting section. Namely, the noise component is removed without reducing the signal derived from the touch operation which signal is detected on the sense line. Therefore, it is possible to further enhance detection sensitivity for a touch operation.

In the touch panel system of the present invention, the sub sense line may be provided in a region of the touch panel in which region no touch operation is performed.

According to the above configuration, the sub sense line is provided so as to avoid the region (touched region) in which region a touch operation is performed by the user. In such a configuration, on the sub sense line, the user would not perform a touch operation. Accordingly, although the sub sense line detects a noise reflected in the touch panel, the sub sense line does not detect the signal derived from the touch operation. Thus, it is possible to reliably prevent the sub sense line from detecting a touch operation.

Namely, according to the above configuration, the sub sense line does not detect a signal derived from a touch operation. Therefore, an output signal supplied from the sub sense line does not include the signal derived from the touch operation. This prevents a case where the signal value derived from the touch operation is reduced by the subtracting operation performed by the subtracting section. Namely, the noise component is removed without reducing the signal derived from the touch operation which signal is detected by the sense line. Therefore, it is possible to further enhance detection sensitivity for a touch operation.

It is preferable that, in the touch panel system of the present invention, the drive line driving circuit applies peculiar code sequences, each of which is set for each of the drive lines, to each of the drive lines passing through the effective region, and does not apply the code sequences to each of the drive lines not passing through the effective region.

According to the above configuration, the touch panel controller can easily identify a fluctuation in the signal of the sense line which fluctuation is generated due to the touch operation.

It is preferable that, in the touch panel system of the present invention, the touch panel controller further includes an amplifying section for selectively amplifying the signal of the sense line passing through the effective region.

According to the above configuration, it is possible to prevent the useless amplification of the signal of the sense line. Therefore, it is possible to reduce the power consumption taken for the amplification of the signal of the sense line.

It is preferable that, in the touch panel system of the present invention, the touch panel controller further includes a signal acquiring section for selectively acquiring the signal of the sense line passing through the effective region and outputting the signal in a time division According to the above configuration, it is possible to prevent a useless signal from being outputted to a subsequent stage of the signal acquiring section. Therefore, it is possible to reduce power consumption taken for a processing in the subsequent stage of the signal acquiring section.

It is preferable that, in the touch panel system of the present invention, the region setting section sets a new effective region including a touched position which is a part of the touch information.

According to the above configuration, the region setting section can set a new effective region having a high possibility that a touched position is subsequently included.

It is preferable that, in the touch panel system of the present invention, the region setting section sets a new effective region having a size corresponding to a moving speed of a touched position which is a part of the touch information.

According to the above configuration, the region setting section can set a new effective region having a high possibility that a touched position is subsequently included.

It is preferable that, in the touch panel system of the present invention, the region setting section sets a new effective region which is the whole surface of the touch panel when the touch panel controller does not detect any touch operation.

According to the above configuration, no matter where the subsequent touched position is on the touch panel, the touch panel controller can detect the touched position.

In the touch panel system of the present invention, the region setting section may set a new effective region based on a touched position which is a part of the touch information when a first mode is selected, and the region setting section may continuously set a new effective region which is the whole surface of the touch panel when a second mode is selected.

According to the above configuration, for example, it is possible to operate the touch panel system in either the first mode for reducing power consumption and enhancing detection sensitivity or the second mode for detecting the touched position without omission from the whole surface of the touch panel, depending on an installation environment, a usage environment or the like for the touch panel system.

It is preferable that, in the touch panel system of the present invention, when the touch information includes a plurality of touched positions, the region setting section sets a new effective region based on the plurality of touched positions.

According to the above configuration, also when the touch panel controller detects a plurality of touched positions (in a multi-touch), the region setting section can set the effective region.

It is preferable that, in the touch panel system of the present invention, when setting the new effective region based on the plurality of touched positions, the region setting section sets a plurality of new effective regions corresponding to the touched positions, respectively.

According to the above configuration, it is possible to provide a clearance (a region which is not the effective region) between the respective effective regions set by the region setting section. Therefore, it is possible to decrease a total area of the effective regions set by the region setting section.

It is preferable that, in the touch panel system of the present invention, an upper limit is set to the number of the new effective regions set by the region setting section.

According to the above configuration, the number of the effective regions that the region setting section can set is restricted to be equal to or smaller than the upper limit. Therefore, it is possible to prevent an amount of a calculation of the region setting section from being excessively large or an excessive increase in the total area of the effective regions set by the region setting section.

It is preferable that, in the touch panel system of the present invention, the region setting section sets the new effective region which is the whole surface of the touch panel at every predetermined timing.

According to the above configuration, even if the touch operation is performed in another place on the touch panel after the region setting section starts the operation (spot driving) for sequentially setting the effective region depending on the touched position detected sequentially by the touch panel controller, the effective region which is the whole surface of the touch panel is set in a predetermined timing. Therefore, the touch panel controller can detect the touched position.

In the touch panel system of the present invention, the code sequences may be orthogonal sequences or M sequences.

It is preferable that the touch panel system of the present invention further comprises a display device, and the touch panel is provided on a front surface of the display device.

According to the above configuration, since the touch panel is provided on the front surface of the display device, it is possible to reliably remove a noise generated in the display device.

It is preferable that, in the touch panel system of the present invention, the display device is a liquid crystal display, a plasma display, an organic electroluminescence display, or a field emission display.

According to the above configuration, the display device is provided with various kinds of displays used in many generally-used electronic devices. Therefore, it is possible to provide a touch panel system having a great versatility.

In order to attain the foregoing object, an electronic device of the present invention includes any of the touch panel systems above described.

Therefore, it is possible to provide an electronic device which can reliably remove (cancel) a wide variety of noises reflected in a touch panel.

As described above, the touch panel system of the present invention includes a subtracting section which finds differences in signals between respective pairs of sense lines adjacent to each other. Namely, the subtracting section obtains a difference in signal values between the adjacent sense lines, which have a higher correlation in terms of noise. This removes a noise component from the output signal, thereby extracting a signal derived from the touch operation itself. This makes it possible to reliably remove (cancel) a wide variety of noises reflected in the touch panel.

Furthermore, in the touch panel system of the present invention, the effective region in which the touched position is to be detected is set restrictively in the touch panel based on the detected touched position. Therefore, it is possible to reduce power consumption and to enhance detection sensitivity of the touch operation by avoiding useless detection.

BRIEF DESCRIPTION OF THE DRAWINGS

FIG. 3 is a view illustrating waveforms of respective signals which are to be processed by a subtracting section in the touch panel system shown in FIG. 1.

FIG. 4 is a view schematically illustrating a basic configuration of another touch panel system according to the present invention.

FIG. 28 is a view schematically illustrating a method of recognizing touch information in the flow chart shown in FIG. 27.

DETAILED DESCRIPTION OF THE INVENTION

The following will describe embodiments of the present invention with reference to drawings. Although the embodiments of the present invention have both (or either) of the following first characteristics and the second characteristics, the following will describe the first and second characteristics separately for convenience of description.

<<First Characteristics>>

Embodiment 1

(1) Configuration of Touch Panel System 1

Figure 1:
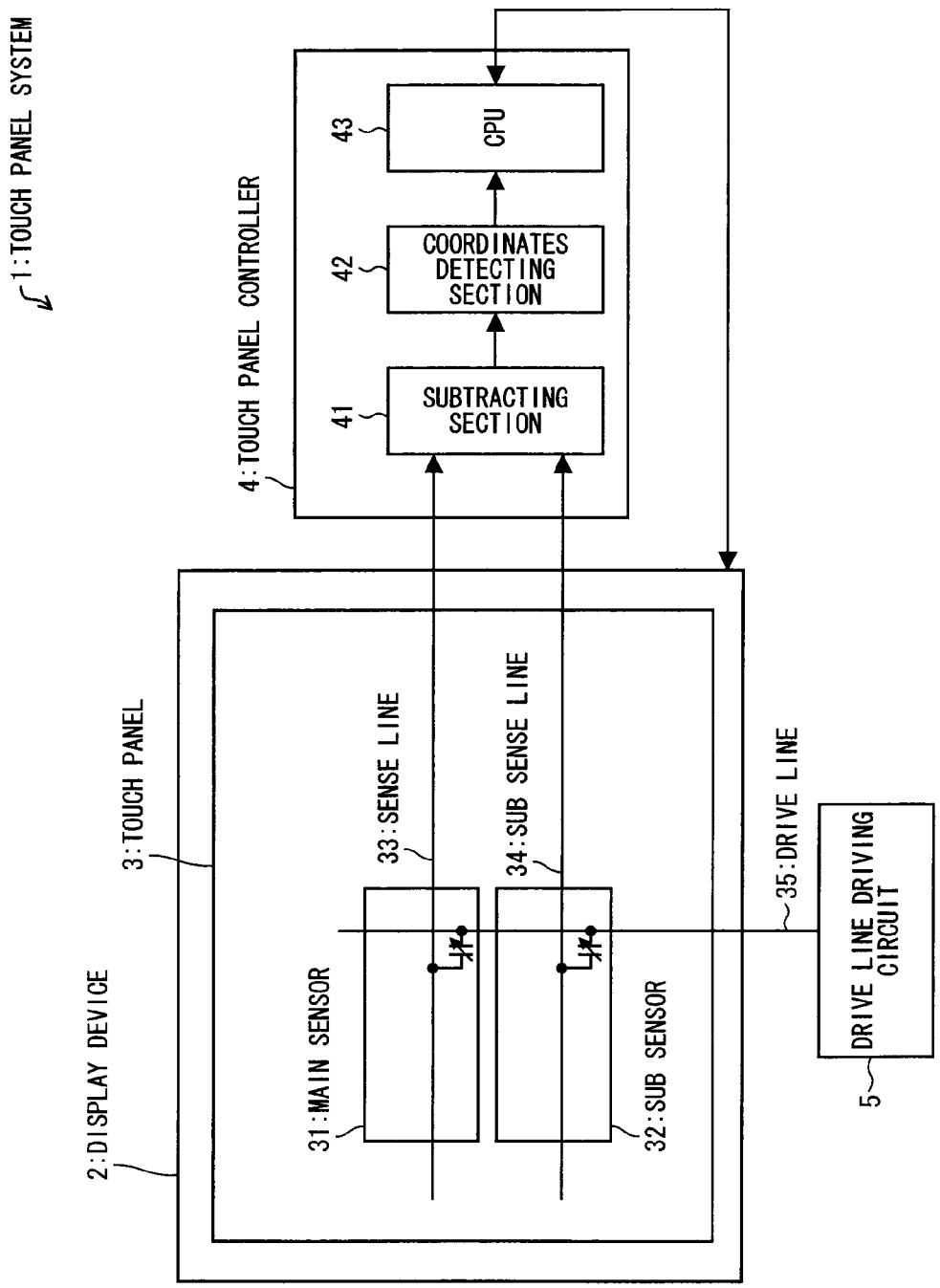
FIG. 1 is a view schematically illustrating a basic configuration of a touch panel system according to the present invention.

FIG. 1 is a view schematically illustrating a basic configuration of a touch panel system 1 according to one embodiment of the present invention. The touch panel system 1 includes a display device 2, a touch panel 3, a touch panel controller 4, and a drive line driving circuit 5. Further, the touch panel system 1 has a noise canceling function. In the descriptions below, a side used by a user is referred to as a "front surface" (or an "upper side").

The display device 2 includes a display screen (display section), which is not illustrated in FIG. 1. The display screen displays, e.g., various kinds of icons for operation and text information corresponding to operation instructions for the user. The display device 2 is made of, e.g., a liquid crystal display, a plasma display, an organic EL display, or a field emission display (FED). These displays are used in many generally-used electronic devices. Therefore, making the display device 2 of such the display provides a touch panel system 1 having a great versatility. The display device 2 may have any configuration, and is not limited to any particular configuration.

The touch panel 3 is configured to allow the user to perform a touch (press) operation on a surface of the touch panel 3 by his/her finger, a pen, or the like so as to enter various kinds of operation instructions. The touch panel 3 is stacked on a front surface (upper side) of the display device 2 so as to cover the display screen.

The touch panel 3 includes two sensors (one main sensor 31 and one sub sensor 32) which are provided on (in) the same surface. The main sensor 31 and the sub sensor 32 are provided so as to be adjacent to each other. Each of the main sensor 31 and the sub sensor 32 is a capacitive type sensor. The touch panel 3, which is provided with the capacitive type sensors, has an advantage of having high transmittance and having durability.

The main sensor (main sensor section) 31 is provided in a region (touched region) of the touch panel 3 in which region a touch operation is performed. The main sensor 31 detects a touch operation that the user performs with respect to the touch panel 3. The touch operation is, for example, double-click, sliding, single-click, or dragging. The main sensor 31 is provided with a sense line 33 which is made of a linear electrode. The sense line 33 has an end which is connected with the touch panel controller 4. With this, a signal detected by the main sensor 31 is outputted to the touch panel controller 4 via the sense line 33. Namely, a signal corresponding to a touch operation detected by the main sensor 31 is outputted to the touch panel controller 4.

The sub sensor (sub sensor section) 32 detects a noise component reflected in the touch panel 3. The sub sensor 32 is provided in a region (non-touched region) of the touch panel 3 in which region no touch operation is performed. Therefore, the sub sensor 32 is not touched by the user in a touch operation, and the sub sensor 32 detects various kinds of noises generated in the touch panel system 1. Thus, unlike the main sensor 31, the sub sensor 32 does not detect a signal corresponding to a touch operation. Namely, the sub sensor 32 is configured not to be touched by the user in a touch operation and to detect a noise generated in the touch panel 3.

The sub sensor 32 is provided with a sub sense line 34 which is made of a linear electrode. The sub sense line 34 is provided so as to extend in parallel with the sense line 33 (i.e., to extend along a direction in which the sense line 33 extends). The sub sense line 34 has an end which is connected with the touch panel controller 4. With this, a signal detected by the sub sensor 32 is outputted to the touch panel controller 4 via the sub sense line 34.

Meanwhile, the touch panel 3 includes a drive line 35 provided so as to intersect the sense line 33 and the sub sense line 34 at right angles. The drive line 35 is made of a linear electrode. A capacitance is formed in an intersection of the sense line 33 or the sub sense line 34 and the drive line 35. Namely, a capacitance is formed in an intersection of the sense line 33 and the drive line 35, and another capacitance is formed in an intersection of the sub sense line 34 and the drive line 35. The drive line 35 is connected with the drive line driving circuit (sensor driving section) 5. Upon activation of the touch panel system 1, the drive line 35 is supplied with an electric potential at a certain interval.

Each of the sense line 33, the sub sense line 34, and the drive line 35 can be made of, e.g., a transparent wire material such as ITO (Indium Tin Oxide). In other words, each of the sense line 33, the sub sense line 34, and the drive line 35 is a sensor electrode in the touch panel 3.

Note that the drive line 35 is provided on a transparent substrate or a transparent film (not illustrated). Further, the drive line 35 is covered with an insulative layer (not illustrated). On the insulative layer, the sense line 33 and the sub sense line 34 are provided. Thus, the sense line 33 or the sub sense line 34 and the drive line 35 are isolated from each other via the insulative layer, and the sense line 33 or the sub sense line 34 and the drive line 35 are coupled to each other via the capacitance. The sense line 33 and the sub sense line 34 are covered with a protective layer (not illustrated). Namely, in the touch panel 3, the protective layer is positioned so as to be the closest to the front surface side (the user's side).

The touch panel controller 4 reads signals (data) supplied from the main sensor 31 and the sub sensor 32 of the touch panel 3. Since the touch panel system 1 includes the capacitive type sensors, the touch panel controller 4 detects a capacitance generated in the touch panel 3. Concretely, the touch panel controller 4 detects (i) a change in the capacitance between the sense line 33 and the drive line 35 and (ii) a change in the capacitance between the sub sense line 34 and the drive line 35. The touch panel controller 4 includes a subtracting section 41, a coordinates detecting section 42 (touch detecting section), and a CPU 43.

The subtracting section 41 includes (i) an input terminal (i.e., an input terminal for a main sensor output) for receiving a signal outputted by the main sensor 31 and (ii) an input terminal (i.e., an input terminal for a sub sensor output) for receiving a signal outputted by the sub sensor 32. The subtracting section 41 subtracts (i) the signal supplied to the input terminal for the sub sensor output from (ii) the signal supplied to the input terminal for the main sensor output. The signal obtained as a result of the subtracting operation by the subtracting section 41 is outputted to the coordinates detecting section 42. Note that the signal supplied to the subtracting section 41 may be either of a digital signal and an analog signal. Namely, the input signal supplied to the subtracting section 41 may be any signal, as long as it suits with the configuration of the subtracting section 41.

According to the signal obtained as a result of the subtracting operation by the subtracting section 41, the coordinates detecting section 42 detects information indicative of the presence or absence of a touch operation. For example, if a value of the output signal supplied from the subtracting section 41 is equal to or greater than a predetermined threshold value, the coordinates detecting section 42 outputs, to the CPU 43, a signal indicative of the presence of a touch operation. Note that the touch panel system 1 includes a single main sensor 31; therefore, the coordinates detecting section 42 detects information indicative of the presence or absence of a touch operation. Meanwhile, if a touch panel system 1 is configured to include a plurality of main sensors 31, a coordinates detecting section 42 determines, in addition to the presence or absence of a touch operation, coordinates values indicative of a position touched by the user.

The CPU 43 obtains, at a certain interval, information outputted by the coordinates detecting section 42. Further, according to the information thus obtained, the CPU 43 performs an operation such as output of the information to the display device 2.

The drive line driving circuit 5 is connected with the drive line 35. Upon activation of the touch panel system 1, the drive line driving circuit 5 applies an electric potential to the drive line 35 at a certain interval.

(2) Noise Processing Performed by Touch Panel System 1

The touch panel system 1 determines, according to a change in the capacitance which change is detected by the touch panel controller 4, the presence or absence of a touch operation. However, since the touch panel 3 is bonded to the front surface (the user's side) of the display device 2, the touch panel system 1 is likely to be affected not only by a noise such as a clock generated in the display device 2 but also by other noises coming from the outside. This leads to impairment in detection sensitivity for a touch operation (i.e., detection sensitivity of the coordinates detecting section 42).

Figure 2:
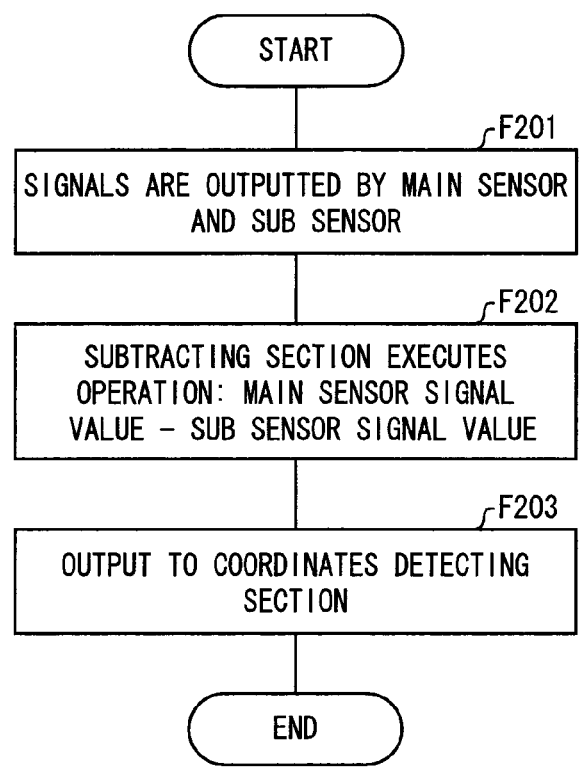
FIG. 2 is a flow chart illustrating a basic process of the touch panel system shown in FIG. 1.

In order to address this, as a measure for removing such the noises, the touch panel system 1 includes the sub sensor 32 and the subtracting section 41. With reference to FIG. 2, a noise canceling process of the touch panel system 1 will be described. FIG. 2 is a flow chart illustrating a noise canceling process, which is a basic process of the touch panel system 1.

Upon activation of the touch panel system 1, the drive line driving circuit 5 applies an electric potential to the drive line 35 at a certain interval. When the user performs a touch operation on the touch panel 3, both of the main sensor 31 and the sub sensor 32 output signals to the subtracting section 41.

Here, (i) a noise such as a clock generated in the display device 2 and (ii) other noises coming from the outside are reflected in the touch panel 3. Therefore, various kinds of noise components are detected by the main sensor 31 and the sub sensor 32. Namely, the output signal supplied from the main sensor 31 includes not only a signal derived from the touch operation itself but also a noise signal (noise component). Meanwhile, since the sub sensor 32 is configured not to detect any touch operation, the output signal supplied from the sub sensor 32 includes a noise signal (noise component), but does not include a signal derived from the touch operation (F201).

In the touch panel system 1, the main sensor 31 and the sub sensor 32 are provided in the same surface so as to be adjacent to each other. Therefore, (i) a value of the noise signal included in the output signal supplied from the main sensor 31 and (ii) a value of the noise signal included in the output signal supplied from the sub sensor 32 can be regarded as being basically the same. In view of this, the subtracting section 41 included in the touch panel controller 4 executes an operation for subtracting (i) the input signal (signal value) supplied from the sub sensor 32 from (ii) the input signal (signal value) supplied from the main sensor 31 (F202). Namely, the subtracting section 41 finds a difference between the sense line 33 and the sub sense line 34. This removes the noise signal from the output signal supplied from the main sensor 31. This provides the signal value derived from the touch operation itself, which signal value is generated in response to the touch operation.

The signal thus obtained by the subtracting operation (the signal derived from the touch operation itself) is outputted to the coordinates detecting section 42 included in the touch panel controller 4 (F203). Namely, the signal derived from the touch operation itself is outputted to the coordinates detecting section 42. According to the signal derived from the touch operation itself, the coordinates detecting section 42 determines the presence or absence of a touch operation. With this configuration, it is possible to prevent impairment in detection sensitivity of the coordinates detecting section 42 (e.g., detection sensitivity as to the presence or absence of a touch operation).

Thus, according to the touch panel system 1, the subtracting section 41 finds a difference between the sense line 33 and the sub sense line 34, so as to cancel, from an input signal which is supplied from the sense line 33 and includes a wide variety of noise components, the noise components. Namely, the subtracting section 41 cancels a noise signal from an input signal supplied from the sense line 33, so as to extract a signal derived from a touch operation itself. Thus, it is possible to provide the touch panel system 1 capable of reliably canceling a wide variety of noises.

The noise canceling process of the touch panel system 1 is visually illustrated in FIG. 3. FIG. 3 is a view illustrating waveforms of respective signals which are to be processed by the subtracting section 41 in the touch panel system 1. FIG. 3A shows an output signal supplied from the main sensor 31, FIG. 3B shows an output signal supplied from the sub sensor 32, and FIG. 3C is a signal processed by the subtracting section 41. Each signal shown in FIG. 3 is a signal generated in response to a touch operation performed by the user.

The touch panel system 1 is configured such that the user's performing a touch operation increases the capacitance of the main sensor 31 which detects a touch operation (FIG. 3A). Namely, the user's performing a touch operation increases a value of an output signal supplied from the main sensor 31 (the sense line 33). However, the output signal supplied from the main sensor 31 in response to the touch operation includes not only (i) a signal derived from the touch operation itself but also (ii) various kinds of noise signals (e.g., a noise such as a clock generated in the display device 2 and/or a noise coming from the outside).

Meanwhile, since the sub sensor 32 does not detect a touch operation, the capacitance of the sub sensor 32 (the sub sense line) is not increased by the touch operation. Namely, an output signal supplied from the sub sensor 32 does not include a signal derived from the touch operation, but includes a noise component reflected in the touch panel 3 (FIG. 3B).

The subtracting section 41 subtracts (i) the output signal supplied from the sub sensor 32 from (ii) the output signal supplied from the main sensor 31 (i.e., the signal value of FIG. 3A—the signal value of FIG. 3B). As shown in FIG. 3C, this subtracting operation removes (i) the noise component outputted by the sub sensor 32 from (ii) the output signal supplied from the main sensor 31. This provides the signal derived from the touch operation itself, which signal is generated in response to the touch operation. Furthermore, since the coordinates detecting section 42 is supplied with the signal derived from the touch operation itself, detection accuracy for a touch operation is not impaired.

As described above, according to the touch panel system 1 of the present embodiment, the main sensor 31 and the sub sensor 32 are provided in (on) the same surface of the touch panel 3. Consequently, each of (i) an output signal supplied from the main sensor 31 and (ii) an output signal supplied from the sub sensor 32 includes various kinds of noise signals reflected in the touch panel 3. Furthermore, the subtracting section 41 finds a difference between (i) the output signal supplied from the main sensor 31 which signal includes a signal derived from a touch operation and a noise signal and (ii) the output signal supplied from the sub sensor 32 which signal includes a noise signal. This removes the noise component from the output signal supplied from the main sensor 31, thereby extracting the signal derived from the touch operation itself. Therefore, it is possible to reliably remove (cancel) a wide variety of noises reflected in the touch panel 3.

Note that, according to the touch panel system of the publicly known document 1, a noise component which is the subject of removal is an AC signal component included in a signal which includes noise components. On the other hand, according to the touch panel system 1, each of (i) an output signal supplied from the main sensor 31 and (ii) an output signal supplied from the sub sensor 32 includes various kinds of noise components. Therefore, according to the touch panel system 1, a noise component which is the subject of removal is not limited to an AC signal component. Thus, the touch panel system 1 can cancel all noises reflected in the touch panel 3.

In the touch panel system 1, the sub sensor 32 only needs to be provided in a surface of the touch panel 3 in which surface the main sensor 31 is also provided. With this configuration, both of the main sensor 31 and the sub sensor 32 can detect a noise component (noise signal) reflected in the touch panel 3. Note that the sub sensor 32 is preferably configured not to detect a touch operation performed on the touch panel 3. With this configuration, the sub sensor 32 does not detect a signal derived from a touch operation; therefore, an output signal supplied from the sub sensor 32 does not include the signal derived from the touch operation. This prevents a case where the signal value derived from the touch operation is reduced by the subtracting operation performed by the subtracting section 41. Namely, the noise component is removed without reducing the signal derived from the touch operation which signal is detected by the main sensor 31. Therefore, it is possible to further enhance detection sensitivity for a touch operation.

The touch panel system 1 is configured such that the sub sensor 32 is provided in the region (non-touched region) of the touch panel 3 in which region no touch operation is performed by the user. In such a configuration, a signal derived from a touch operation is not detected by the sub sensor 32. Therefore, on the sub sensor 32, the user would not perform a touch operation. Accordingly, although the sub sensor 32 detects a noise reflected in the touch panel, the sub sensor 32 does not detect the signal derived from the touch operation. Thus, it is possible to reliably prevent the sub sensor 32 from detecting a touch operation.

In order that the sub sensor 32 detects a noise component, the sub sensor 32 is preferably provided as close to the main sensor 31 as possible. More preferably, the sub sensor 32 and the main sensor 31 are arranged side by side so as to be in contact with each other. With this configuration, the main sensor 31 and the sub sensor 32 are provided under almost the same condition. Particularly in a configuration in which the sub sensor 32 and the main sensor 31 are arranged side by side so as to be in contact with each other, the main sensor 31 and the sub sensor 32 are arranged so that a distance therebetween is shortest. Therefore, a value of a noise signal included in an output signal supplied from the sub sensor 32 can be regarded as being the same as that of a noise signal included in an output signal supplied from the main sensor 31. Therefore, by the subtracting operation performed by the subtracting section 41, it is possible to more reliably remove a noise component reflected in the touch panel 3. This makes it possible to further enhance detection sensitivity for a touch operation.

The present embodiment has dealt with the touch panel system 1 including the touch panel 3 of capacitive type. However, the principle of operation of the touch panel 3 (i.e., the method of operating the sensor) is not limited to the capacitive type. For example, the noise canceling function can be achieved similarly by a touch panel system including a touch panel of resistance film type, infrared type, ultrasonic wave type, or electromagnetic induction coupling type. Further, regardless of the type of the display device 2, the touch panel system 1 of the present embodiment provides the noise canceling function.

The touch panel system 1 of the present embodiment is applicable to various kinds of electronic devices provided with touch panels. Examples of such the electronic device encompass televisions, personal computers, mobile phones, digital cameras, portable game devices, electronic photo frames, personal digital assistants (PDAs), electronic books, home electronic appliances (e.g., microwave ovens, washing machines), ticket vending machines, automatic teller machines (ATM), and car navigation systems. Thus, it is possible to provide an electronic device which is capable of effectively preventing impairment in detection sensitivity for a touch operation.

Embodiment 2

(1) Configuration of Touch Panel System 1a

FIG. 4 is a view schematically illustrating a basic configuration of a touch panel system 1a according to another embodiment of the present invention. A basic configuration of the touch panel system 1a is substantially the same as that of the touch panel system 1 of Embodiment 1. The following will describe the touch panel system 1a, focusing on differences between the touch panel system 1a and the touch panel system 1. For convenience of explanation, members having the same functions as those explained in the drawings described in Embodiment 1 are given the same reference signs, and explanations thereof are omitted here.

The touch panel system 1a differs from the touch panel system 1 in terms of configurations of sensors provided in a touch panel 3a. Specifically, the touch panel 3a includes (i) a main sensor group 31a made of a plurality of main sensors 31 and (ii) a sub sensor group 32a made of a plurality of sub sensors 32. The touch panel system 1a detects not only (i) the presence or absence of a touch operation performed by the user but also (ii) positional information (coordinates) indicative of a position where the user performs the touch operation.

Specifically, according to the touch panel system 1a, the touch panel 3a includes the main sensor group 31a and the sub sensor group 32a which are provided on (in) the same surface of the touch panel 3a. The main sensor group 31a and the sub sensor group 32a are provided so as to be adjacent to each other. Each of the main sensor group 31a and the sub sensor group 32a is made of capacitive type sensors.

The main sensor group (main sensor section) 31a is provided in a region (touched region) of the touch panel 3a in which region a touch operation is performed. The main sensor group 31a detects a touch operation that the user performs with respect to the touch panel 3a. The main sensor group 31a is made of the plurality of main sensors 31 which are arranged in a matrix. The main sensor group 31a is provided with L sense lines 33 (L is an integer of 2 or greater). The sense lines 33 are provided so as to be parallel with each other and evenly spaced. On each of the sense lines 33, M main sensors 31 are provided (M is an integer of 2 or greater).

Each of the sense lines 33 has an end which is connected with a subtracting section 41 of a touch panel controller 4. With this, a signal detected by each main sensor 31 is outputted to the subtracting section 41 via its corresponding sense line 33. Namely, a signal corresponding to a touch operation detected by the main sensor 31 is outputted to the subtracting section 41.

The sub sensor group (sub sensor section) 32a detects a noise component reflected in the touch panel 3a. The sub sensor group 32a is provided in a region (non-touched region) of the touch panel 3a in which region no touch operation is performed. Therefore, the sub sensor group 32a is not touched by the user in a touch operation, and the sub sensor group 32a detects various kinds of noises generated in the touch panel system 1a. Thus, unlike the main sensor group 31a, the sub sensor group 32a does not detect a signal corresponding to a touch operation. Namely, the sub sensor group 32a is configured not to be touched by the user in a touch operation but to detect a noise generated in the sensor. The sub sensor group 32a is provided with one sub sense line 34. The sub sense line 34 is provided so as to extend in parallel with the sense lines 33 (i.e., to extend along a direction in which the sense lines 33 extend). On the sub sense line 34, M sub sensors 32 are provided (M is an integer of 2 or greater). Namely, the number of main sensors 31 provided on each sense line 33 is equal to the number of sub sensors 32 provided on the sub sense line 34.

The sub sense line 34 has an end which is connected with the subtracting section 41 of the touch panel controller 4. With this, a signal detected by the sub sensor group 32a is outputted to the subtracting section 41 via the sub sense line 34.

Meanwhile, the touch panel 3a includes M drive lines 35 provided so as to intersect the sense lines 33 and the sub sense line 34 at right angles (M is an integer of 2 or greater). The drive lines 35 are provided so as to extend in parallel with each other and to be evenly spaced. On each of the drive lines 35, L main sensors 31 and one sub sensor 32 are provided (L is an integer of 2 or greater). Further, a capacitance is formed in an intersection of each of the sense lines 33 or the sub sense line 34 and a corresponding one of the drive lines 35. Namely, capacitances are formed in intersections of the sense lines 33 and the drive lines 35, and capacitances are formed in intersections of the sub sense line 34 and the drive lines 35. The drive lines 35 are connected with a drive line driving circuit (not illustrated). Upon activation of the touch panel system 1a, the drive lines 35 are supplied with electric potentials at a certain interval.

Thus, in the touch panel 3a, (i) the sense lines 33 and the sub sense line 34, which are provided in a horizontal direction, and (ii) the drive lines 35, which are provided in a vertical direction, are arranged in a two-dimensional matrix. For the sense line 33, the sub sense lines 34, and the drive line 35, the number thereof, a length thereof, a width thereof, a space therebetween, and/or the like can be arbitrarily set according to the intended purpose of the touch panel system 1a, the size of the touch panel 3a, and/or the like.

(2) Noise Processing Performed by Touch Panel System 1a

Figure 5:
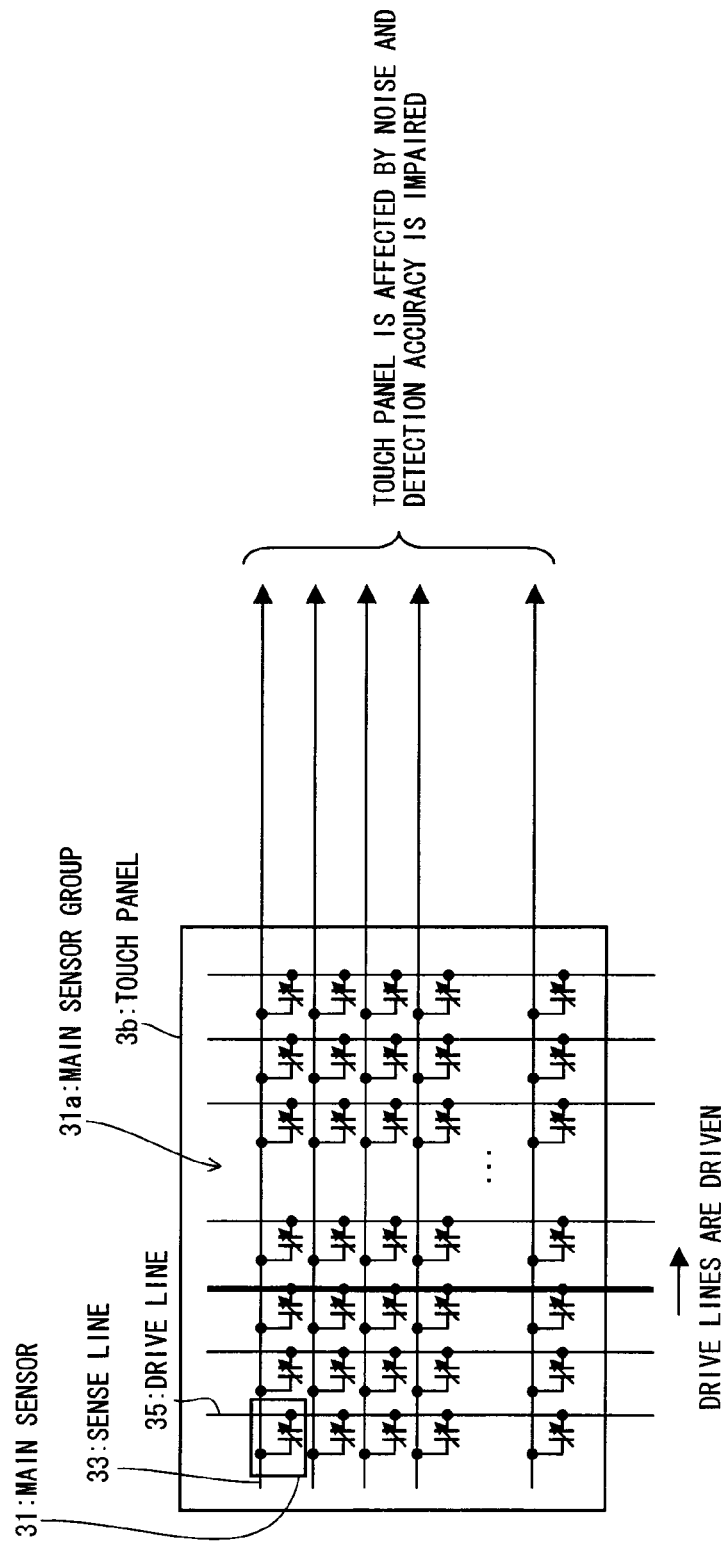
FIG. 5 is a view schematically illustrating a touch panel which is included in another version of the touch panel system shown in FIG. 4 and does not include a sub sensor group.

The touch panel system 1a determines, according to a change in the capacitance which change is detected by the touch panel controller 4, (i) the presence or absence of a touch operation and (ii) a touched position. However, similarly to the touch panel system 1, the touch panel system 1a is likely to be affected by various kinds of noises. This leads to impairment in detection sensitivity for a touch operation (i.e., detection sensitivity of the coordinates detecting section). Specifically, FIG. 5 is a view schematically illustrating a touch panel 3b, which is made by modifying the touch panel of the touch panel system 1a shown in FIG. 4 so that it does not include the sub sensor group 32a. As shown in FIG. 5, the touch panel 3b includes only a main sensor group 31a but does not include a sub sensor group 32a. Namely, the touch panel 3b shown in FIG. 5 has a configuration which is not provided with a countermeasure against noises yet. According to this configuration, the touch panel 3b is affected by various kinds of noises. Accordingly, a signal outputted by each sense line 33 includes various kinds of noises, and thus detection sensitivity for a touch operation is impaired.

Figure 6:
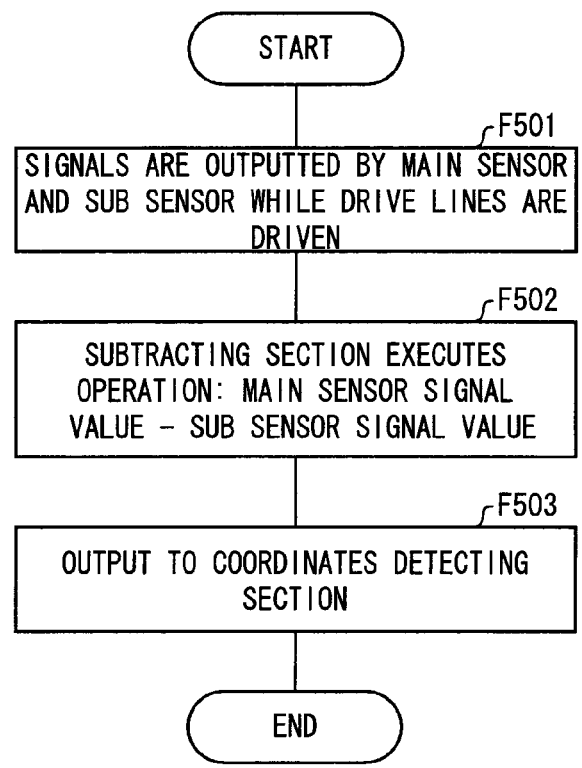
FIG. 6 is a flow chart illustrating a basic process of the touch panel system shown in FIG. 4.

In order to avoid this, the touch panel system 1a includes, as a measure for removing such the noises, the sub sensor group 32a and the subtracting section 41. With reference to FIG. 6, the following will describe a noise canceling process performed by the touch panel system 1a. FIG. 6 is a flow chart illustrating a noise canceling process, which is a basic process of the touch panel system 1a.

Upon activation of the touch panel system 1a, the drive line 35 is supplied with an electric potential at a certain interval. When the user performs a touch operation on the touch panel 3a, both of the main sensor group 31a and the sub sensor group 32a output signals to the subtracting section 41. Specifically, the user's performing the touch operation increases a capacitance of a specific main sensor 31 corresponding to the touched position. Namely, the user's performing the touch operation increases a value of an output signal supplied from that main sensor 31 (sense line 33). The touch panel system 1a outputs, to the subtracting section 41, output signals supplied from the sense line 33 and the sub sense line 34, while driving the drive lines 35.

To be more specific, a noise such as a clock generated in the display device 2 and other noises coming from the outside are reflected in the touch panel 3a. Therefore, the main sensor group 31a and the sub sensor group 32a detect various kinds of noise components. Specifically, the output signal supplied from the main sensor group 31a includes not only a signal derived from the touch operation itself but also a noise signal (noise component). Meanwhile, the sub sensor group 32a is configured not to detect a touch operation. Therefore, the output signal supplied from the sub sensor group 32a includes a noise signal (noise component), but does not include a signal derived from the touch operation (F501).

In the touch panel system 1a, the main sensor group 31a and the sub sensor group 32a are provided in the same surface so as to be adjacent to each other. Therefore, (i) a value of a noise signal included in the output signal supplied from the main sensor group 31a and (ii) a value of a noise signal which is the output signal supplied from the sub sensor group 32a can be regarded as being basically the same. In view of this, the subtracting section 41 in the touch panel controller 4 executes an operation for subtracting (i) the input signal (signal value) supplied from the sub sensor group 32a from (ii) the input signal (signal value) supplied from the main sensor group 31a (F502). Namely, the subtracting section 41 finds a difference between each sense line 33 and the sub sense line 34. This removes the noise signal from the output signal supplied from the main sensor group 31a. This provides the signal value derived from the touch operation itself, which signal is generated in response to the touch operation.

The signal thus obtained by the subtracting operation is outputted to the coordinates detecting section 42 included in the touch panel controller 4 (F503). Thus, the signal derived from the touch operation itself is outputted to the coordinates detecting section 42. According to the signal derived from the touch operation itself, the coordinates detecting section 42 detects (i) the presence or absence of a touch operation and (ii) a touched position (coordinates). With this configuration, it is possible to prevent impairment in detection sensitivity of the coordinates detecting section 42 (e.g., detection accuracy as to the presence of absence of a touch operation, detection sensitivity as to a touched position).

Note that, according to the touch panel system 1a, an output signal of the sense line 31 provided with the specific main sensor 31 corresponding to the touched position has a waveform as shown in FIG. 3A, whereas an output signal of the sub sensor group 32a (sub sense line 34) has a waveform as shown in FIG. 3B. The subtracting section 41 subtracts, from the output signal supplied from the main sensor group 31a, the output signal supplied from the sub sensor group 32a. As shown in FIG. 3C, this subtracting operation removes, from the output signal supplied from the main sensor group 31a, the noise component outputted by the sub sensor group 32a. This provides the signal derived from the touch operation itself, which signal is generated in response to the touch operation. Furthermore, since the coordinates detecting section 42 is supplied with the signal derived from the touch operation itself, detection accuracy for a touch operation and a touched position is not impaired. Therefore, it is possible to reduce a difference between (i) the actual touched position and (ii) the detected position which is detected by the coordinates detecting section 42.

As described above, while driving the drive lines 35, the touch panel system 1a reads, from the sense line 33, a change in a capacitance value of the main sensor group 31a which change is caused by the touch operation performed by the user. Furthermore, the touch panel system 1a reads a noise component from the sub sense line 34. Moreover, the touch panel system 1a allows the subtracting section 41 to find a difference between the sense line 33 and the sub sense line 34, so as to remove (cancel) the noise component.

The touch panel system 1a includes the main sensor group 31a made of the plurality of main sensors 31 arranged vertically and horizontally in the form of a matrix. Thanks to this configuration, in addition to the same effects as those given by the touch panel system 1, the touch panel system 1a can detect, by the coordinates detecting section 42, coordinates indicative of a touched position. Namely, the touch panel system 1a can detect a touched position (coordinates value) in addition to the presence or absence of a touch operation.

As with the case of the touch panel system 1, for the touch panel system 1a, a noise component which is the subject of removal is not limited to an AC signal component. Accordingly, the touch panel system 1a also can cancel all noises reflected in the touch panel 3a.

Embodiment 3

(1) Configuration of Touch Panel System 1b

Figure 7:
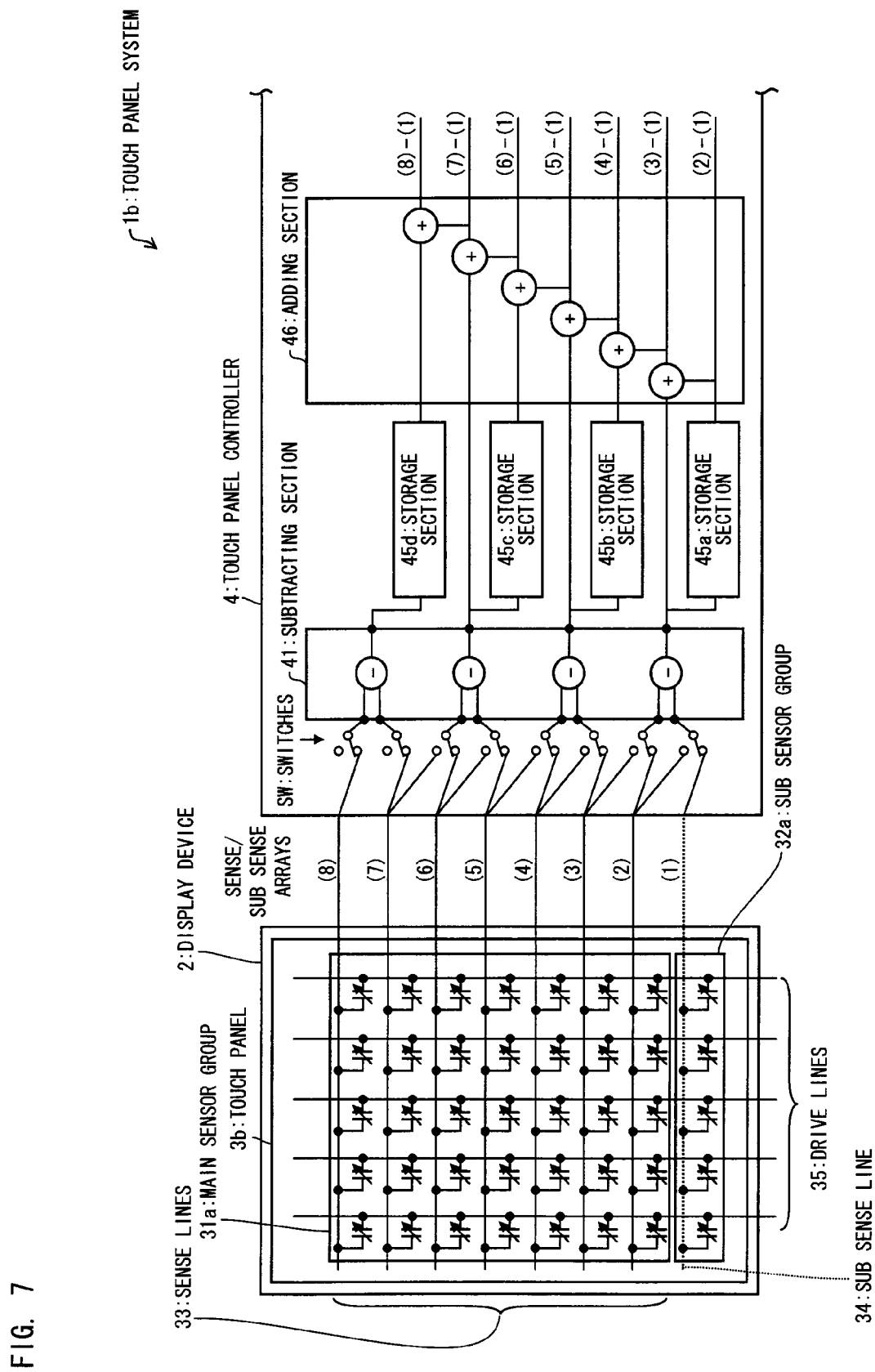
FIG. 7 is a view schematically illustrating a basic configuration of another touch panel system according to the present invention.

FIG. 7 is a view schematically illustrating a basic configuration of a touch panel system 1b according to another embodiment of the present invention. A basic configuration of the touch panel system 1b is substantially the same as that of the touch panel system 1a of Embodiment 2. The following will describe the touch panel system 1b, focusing on differences between the touch panel system 1a and the touch panel system 1b. For convenience of explanation, members having the same functions as those explained in the drawings described in Embodiments 1 and 2 are given the same reference signs, and explanations thereof are omitted here.

A touch panel 3b has the same configuration of that of the touch panel 3a in the touch panel system 1a of Embodiment 2. Namely, the touch panel 3b includes (i) a plurality of drive lines 35 (in FIG. 7, five drive lines 35), (ii) a plurality of sense lines 33 (in FIG. 7, seven sense lines 33) intersecting the drive lines 35, and (iii) one sub sense line 34 which intersects the drive lines 35 at right angles and extends in parallel with the sense lines 33. The sense lines 33 and the drive lines 35 are isolated from each other, and are coupled to each other via capacitances. The sub sense line 34 and the drive lines 35 are isolated from each other, and are coupled to each other via capacitances.

In the following description, eight sense/sub sense arrays, including the one sub sense line 34 and the seven sense lines 33, are referred to as Arrays (1) through (8), respectively.

A touch panel controller 4 includes switches SW, a subtracting section 41, storage sections 45a through 45d, and an adding section 46, which are arranged in this order from an input-receiving side of the touch panel controller 4. Note that the touch panel controller 4 also includes a coordinates detecting section 42 (not illustrated) and a CPU 43 (not illustrated) (FIG. 1). Thus, the touch panel system 1b differs from the touch panel systems 1 and 1a in terms of the configuration of the touch panel controller 4.

The switches SW select, from signals supplied from the sense lines 33 and the sub sense line 34, signals to be supplied to the subtracting section 41. More specifically, each of the switches SW includes two terminals (upper and lower terminals), and selects one of the upper and lower terminals. FIG. 7 shows a state where the switches SW select the lower terminals.

The subtracting section 41 performs difference signal operations on, out of signals supplied from Arrays (1) through (8), signals selected by the switches SW. Specifically, the subtracting section 41 performs difference signal operations between sense lines 33 which are adjacent to each other, and between a sense line 33 and the sub sense line 34 which are adjacent to each other. For example, in a case where the switches SW select the lower terminals as shown in FIG. 7, the subtracting section 41 performs the following difference signal operations: Array (8)–Array (7); Array (6)–Array (5); Array (4)–Array (3); and Array (2)–Array (1). On the other hand, in a case where the switches SW select the upper terminals (not illustrated), the subtracting section 41 performs the following difference signal operations: Array (7)–Array (6); Array (5)–Array (4); and Array (3)–Array (2).

In a case where each of the switches SW selects one of the upper and lower terminals, the storage sections 45a through 45d store signals (difference operation signals) obtained by the difference operations performed by the subtracting section 41. The difference operation signals stored in the storage sections 45a through 45d are outputted to the adding section 46. On the other hand, in a case where each of the switches SW selects the other one of the upper and lower terminals, difference operation signals are directly outputted to the adding section 46, not via the storage sections 45a through 45d.

The adding section 46 adds up the difference operation signals each of which is obtained from the sense lines 33 adjacent to each other and which are supplied from the subtracting section 41 and the storage sections 45a through 45d. Thereafter, the adding section 46 outputs a result of the adding operation. Further, the adding section 46 outputs the difference operation signal (Array (2)-Array (1)) which is obtained from the sub sense line 34 and the sense line 33 adjacent to the sub sense line 34 and which is stored in the storage section 45a. Ultimately, the adding section 46 outputs signals obtained by the following operations: Array (2)-Array (1); Array (3)–Array (1); Array (4)-Array (1); Array (5)-Array (1); Array (6)-Array (1); Array (7)-Array (1); and Array (8)-Array (1). Namely, each signal outputted by the adding section 46 is such a signal from which the noise signal (corresponding to the signal of Array (1)) included in the sense lines 33 has been removed. Furthermore, the subtracting section 41 has performed the difference signal operation between the sense lines 33 adjacent to each other. This allows the adding section 46 to output the signals from which the noise signals have been more reliably removed.

(2) Noise Processing Performed by Touch Panel System 1b

Figure 8:
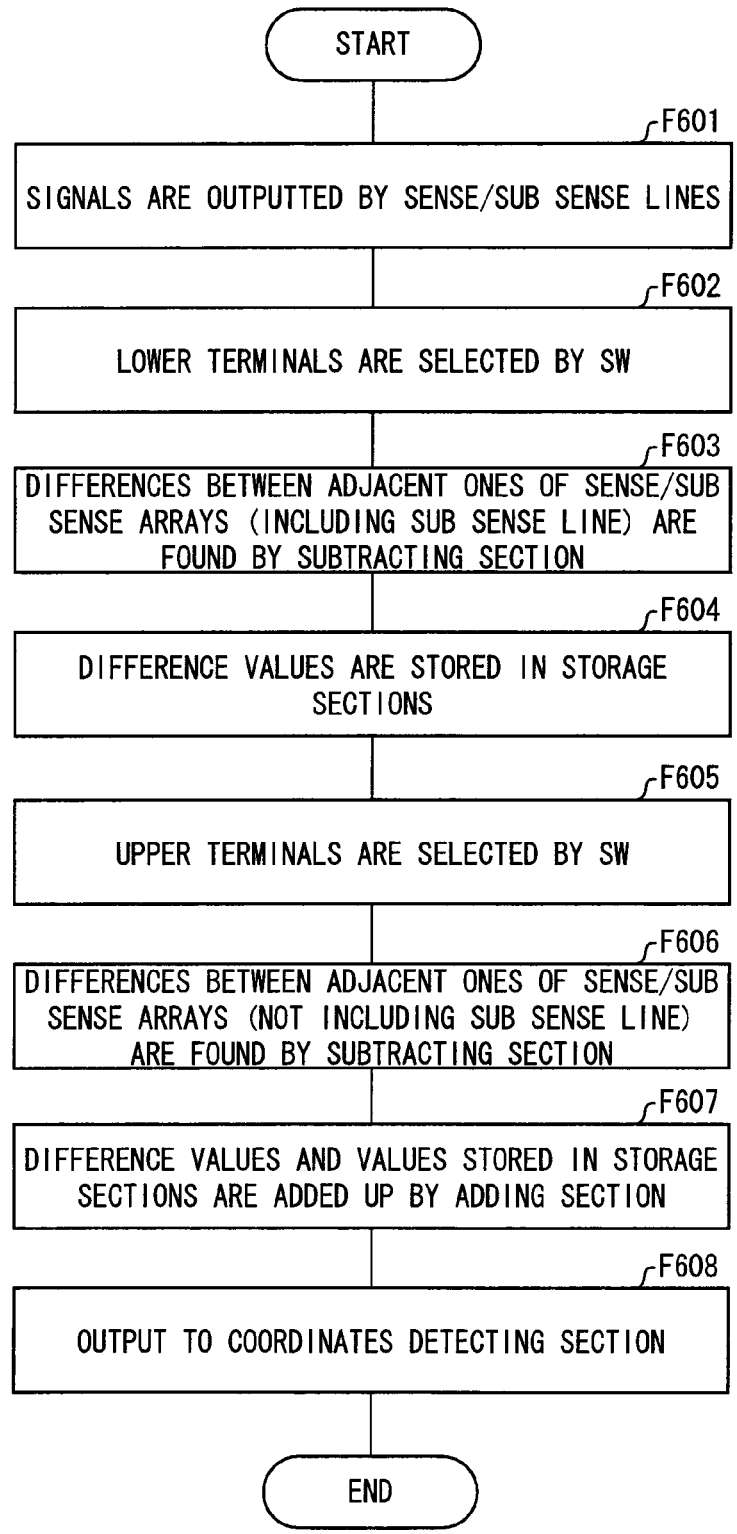
FIG. 8 is a flow chart illustrating a basic process of the touch panel system shown in FIG. 7.

With reference to FIGS. 7 and 8, the following will describe noise processing performed by the touch panel system 1b. FIG. 8 is a flow chart illustrating a noise canceling process, which is a basic process of the touch panel system 1b.

Upon activation of the touch panel system 1b, the drive line 35 is supplied with an electric potential at a certain interval. The user's performing a touch operation on the touch panel 3b increases a capacitance of a specific sense line 33 corresponding to the touched position. Namely, the user's performing the touch operation on the touch panel 3b increases a value of an output signal supplied from that sense line 33. The touch panel system 1b outputs, to the touch panel controller 4, output signals supplied from the sense lines 33 and the sub sense line 34, while driving the drive lines 35. Thus, while driving the drive lines 35, the touch panel system 1b detects changes in the capacitances of the sense lines 33 and a change in the capacitance of the sub sense line 34, so as to determine the presence or absence of a touch operation and a touched position.

To be more specific, a noise such as a clock generated in the display device 2 and other noises coming from the outside are reflected in the touch panel 3b. Therefore, each of the main sensor group 31a and the sub sensor group 32a detects various kinds of noise components. Specifically, the output signal supplied from the sense line 33 includes not only a signal derived from the touch operation itself but also a noise signal (noise component). Meanwhile, the sub sense line 34 is configured not to detect a touch operation. Therefore, the output signal supplied from the sub sense line 34 includes a noise signal (noise component), but does not include a signal derived from the touch operation (F601).

Next, the switches SW select the lower terminals (F602). Then, the subtracting section 41 finds a difference (sense line (Sn+1)–sense line Sn: a first difference) between a sense line 33 (sense line Sn) and a sense line (sense line Sn+1) which is one of two sense lines 33 adjacent to the certain sense line 33 and is closer to the sub sense line 34 than the other is. In this step, a difference (third difference) between the sub sense line 34 and a sense line 33 which is closer to the sub sense line 34 than any other sense lines 33 is found (F603).

For Arrays (1) through (8) shown in FIG. 7, the subtracting section 41 performs the following four difference signal operations:

Array (2)–Array (1) (The resulting difference value is referred to as "A".)

Array (4)–Array (3) (The resulting difference value is referred to as "C".)

Array (6)–Array (5) (The resulting difference value is referred to as "E".)

Array (8)−Array (7) (The resulting difference value is referred to as "G".)

Namely, in the step F603, the subtracting section 41 performs the difference signal operations on Arrays (1) through (8), which include the sub sense line 34.

The difference values A, C, E, and G found by the subtracting section 41 are stored in the storage sections 45a through 45d, respectively. Namely, the storage section 45a stores the difference value A, the storage section 45b stores the difference value C, the storage section 45c stores the difference value E, and the storage section 45d stores the difference value G (F604).

Next, the switches SW selecting the lower terminals are turned to select (close) the upper terminals (F605). Then, the subtracting section 41 performs an operation similar to that of F603. Specifically, the subtracting section 41 performs a difference signal operation (sense line Sn—sense line (Sn−1): a second difference) between the sense line 33 (sense line Sn) and a sense line (sense line Sn−1) which is one of the two sense lines 33 adjacent to the certain sense line 33 and is further away from the sub sense line 34 than the other is (F606).

For Arrays (1) through (8) shown in FIG. 7, the subtracting section 41 performs the following three difference signal operations:

Array (3)−Array (2) (The resulting difference value is referred to as "B".)

Array (5)−Array (4) (The resulting difference value is referred to as "D".)

Array (7)−Array (6) (The resulting difference value is referred to as "F".)

Namely, in the step F606, the subtracting section 41 performs the difference signal operations on Arrays (2) through (7), which do not include the sub sense line 34.

Next, the adding section 46 performs an adding operation for adding up (i) the difference values B, D, and F found in the step F606 and (ii) the difference values A, C, E, and G stored in the respective storage sections 45a through 45d. Namely, the adding section 46 adds up (i) the difference values (the difference values A, C, E, and G) found when the lower terminals are selected by the switches SW and (ii) the difference values (the difference values B, D, and F) found when the upper terminals are selected by the switches SW (F607).

In the case of Arrays (1) through (8) shown in FIG. 7, the adding section 46 adds up (i) the difference value A (Array (2)−Array (1) signal) stored in the storage section 45a and (ii) the difference value B (Array (3)−Array (2) signal) outputted by the subtracting section 41. This adding operation is expressed as below:

Difference value $A$ + Difference value $B$ =

$\{Array(2) - Array(1)\} + \{Array(3) - Array(2)\}$ =

Array(3) − Array(1)(The resulting difference value is referred to as "difference value $H''$".)

This provides an Array (3)−Array (1) signal. The adding section 46 performs such operations sequentially.

Specifically, the adding section 46 adds, to the difference value H (Array (3)−Array (1) signal), the difference value C (Array (4)−Array (3) signal) stored in the storage section 45b. This provides an Array (4)−Array (1) signal (difference value I).

Next, the adding section 46 adds, to the difference value I (Array (4)−Array (1) signal), the difference value D (Array (5)−Array (4) signal) outputted by the subtracting section 41. This provides an Array (5)−Array (1) signal (difference value J).

Next, the adding section 46 adds, to the difference value J (Array (5)−Array (1) signal), the difference value E (Array (6)−Array (5) signal) stored in the storage section 45c. This provides an Array (6)−Array (1) signal (difference value K).

Next, the adding section 46 adds, to the difference value K (Array (6)−Array (1) signal), the difference value F (Array (7)−Array (6) signal) outputted by the subtracting section 41. This provides an Array (7)−Array (1) signal (difference value L).

Next, the adding section 46 adds, to the difference value L (Array (7)−Array (1) signal), the difference value G (Array (8)−Array (7) signal) stored in the storage section 45d. This provides an Array (8)−Array (1) signal (difference value M).

Note that the difference value A (i.e., Array (2)−Array (1) signal) stored in the storage section 45a is outputted without being subjected to any adding operation by the adding section 46.

Thus, the adding section 46 outputs the following signals:

Array (2)−Array (1) signal=Difference value A

Array (3)−Array (1) signal=Difference value H

Array (4)−Array (1) signal=Difference value I

Array (5)−Array (1) signal=Difference value J

Array (6)−Array (1) signal=Difference value K

Array (7)−Array (1) signal=Difference value L

Array (8)−Array (1) signal=Difference value M

In the configuration shown in FIG. 7, Arrays (2) through (8) are the sense lines 33, and Array (1) is the sub sense line 34. As a result of the adding operations performed by the adding section 46, the signal of Array (1) (noise signal) is removed from each of the signals of Arrays (2) through (8). Accordingly, each output signal supplied from the adding section 46 is such a signal from which a noise signal included in the sense line 33 has been removed. Thus, it is possible to provide a signal value derived from a touch operation itself, which signal value is generated in response to the touch operation. Each output signal of the adding section 46, from which the noise signal has been removed, is outputted to the coordinates detecting section 42 in the touch panel controller 4. Namely, the signals derived from the touch operation itself are outputted to the coordinates detecting section 42 (F608).

As described above, the touch panel system 1b obtains a difference signal value between sense lines 33 adjacent to each other. Namely, a difference is found between the adjacent sense lines 33, which have a higher correlation in terms of noise. Furthermore, from an output signal supplied from each sense line 33, a signal (noise signal) of the sub sense line 34 is removed. Therefore, as compared with the touch panel systems 1 and 1a of Embodiments 1 and 2, the touch panel system 1b can remove a noise more reliably.

In addition, according to the touch panel system 1b, the adding section 46 sequentially performs adding operations from the sub sense line 34 side (i.e., in the order of increasing distance between a sense line involved in a certain adding operation and the sub-sense line 34). Therefore, it is possible to remove a noise by performing the adding operations in such a manner that a result of an adding operation is used in a next adding operation.

Embodiment 4

Figure 9:
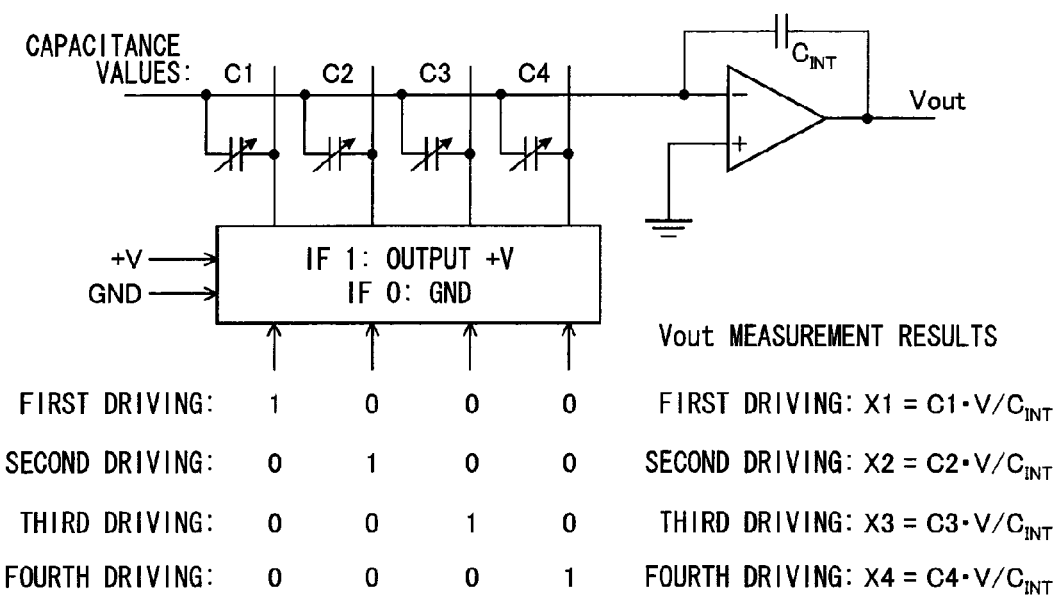
FIG. 9 is a view illustrating a driving method of a touch panel which driving method is employed in a conventional touch panel system.
Figure 10:
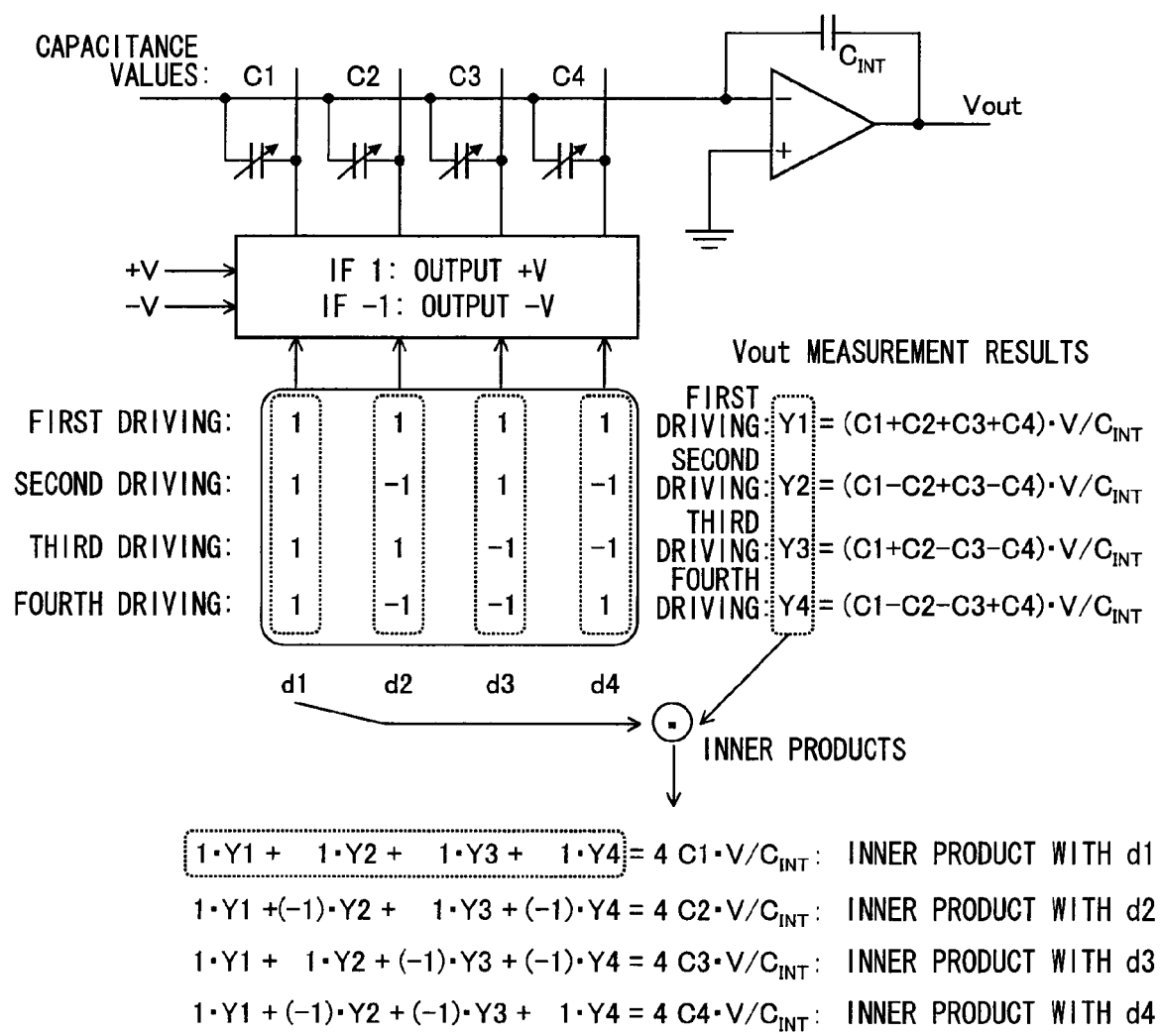
FIG. 10 is a view illustrating a driving method (orthogonal sequence driving method) of a touch panel which driving method is employed in a touch panel system of the present invention.

A driving method of a touch panel system of the present invention is not particularly limited. Preferably, the driving method is an orthogonal sequence driving method. In other words, drive lines 35 are preferably parallel driven. FIG. 9 is a view illustrating a driving method of a touch panel which driving method is employed in a conventional touch panel system. FIG. 10 is a view illustrating a driving method (orthogonal sequence driving method) of a touch panel which driving method is employed in a touch panel system of the present invention.

FIG. 9 shows one sense line extracted from the touch panel and provided with four sensors. As shown in FIG. 9, the conventional touch panel system drives drive lines in the following manner: +V volt is applied to a drive line which is to be driven, so that the drive lines are driven sequentially.

Specifically, in the first drive line driving, +V volt is applied to the leftmost sensor. This gives the first Vout measurement result (X1) expressed by:

$$X1 = C1 \times V/Cint$$

Similarly, in the second drive line driving, +V volt is applied to the second sensor from the left. This gives the second Vout measurement result (X2) expressed by:

$$X2 = C2 \times V/Cint$$

In the third drive line driving, +V volt is applied to the third sensor from the left. This gives the third Vout measurement result (X3) expressed by:

$$X3 = C3 \times V/Cint$$

In the fourth drive line driving, +V volt is applied to the rightmost sensor. This gives the fourth Vout measurement result (X4) expressed by:

$$X4 = C4 \times V/Cint$$

FIG. 10 shows, as well as FIG. 9, one sense line extracted from the touch panel and provided with four sensors. As shown in FIG. 10, according to the orthogonal sequence driving method, drive lines are driven in such a manner that +V volt or −V volt is applied to all the drive lines. Namely, according to the orthogonal sequence driving method, the drive lines are parallel driven.

Specifically, in the first drive line driving, +V volt is applied to all the sensors. This gives the first Vout measurement result (Y1) expressed by:

$$Y1 = (C1+C2+C3+C4) \times V/Cint$$

In the second drive line driving, +V volt is applied to the leftmost sensor, −V volt is applied to the second sensor from the left, +V volt is applied to the third sensor from the left, and −V volt is applied to the rightmost sensor. This gives the second Vout measurement result (Y2) expressed by:

$$Y2 = (C1-C2+C3-C4) \times V/Cint$$

In the third drive line driving, +V volt is applied to the leftmost sensor, +V volt is applied to the second sensor from the left, −V volt is applied to the third sensor from the left, and −V volt is applied to the rightmost sensor. This gives the third Vout measurement result (Y3) expressed by:

$$Y3 = (C1+C2-C3-C4) \times V/Cint$$

In the fourth drive line driving, +V volt is applied to the leftmost sensor, −V volt is applied to the second sensor from the left, −V volt is applied to the third sensor from the left, and +V volt is applied to the rightmost sensor. This gives the fourth Vout measurement result (Y4) expressed by:

$$Y4 = (C1-C2-C3+C4) \times V/Cint$$

According to the configuration shown in FIG. 10, capacitance values (C1, C2, C3, C4) can be obtained by an inner product calculation of (i) output sequences (Y1, Y2, Y3, Y4) and (ii) orthogonal codes di. Such the formula is established due to orthogonality of the orthogonal code di. Here, the code di indicates codes of positive and/or negative voltages applied to a respective drive line. Specifically, the code d1 indicates codes of voltages applied to the leftmost sensor, and is expressed as "+1, +1, +1, +1". The code d2 indicates codes of voltages applied to the second sensor from the left, and is expressed as "+1, −1, +1, −1". The code d3 indicates codes of voltages applied to the third sensor from the left, and is expressed as "+1, +1, −1, −1". The code d4 indicates codes of voltages applied to the leftmost sensor, and is expressed as "+1, −1, −1, +1".

The values of C1, C2, C3, C4 are found by inner product calculations of (i) the output sequences Y1, Y2, Y3, Y4 and (ii) the codes d1, d2, d3, d4 as follows:

$$C1 = 1 \times Y1 + 1 \times Y2 + 1 \times Y3 + 1 \times Y4 = 4C1 \times V/Cint$$

$$C2 = 1 \times Y1 + (-1) \times Y2 + 1 \times Y3 + (-1) \times Y4 = 4C2 \times V/Cint$$

$$C3 = 1 \times Y1 + 1 \times Y2 + (-1) \times Y3 + (-1) \times Y4 = 4C3 \times V/Cint$$

$$C4 = 1 \times Y1 + (-1) \times Y2 + (-1) \times Y3 + (-1) \times Y4 = 4C3 \times V/Cint$$

Figure 11:
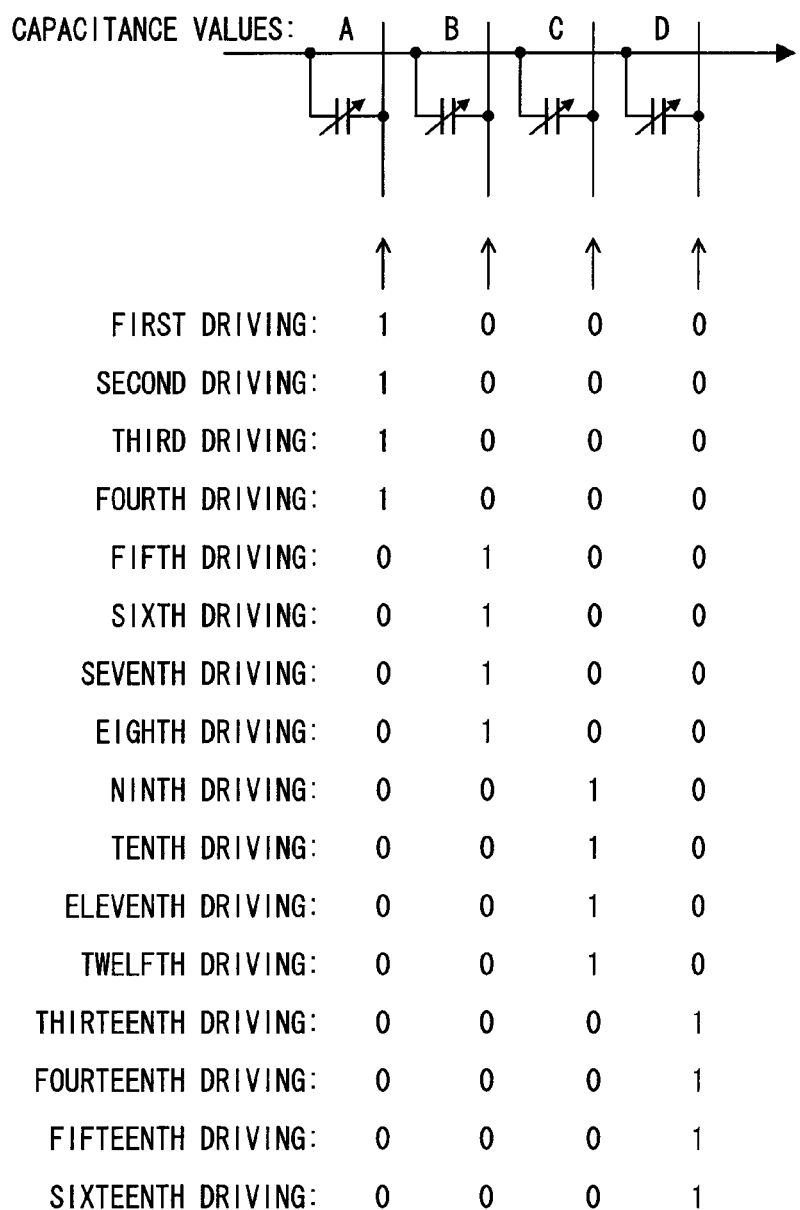
FIG. 11 is a view illustrating a process which needs to be performed by the touch panel employing the driving method of FIG. 9 in order to achieve sensitivity equivalent to that of the touch panel employing the driving method of FIG. 10.

Thus, due to the orthogonality of the code di, Ci is obtained by an inner product calculation of the code di and the output sequence Yi. Now, the result thus obtained is compared with the result obtained by the conventional driving method shown in FIG. 9. In a case where the orthogonal sequence driving method and the conventional driving method perform the same number of driving operations, the orthogonal sequence driving method allows detection of values four times greater than those of the conventional driving method. FIG. 11 is a view illustrating a process which needs to be performed by the touch panel of the driving method of FIG. 9 in order that it achieves sensitivity equivalent to that of the touch panel of the driving method of FIG. 10. As shown in FIG. 11, in order that the driving method of FIG. 9 achieves the sensitivity equivalent to that given by the driving method of FIG. 10, the driving method of FIG. 9 needs to drive a certain drive line four times and to sum the results. Namely, according to the driving method of FIG. 9, a driving period for the drive lines is four times longer than that of the driving method of FIG. 10. Conversely, with a driving period for the drive lines which driving period is reduced to one-quarter of that of the driving method shown in FIG. 9, the driving method shown in FIG. 10 achieves sensitivity equivalent to that given by the conventional driving method shown in FIG. 9. Thus, according to the driving method shown in FIG. 10, it is possible to reduce power consumption of the touch panel system.

Figure 12:
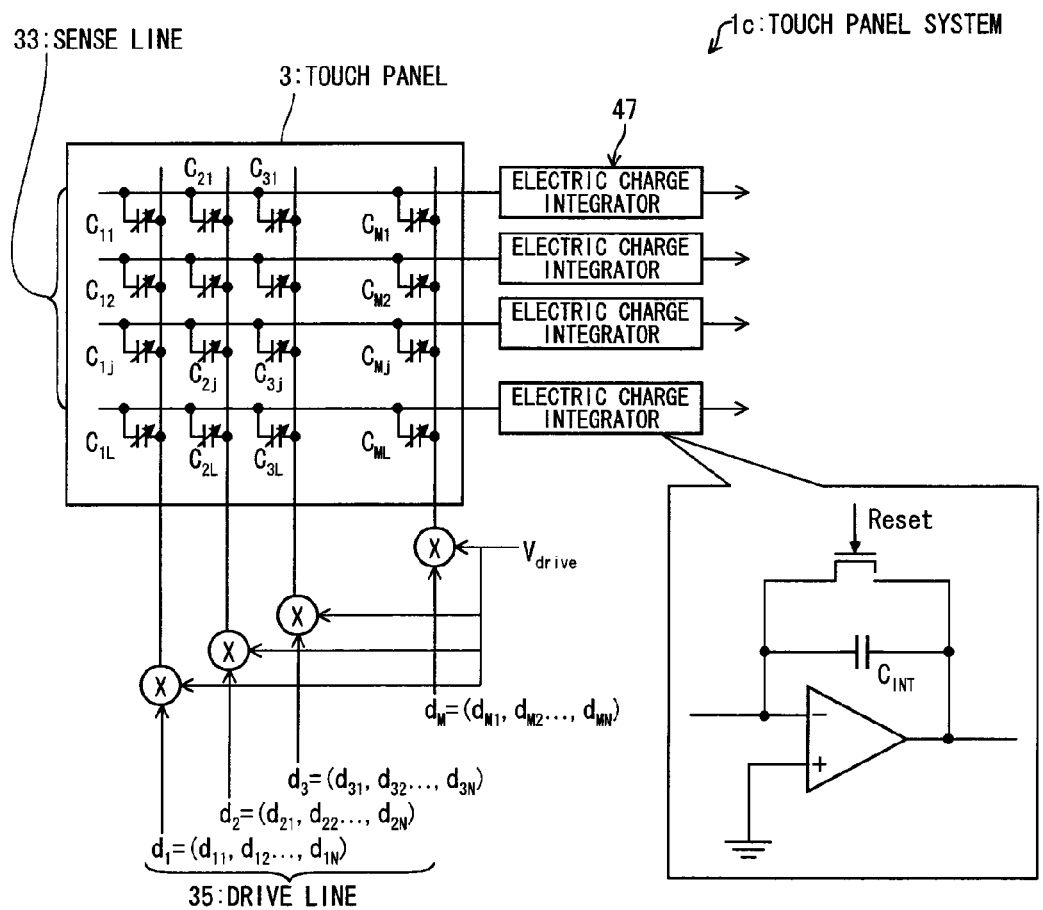
FIG. 12 is a view schematically illustrating another touch panel system according to the present invention, said another touch panel system including a touch panel driven by the orthogonal sequence driving method.

FIG. 12 is a view schematically illustrating a touch panel system 1c including a touch panel 3 driven by such the orthogonal sequence driving method. Specifically, the touch panel system 1c of FIG. 12 is shown with drive lines and sense lines, which correspond to the generalized four drive lines and one sense line of FIG. 10.

Specifically, the touch panel system 1c includes M drive lines 35, L sense lines 33 (each of M and L is a natural number), and capacitances which are formed between the drive lines 35 and the sense lines 33 so as to be arranged in a matrix. The touch panel system 1c performs the following operation: with respect to a matrix Cij (i=1, ..., j=1, ..., L) of these capacitances, the code di=(di1, ..., diN) (i=1, ..., M) is used, which is constituted by "+1" and "−1" being orthogonal to each other and each having a code length N.

Consequently, all the M drive lines 35 are driven concurrently in parallel, while applying +V volt in a case of "+1" and applying −V volt in a case of "−1". Further, a capacitance value Cij is estimated by an inner product calculation "di·sj= (k=1, . . . , N)dik·sjk", i.e., an inner product calculation of (i) an output sequence sj=(sj1, . . . , sjN) (j=1, . . . , L) read from each sense line 33 and (ii) the code di. In order to perform such the inner product calculation, the touch panel system 1c includes an electric charge integrator (decoding section) 47. A strength of an output signal (Vout) supplied from the electric charge integrator 47 is found by:

$$V\text{out}=Cf \times V\text{drive} \times N/C\text{int}$$

The output sequence sj is expressed as follows:

$$sj = (sj1, \ldots, sjN)$$
$$= (\Sigma(k = 1, \ldots, M)Ckj \times dk1, \ldots, \Sigma(k = 1, \ldots, M)Ckj \times dkn) \times (V\text{drive}/C\text{int})$$
$$= (\Sigma(k = 1, \ldots, M)Ckj \times (dk1, \ldots, dkN) \times (V\text{drive}/C\text{int})$$
$$= \Sigma(k = 1, \ldots, M)(Ckj \times dk1) \times \times (V\text{drive}/C\text{int})$$

The inner product of the code di and the output sequence sj is expressed as follows:

$$di \cdot si = di \cdot (\Sigma(k = 1, \ldots, M)(Ckj \times dk) \times (V\text{drive}/C\text{int}))$$
$$= \Sigma(k = 1, \ldots, M)(Ckj \times di \times dk) \times (V\text{drive}/C\text{int})$$
$$= \Sigma(k = 1, \ldots, M)(Ckj \times N \times \delta ik) \times (V\text{drive}/C\text{int})$$
$$[\delta ik = 1, \text{ if } i = k, 0 \text{ if else}]$$
$$= Cij \times N \times (V\text{drive}/C\text{int})$$

Thus, according to the touch panel system 1c, the touch panel 3 is driven by the orthogonal sequence driving method. Therefore, the following generalization is possible: By finding an inner product of the code di and the output sequence sj, a signal of the capacitance Cij is multiplied by N (code length). This driving method provides an effect that a signal strength of a capacitance is N-folded, regardless of the number of drive lines 35 (i.e., "M"). Conversely, by employing the orthogonal sequence driving method, sensitivity equivalent to that given by the conventional driving method shown in FIG. 9 can be achieved with a driving period for the drive lines which period is reduced to one-Nth of that of the driving method shown in FIG. 9. Namely, employing the orthogonal sequence driving method can reduce the number of times that the drive lines should be driven. This makes it possible to reduce power consumption of the touch panel system 1c.

Embodiment 5

Figure 13:
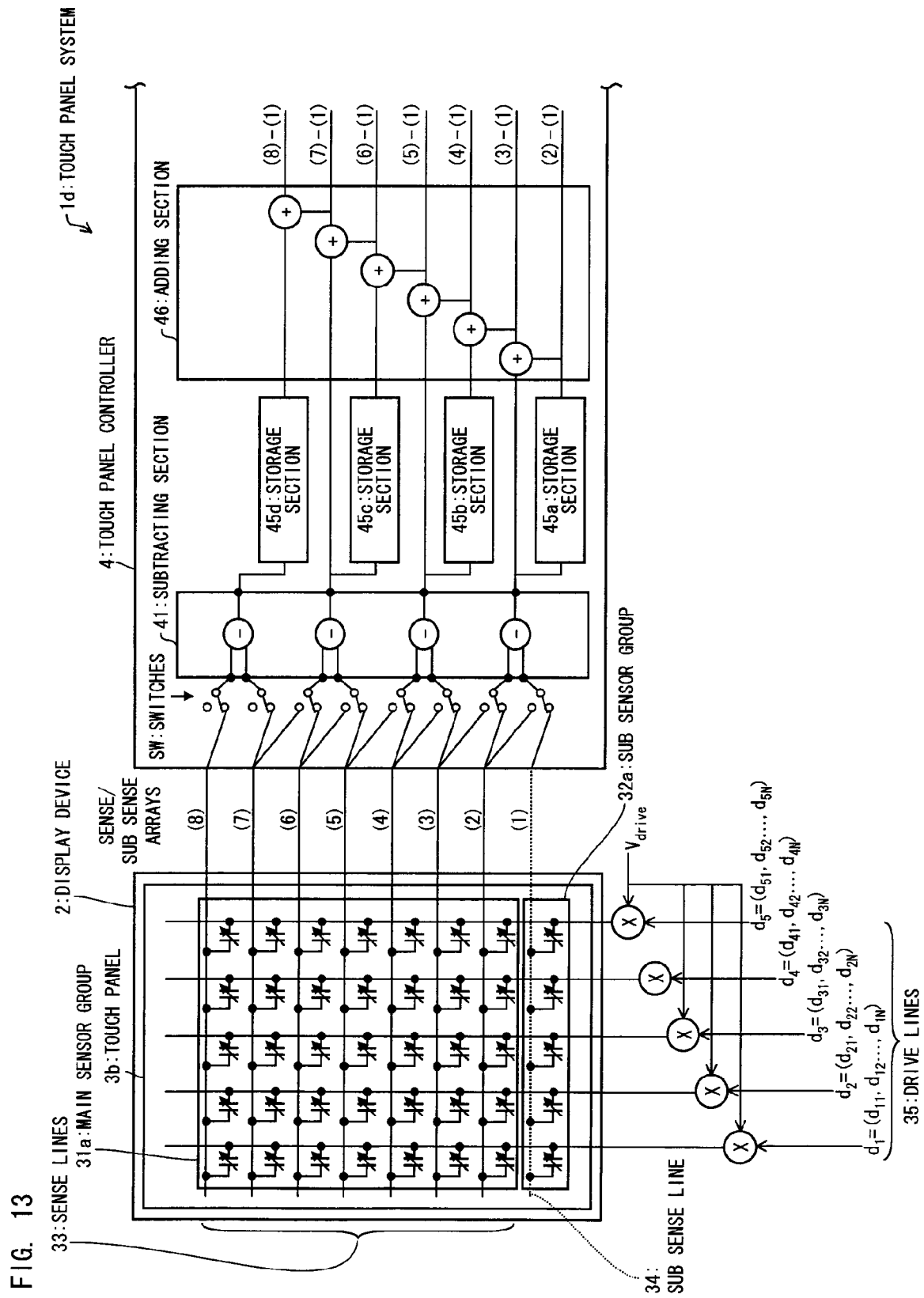
FIG. 13 is a view schematically illustrating a basic configuration of a touch panel system according to another embodiment of the present invention.

FIG. 13 is a view schematically illustrating a basic configuration of a touch panel system 1d according to the present embodiment. The touch panel system 1d is configured by employing, in the touch panel system 1b with the noise canceling function shown in FIG. 7, the orthogonal sequence driving method for the drive lines 35 which is shown in FIGS. 10 and 12 and which is employed in the touch panel system 1c. Since the touch panel system 1d operates in the same manner as the above-described touch panel systems 1b and 1c, explanations thereof are omitted here.

According to the touch panel system 1d, a difference signal value is found between sense lines 33 which are adjacent to each other. Namely, a difference is found between the adjacent sense lines 33, which have a higher correlation in terms of noise. Furthermore, from an output signal supplied from each sense line 33, a signal (noise signal) of a sub sense line 34 is removed. Therefore, as compared with the touch panel systems 1 and 1a of Embodiments 1 and 2, the touch panel system 1d can remove a noise more reliably. Moreover, a signal of a capacitance Cij is multiplied by N (code length). This allows a capacitance to have an N-folded signal strength, regardless of the number of drive lines 35. In addition, since the orthogonal sequence driving method is employed, sensitivity equivalent to that given by the conventional driving method shown in FIG. 9 can be achieved with a driving period for the drive lines which period is reduced to one-Nth of that of the driving method shown in FIG. 9. Namely, employing the orthogonal sequence driving method can reduce the number of times that the drive lines should be driven. This makes it possible to reduce power consumption of the touch panel system 1d.

Embodiment 6

Figure 14:
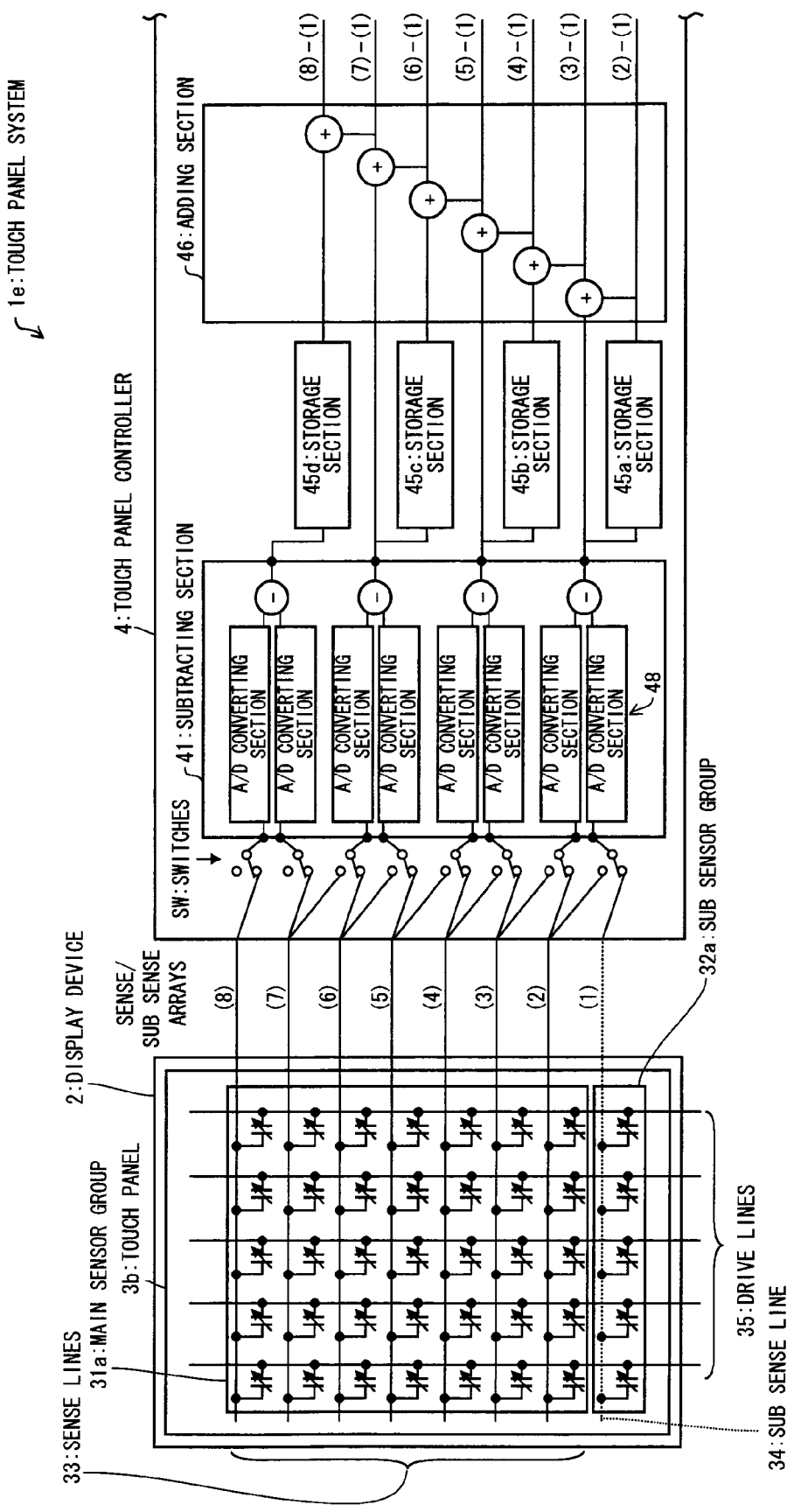
FIG. 14 is a view schematically illustrating a basic configuration of another touch panel system according to the present invention.

FIG. 14 is a view schematically illustrating a basic configuration of a touch panel system 1e according to the present embodiment. The touch panel system 1e includes a subtracting section 41 having a different configuration.

Each of output signals supplied from a sense line 33 and a sub sense line 34 of a touch panel 3b is an analog signal. Therefore, the subtracting section 41 includes an analog-to-digital converting section (third analog-to-digital converting section) 48 and a digital subtracter (not illustrated).

With this configuration, output signals (analog signals) supplied from the touch panel 3b are converted into digital signals by the analog-to-digital converting section 48 of the subtracting section 41. The digital subtracter performs, by use of the digital signals thus converted, subtracting operations in the same manner as in the touch panel system 1b shown in FIG. 7.

Thus, the touch panel system 1e can remove a noise by (i) converting, into digital signals, analog signals outputted by the touch panel 3b and thereafter (ii) performing subtracting operations.

Embodiment 7

Figure 15:
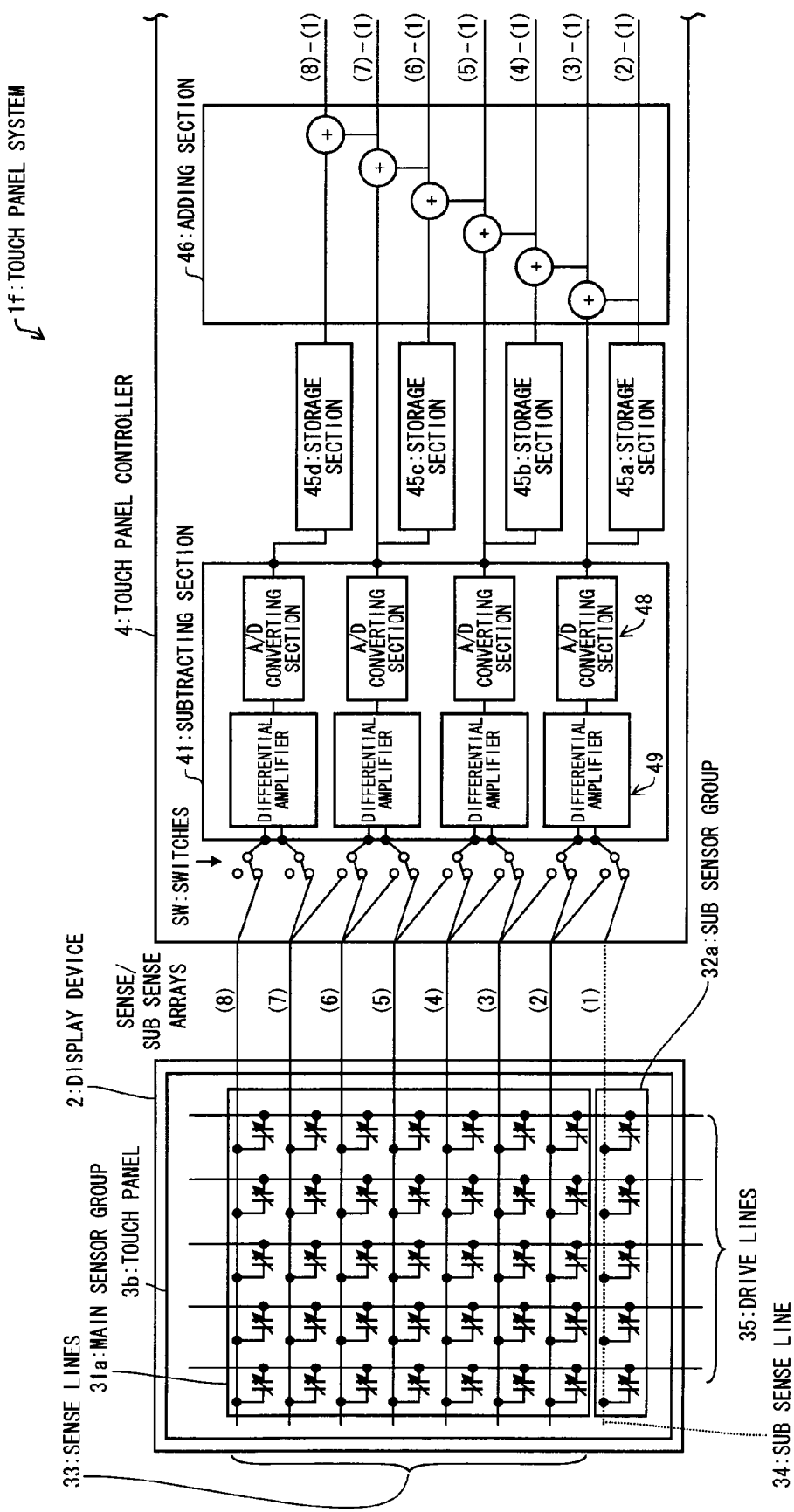
FIG. 15 is a view schematically illustrating a basic configuration of another touch panel system according to the present invention.

FIG. 15 is a view schematically illustrating a basic configuration of a touch panel system 1f according to the present embodiment. The touch panel system 1f includes a subtracting section 41 having a different configuration.

Output signals supplied from a sense line 33 and a sub sense line 34 of a touch panel 3b are analog signals. Therefore, the subtracting section 41 includes a differential amplifier 49 and an analog-to-digital converting section 48.

With this configuration, in the same manner as in the touch panel system 1b shown in FIG. 7, the differential amplifier 49 performs subtracting operations on output signals (analog signals) supplied from the touch panel 3b, without converting the analog signals into digital signals. The analog-to-digital converting section 48 (fourth analog-to-digital converting section) converts, into a digital signal, an analog signal thus obtained by the subtracting operations.

Thus, the touch panel system 1f can remove a noise by (i) performing subtracting operations on analog signals outputted by the touch panel 3b, without converting the analog

Embodiment 8

Figure 16:
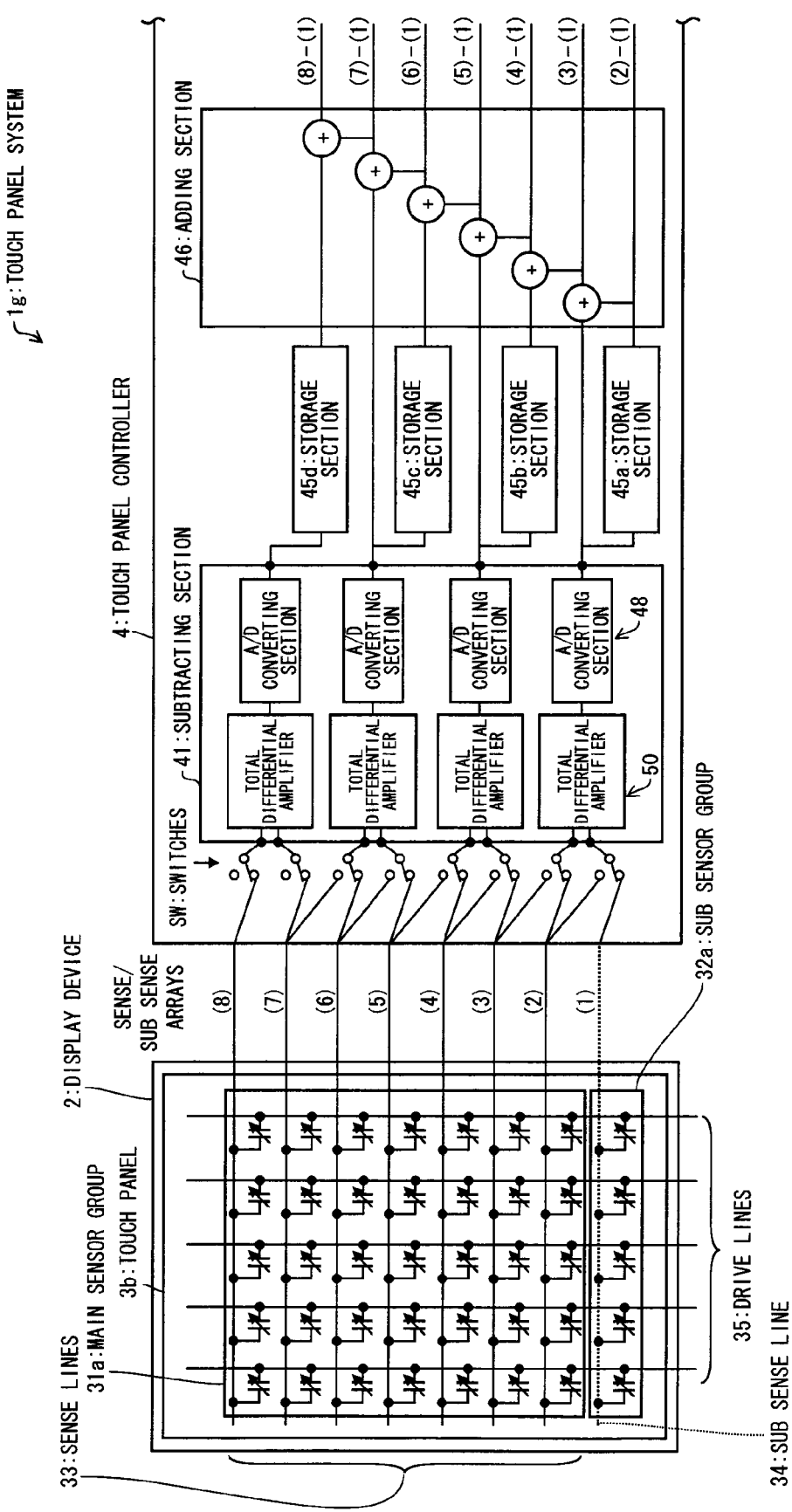
FIG. 16 is a view schematically illustrating a basic configuration of another touch panel system according to the present invention.

FIG. 16 is a view schematically illustrating a basic configuration of a touch panel system 1g according to the present embodiment. The touch panel system 1g includes a subtracting section 41 having a different configuration. The touch panel system 1g includes a total differential amplifier 50 instead of the differential amplifier 49 in the touch panel system if shown in FIG. 15.

Output signals supplied from sense lines 33 and a sub sense line 34 of a touch panel 3b are analog signals. Therefore, the subtracting section 41 includes a total differential amplifier 50 and an analog-to-digital converting section 48.

With this configuration, in the same manner as in the touch panel system 1b shown in FIG. 7, the total differential amplifier 50 performs subtracting operations on output signals (analog signals) supplied from the touch panel 3b, without converting the analog signals into digital signals. The analog-to-digital converting section 48 converts, into a digital signal, an analog signal thus obtained by the subtracting operations.

Figure 17:
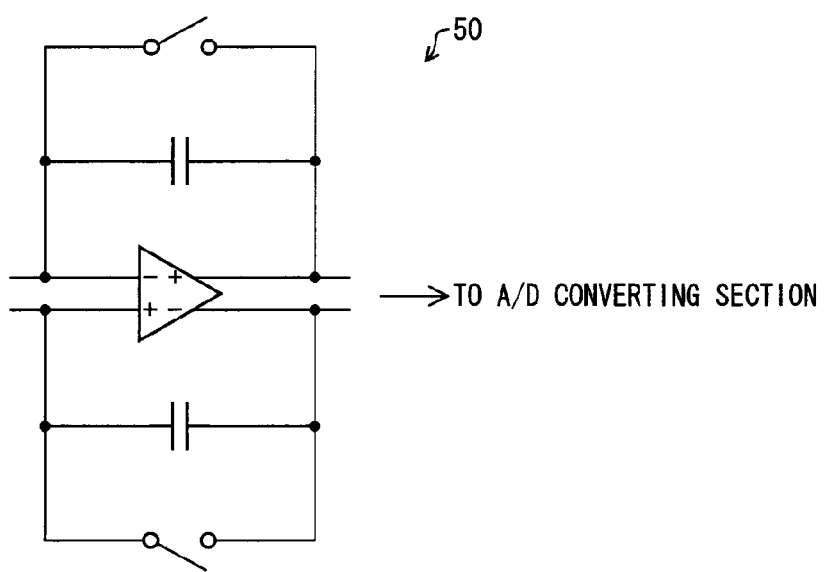
FIG. 17 is a circuit diagram showing one example of a total differential amplifier included in the touch panel system shown in FIG. 16.

FIG. 17 is a circuit diagram illustrating one example of the total differential amplifier 50. The total differential amplifier 50 includes two pairs each including a capacitance and a switch, the two pairs being arranged so as to be symmetric to each other with respect to a differential amplifier. Specifically, a non-inverting input terminal (+) and an inverting input terminal (−) of the differential amplifier are supplied with signals from sense lines 33 which are adjacent to each other. A capacitance (feedback capacitance) is provided between an inverting output terminal (−) and the non-inverting input terminal (+) of the differential amplifier so that the capacitance is connected with the inverting output terminal (−) and the non-inverting input terminal (+), and another capacitance (feedback capacitance) is provided between a non-inverting output terminal (+) and the inverting input terminal (−) of the differential amplifier so that said another capacitance is connected with the non-inverting output terminal (+) and the inverting input terminal (−), these capacitances having the same capacitance value. Furthermore, a switch is provided between the inverting output terminal (−) and the non-inverting input terminal (+) so that the switch is connected with the inverting output terminal (−) and the non-inverting input terminal (+), and another switch is provided between the non-inverting output terminal (+) and the inverting input terminal (−) so that said another switch is connected with the non-inverting output terminal (+) and the inverting input terminal (−).

Thus, the touch panel system 1g can remove a noise by (i) performing subtracting operations on analog signals outputted by the touch panel 3b, without converting the analog signals into digital signals, and thereafter (ii) converting the resulting signal into a digital signal.

Embodiment 9

Figure 18:
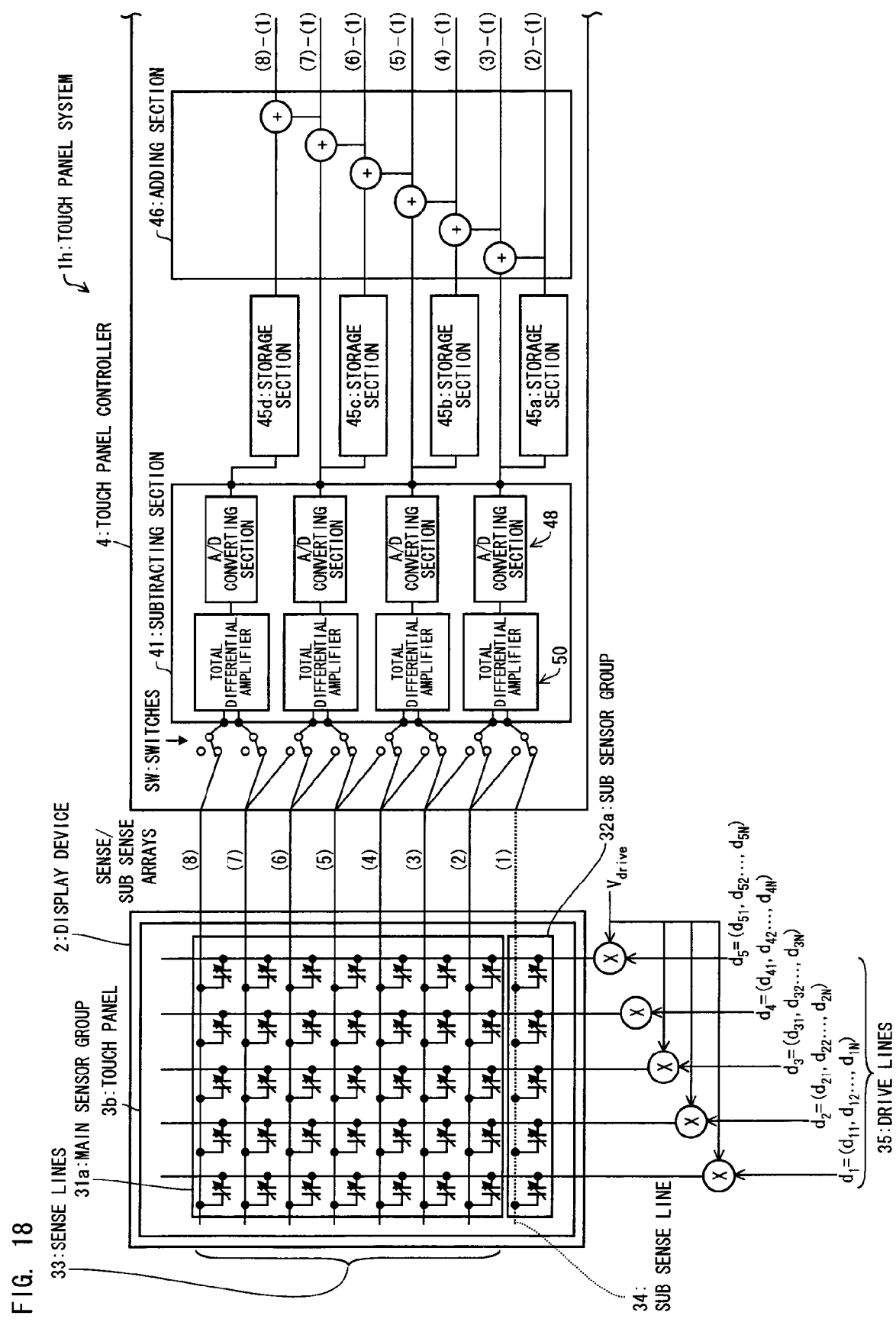
FIG. 18 is a view schematically illustrating a basic configuration of another touch panel system according to the present invention.
Figure 19:
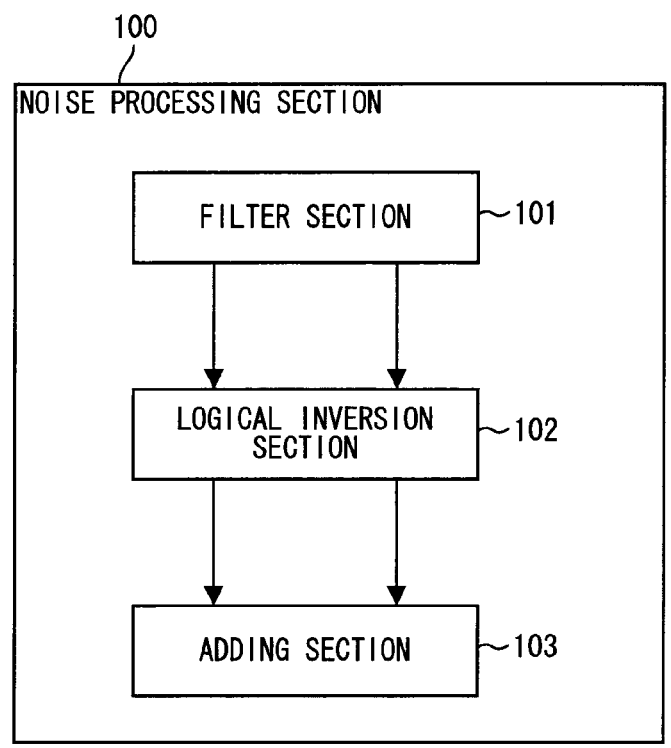
FIG. 19 is a block diagram illustrating a noise processing section provided in a touch panel system of the publicly known document 1.

FIG. 18 is a view schematically illustrating a basic configuration of a touch panel system 1h according to the present embodiment. The touch panel system 1h includes a subtracting section 41 having a different configuration and involves a different driving method of a touch panel 3b. The touch panel system 1h includes a total differential amplifier 50 instead of the differential amplifier 49 in the touch panel system if shown in FIG. 15.

Output signals supplied from sense lines 33 and a sub sense line 34 of the touch panel 3b are analog signals. Therefore, the subtracting section 41 includes a total differential amplifier 50 and an analog-to-digital converting section 48.

With this configuration, in the same manner as in the touch panel system 1b shown in FIG. 7, the total differential amplifier 50 performs subtracting operations on output signals (analog signals) supplied from the touch panel 3b, without converting the analog signals into digital signals. The analog-to-digital converting section 48 converts, into a digital signal, an analog signal thus obtained by the subtracting operations.

Further, the touch panel system 1h employs, as a driving method for the touch panel 3b, the orthogonal sequence driving method shown in FIGS. 10, 12, and 13. According to this configuration, as shown in FIG. 10, a voltage for driving four drive lines is applied as follows: In the second driving through the fourth driving, +V is applied twice and −V is also applied twice, i.e., the number of times of application of +V is equal to that of −V. On the other hand, in the first driving, +V is applied four times. Accordingly, an output value of an output sequence Y1 of the first driving is greater than that of each of output sequences Y2 through Y4 of the second driving through the fourth driving. Therefore, applying a dynamic range to the output value of any of the output sequences Y2 through Y4 of the second driving through the fourth driving causes saturation of the output sequence Y1 of the first driving.

In order to address this, the subtracting section 41 of the touch panel system 1h includes the total differential amplifier 50. Further, employed as the total differential amplifier 50 is the one whose input common-mode voltage range is rail to rail. Namely, the total differential amplifier 50 has a wide common-mode input range. Consequently, the total differential amplifier 50 can operate in a voltage range from a power source voltage (Vdd) to GND. Furthermore, a difference between input signals supplied to the total differential amplifier 50 is amplified. Therefore, regardless of the type of the orthogonal sequence driving method employed in the touch panel 3b which is combined with the touch panel system 1h, an output signal from the total differential amplifier 50 is free from the problem of output saturation. Note that one example of the total differential amplifier 50 is as previously described with reference to FIG. 17.

Thus, the touch panel system 1h can remove a noise by (i) performing subtracting operations on analog signals outputted by the touch panel 3b, without converting the analog signals into digital signals, and thereafter (ii) converting the resulting signal into a digital signal. Furthermore, since the touch panel system 1h includes the total differential amplifier 50 capable of rail-to-rail operation, an output signal from the total differential amplifier 50 is free from the problem of output saturation.

Embodiment 10

In Embodiments 1 through 9, a touch panel system provided with a sub sensor 32 (sub sense line 34) has been described. However, for a touch panel system of the present invention, the sub sensor 32 is not essential. In the present embodiment, a touch panel system not provided with a sub sensor 32 will be described.

Figure 20:
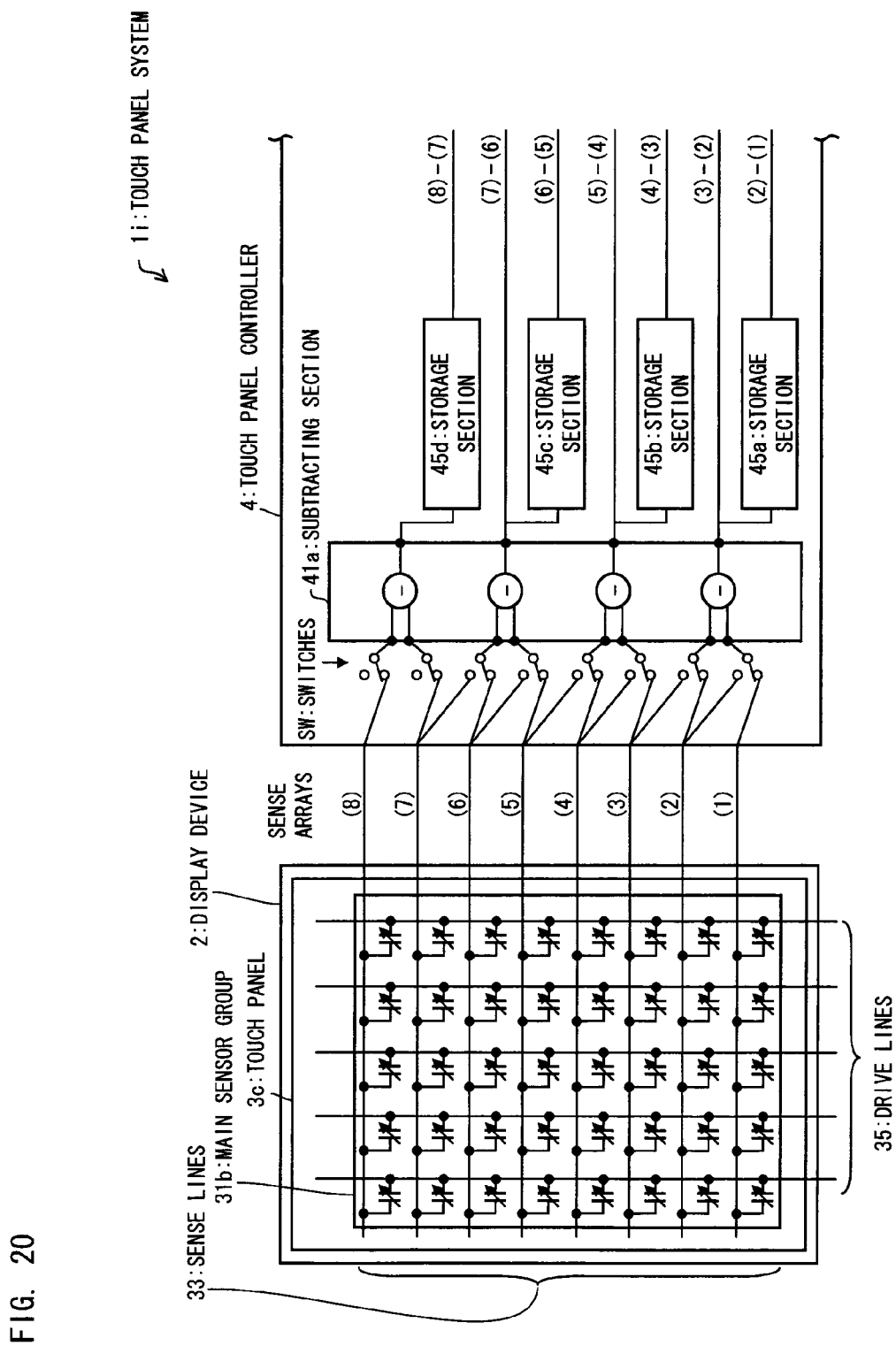
FIG. 20 is a view schematically illustrating a basic configuration of another touch panel system according to the present invention.

FIG. 20 is a view schematically illustrating a basic configuration of a touch panel system 1i of the present embodiment. The touch panel system 1i includes a subtracting section 41a for finding a difference signal of sense lines 33 adjacent to each other.

More specifically, a touch panel 3c includes a plurality of (in FIG. 20, five) drive lines 35 and a plurality of (in FIG. 20, eight) sense lines 33 intersecting the drive lines 35. The sense lines 33 and the drive lines 35 are isolated from each other, and the sense lines 33 and the drive lines 35 are coupled to each other via capacitances.

A touch panel controller 4 includes switches SW, the subtracting section 41a, storage sections 45a through 45d, which are arranged in this order from an input-receiving side of the touch panel controller 4. Note that the touch panel controller 4 also includes a coordinates detecting section 42 (not illustrated) and a CPU 43 (not illustrated) (see FIG. 1).

The subtracting section 41a includes input terminals (input terminals for outputs of main sensors) for receiving signals outputted by main sensors 31. The subtracting section 41a receives the signals from the main sensors 31. Then, the subtracting section 41a subtracts one of adjacent sense lines 33 from the other of the adjacent sense lines 33, so as to find a difference value (difference signal). The signal thus obtained as a result of the subtracting operation by the subtracting section 41a is outputted to the coordinates detecting section 42 (see FIG. 1).

Thus, the touch panel system 1i differs from the touch panel systems of the above-described embodiments in terms of that the touch panel system 1i is not provided with a sub sensor 32 (sub sense line 34) and the subtracting section 41a performs a different operation.

The switches SW select, from signals supplied from the sense lines 33, signals to be supplied to the subtracting section 41a. More specifically, each of the switches SW includes two terminals (upper and lower terminals), and selects one of the upper and lower terminals. FIG. 20 shows a state where the switches SW select the lower terminals.

The subtracting section 41a performs difference signal operations on, out of signals supplied from Arrays (1) through (8), signals selected by the switches SW. Specifically, the subtracting section 41a performs a difference signal operation between sense lines 33 which are adjacent to each other. For example, in a case where the switches SW select the lower terminals as shown in FIG. 20, the subtracting section 41a performs the following signal operations: Array (8)−Array (7); Array (6)−Array (5); Array (4)−Array (3); and Array (2)−Array (1). On the other hand, in a case where the switches SW select the upper terminals (not illustrated), the subtracting section 41a performs the following difference signal operations: Array (7)−Array (6); Array (5)−Array (4); and Array (3)−Array (2).

In a case where each of the switches SW selects one of the upper and lower terminals, the storage sections 45a through 45d store signals (difference operation signals) obtained by the difference operations performed by the subtracting section 41a. On the other hand, in a case where each of the switches SW selects the other one of the upper and lower terminals, difference operation signals are directly outputted, not via the storage sections 45a through 45d.

(2) Noise Processing Performed by Touch Panel System

Figure 21:
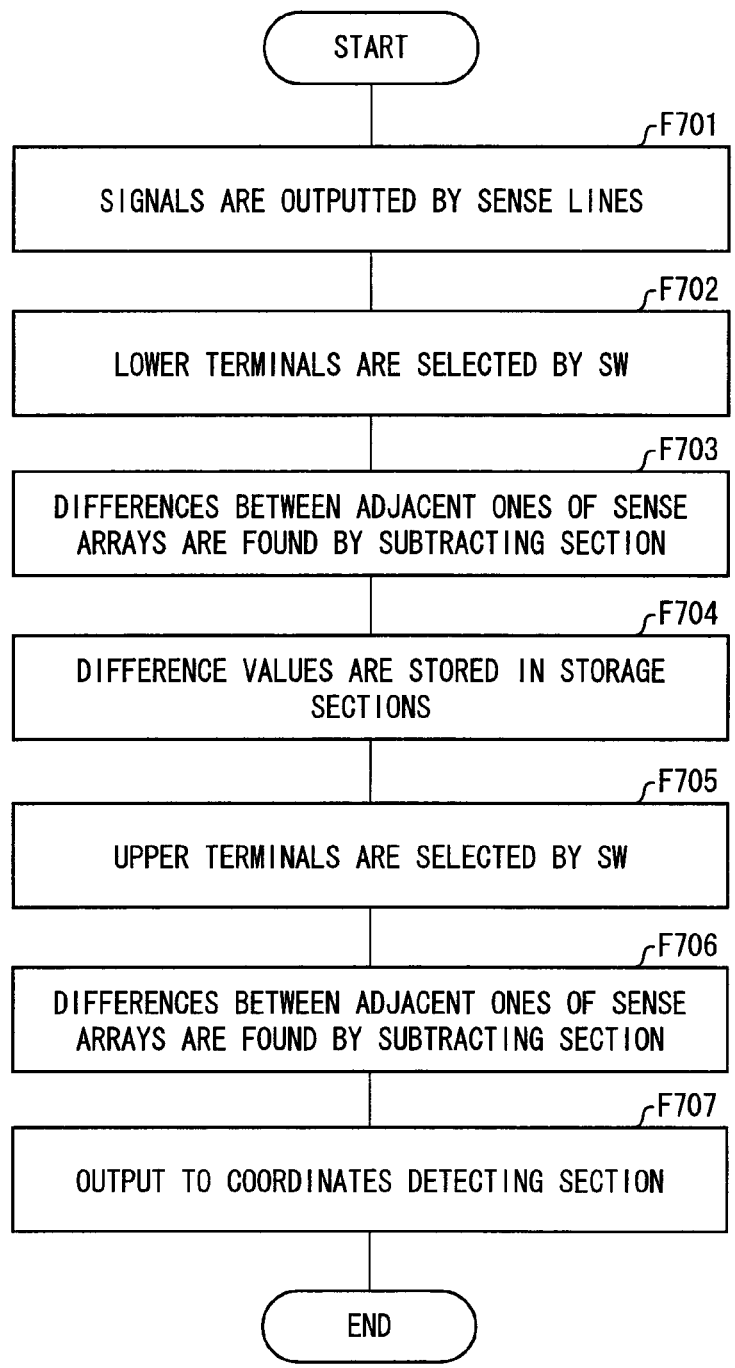
FIG. 21 is a flow chart illustrating a basic process of the touch panel system shown in FIG. 20.

With reference to FIGS. 20 and 21, the following will describe noise processing performed by the touch panel system 1i. FIG. 21 is a flow chart illustrating a noise canceling process, which is a basic process of the touch panel system 1i.

Upon activation of the touch panel system 1i, the drive line 35 is supplied with an electric potential at a certain interval. The user's performing a touch operation on the touch panel 3c changes a capacitance of a specific sense line 33 corresponding to the touched position. Namely, the user's performing the touch operation on the touch panel 3c changes a value of an output signal supplied from that sense line 33. The touch panel system 1i outputs, to the touch panel controller 4, output signals from the sense lines 33, while driving the drive lines 35. Thus, while driving the drive lines 35, the touch panel system 1i detects a change in the capacitance of the sense line 33, so as to determine the presence or absence of a touch operation and a touched position.

To be more specific, a noise such as a clock generated in the display device 2 and other noises coming from the outside are reflected in the touch panel 3c. Therefore, a main sensor group 31b detects various kinds of noise components. Specifically, the output signal supplied from the sense line 33 includes not only a signal derived from the touch operation itself but also a noise signal (noise component) (F701). Next, the switches SW select the lower terminals (F702). Then, the subtracting section 41a finds a difference (sense line (Sn+1)—sense line Sn: a first difference) between a sense line 33 (sense line Sn) and a sense line (sense line Sn+1) which is one of two sense lines 33 adjacent to the certain sense line 33 (F703).

For Arrays (1) through (8) shown in FIG. 20, the subtracting section 41a performs the following four difference signal operations:

Array (2)−Array (1) (The resulting difference value is referred to as "A".)
Array (4)−Array (3) (The resulting difference value is referred to as "C".)
Array (6)−Array (5) (The resulting difference value is referred to as "E".)
Array (8)−Array (7) (The resulting difference value is referred to as "G".)

Namely, in the step F703, the subtracting section 41a performs the difference signal operations on Arrays (1) through (8) of the sense lines 33.

The difference values A, C, E, and G found by the subtracting section 41a are stored in the storage sections 45a through 45d, respectively. Namely, the storage section 45a stores the difference value A, the storage section 45b stores the difference value C, the storage section 45c stores the difference value E, and the storage section 45d stores the difference value G (F704).

Next, the switches SW selecting the lower terminals are turned to select (close) the upper terminals (F705). Then, the subtracting section 41a performs an operation similar to that of F703. Specifically, the subtracting section 41a performs a difference signal operation (sense line Sn—sense line (Sn−1): a second difference) between the sense line 33 (sense line Sn) and a sense line (sense line Sn−1) which is the other one of the two sense lines 33 adjacent to the certain sense line 33 (F706).

For Arrays (1) through (8) shown in FIG. 20, the subtracting section 41a performs the following three difference signal operations:

Array (3)−Array (2) (The resulting difference value is referred to as "B".)
Array (5)−Array (4) (The resulting difference value is referred to as "D".)
Array (7)−Array (6) (The resulting difference value is referred to as "F".)

Namely, in the step F706, the subtracting section 41a performs the difference signal operations on Arrays (2) through (7).

As described above, the touch panel system 1i obtains a difference signal value between sense lines 33 adjacent to each other. Namely, a difference is found between the adjacent sense lines 33, which have a higher correlation in terms of noise. This removes the noise component from the output signal supplied from the main sensor group 31b, thereby extracting the signal derived from the touch operation itself. This makes it possible to reliably remove (cancel) a wide variety of noises reflected in the touch panel 3c.

Embodiment 11

Figure 22:
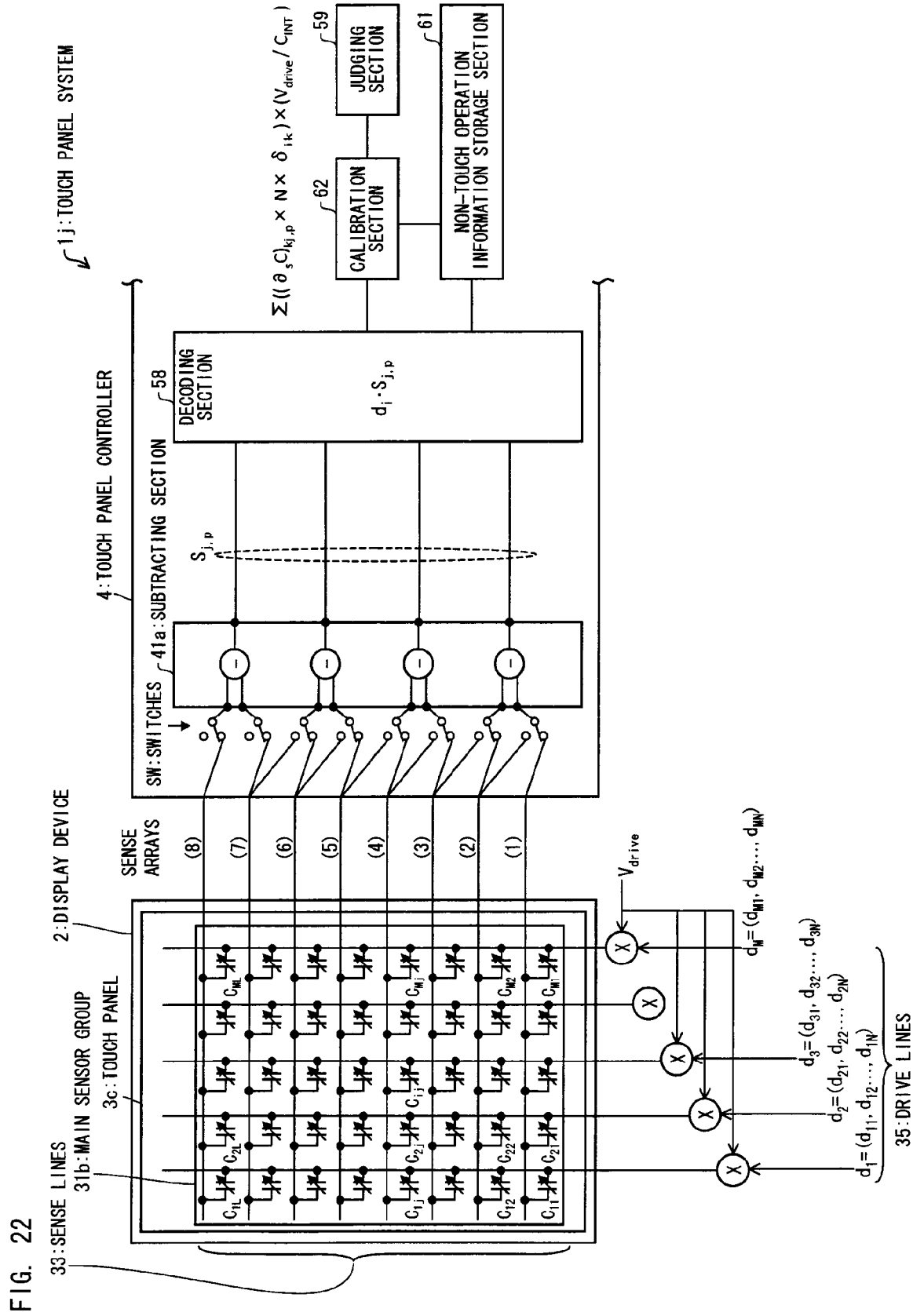
FIG. 22 is a view schematically illustrating a basic configuration of another touch panel system according to the present invention.

FIG. 22 is a view schematically illustrating a basic configuration of a touch panel system 1j of the present embodiment. The touch panel system 1j is configured by employing, in the above-described touch panel system having the noise canceling function shown in FIG. 20, a drive line driving circuit (not illustrated) for parallel driving the drive lines 35. Further, the touch panel system 1j includes (i) a decoding section 58 for decoding difference values of capacitances which difference values are found by a subtracting section 41a, (ii) a non-touch operation information storage section 61 for storing a distribution of differences between the capacitances which is obtained as a result of the decoding process by the decoding section 58 when no touch operation is performed, and (iii) a calibration section 62 for calibrating a distribution of differences between the capacitances which is obtained as a result of the decoding process by the decoding section 58 when a touch operation is performed. Since the touch panel system 1j operates in the same manner as the above-described touch panel system 1i, explanations thereof are omitted here. The following descriptions focus on processes performed by the subtracting section 41a, the decoding section 58, the non-touch operation information storage section 61, and the calibration section 62. Further, the following descriptions deal with an example where an orthogonal sequence or an M sequence is used as a code sequence for parallel driving.

Concretely, assume that a code sequence (a component is 1 or −1) for parallel driving the first drive line through the Mth drive line is as follows:

$$d_1 = (d_{11}, d_{12}, \ldots, d_{1N})$$
$$d_2 = (d_{21}, d_{22}, \ldots, d_{2N})$$
$$\vdots$$
$$d_M = (d_{M1}, d_{M2}, \ldots, d_{MN}),$$

Hereinafter, this sequence is assumed as an orthogonal sequence or an M sequence having a code length N (=$2^n-1$), having been shifted. Such the sequence has a nature of establishing the following formula:

$$d_i \cdot d_j = \sum_{k=1}^{N} d_{ik} \times d_{jk} = N \times \delta_{ij}$$

where if $d_1$ to $d_M$ is an orthogonal sequence, $\delta_{ij}=1$ if i=j, 0 if i≠j, if $d_1$ to $d_M$ is an M sequence, $\delta_{ij}=1$ if i=j, −1/N if i≠j.

A difference output sequence "$S_{j,P}$ (j=1, . . . , [L/2], P=1,2) (L indicates the number of sense lines 33, [n]=an integer part of n)" of a sense line 33 corresponding to this sequence is defined as follows:

$S_{j,i}$: An output sequence for $d_1$ through $d_M$ when the switches SW select the lower terminals.

$S_{j,2}$: An output sequence for $d_1$ through $d_M$ when the switches SW select the upper terminals.

Further, a distribution of differences "$(\partial sC)_{kj,P}$(k=1, . . . , M; j=1, . . . , [L/2]; P=1, 2)" of capacitance values in a direction of the sense lines 33 is defined as follows:

$(\partial sC)_{kj,1} = C_{k,2j} - C_{k,2j-1}$ $(\partial sC)_{kj,2} = C_{k,2j+1} - C_{k,2j}$ In this case, a difference output of capacitances in the direction of the sense lines obtained by parallel driving is as follows:

$$S_{j,p} = (s_{j1,p}, s_{j2,p}, \ldots, s_{jN,p})$$

$$= \left(\sum_{k=1}^{M}(\partial_s C)_{kj,p} \times d_{k1}, \sum_{k=1}^{N}(\partial_s C)_{kj,p} \times d_{k2}, \ldots, \sum_{k=1}^{N}(\partial_s C)_{kj,p} \times d_{kN}\right) \times (V_{drive}/C_{INT})$$

$$= \left(\sum_{k=1}^{M}(\partial_s C)_{kj,p} \times (d_{k1}, d_{k2}, \ldots, d_{kN})\right) \times (V_{drive}/C_{INT})$$

$$= \sum_{k=1}^{M}(\partial_s C)_{kj,p} \times d_k \times (V_{drive}/C_{INT})$$

The decoding section 58 decodes the difference values of the capacitances which differences value are found by the subtracting section 41a (i.e., the distribution of differences between the capacitance values in the direction of the sense lines 33). Specifically, the decoding section 58 finds an inner product of (i) the code sequence for parallel driving the drive lines 33 and (ii) the distribution of differences between the capacitance values in the direction of the sense lines 33. Therefore, an inner product value decoded by the decoding section 58 is expressed as follows:

$$d_i \cdot s_{j,p} = d_i \sum_{k=1}^{N}((\partial_s C)_{kj,P} \times d_k) \times (V_{drive}/C_{INT})$$

$$= \sum_{k=1}^{N}((\partial_s C)_{kj,P} \times d_i \cdot d_k) \times (V_{drive}/C_{INT})$$

$$= \sum_{k=1}^{N}((\partial_s C)_{kj,P} \times N \times \delta_{ik}) \times (V_{drive}/C_{INT})$$

where $d_i \cdot d_j = \sum_{k=1}^{N} d_{ik} \times d_{jk} = N \times \delta_{ij}$, and if $d_1$ to $d_M$ is an orthogonal sequence, $\delta_{ij} = 1$ if $i = j$, 0 if $i \neq j$ if $d_1$ to $d_M$ is an M sequence, $\delta_{ij} = 1$ if $i = j$, $-1/N$ if $i \neq j$.

Thus, the decoding section 58 finds, as a main component of the decoded inner product value $d_i \cdot s_{j,P}$, an N-folded distribution of differences $(\partial sC)_{kj,P}$ between the capacitance values in the direction of the sense line 33. Accordingly, by regarding an estimate value of the distribution of differences $(\partial sC)_{ij,P}$ between the capacitance values in the direction of the sense lines 33 as the inner product value $d_i \cdot s_{j,P}$, it is possible to read signal strengths of the capacitance values which signal strengths have been multiplied by N (i.e., multiplied by a code length).

Meanwhile, as described above, by defining the difference output sequence $S_{j,P}$ (P=1, 2) of the sense lines 33, a common mode noise superimposed in common on sense lines 33 adjacent to each other is canceled. This makes it possible to read a difference capacitance with a high SNR.

As described above, according to the touch panel system 1*j*, the touch panel 3*c* is parallel driven, and the decoding section 58 decodes the values of the differences between the capacitances which values are found by the subtracting section 41*a*. Consequently, signals of the capacitances are multiplied by a code length (i.e., multiplied by N). Therefore, signal strengths of the capacitances are increased, regardless of the number of drive lines 35. Further, provided that necessary signal strengths are merely equal to those of the conventional driving method shown in FIG. 9, it is possible to reduce a driving period for the drive lines 35 to one-Nth of that of the driving method shown in FIG. 9. Namely, it is possible to reduce the number of times that the drive lines 35 should be driven. This makes it possible to reduce power consumption of the touch panel system 1*j*.

Preferably, the touch panel system 1*j* is configured such that the calibration section 62 subtracts (i) differences between respective pairs of the sense lines 33 adjacent to each other (=a distribution of difference values in the entire touch panel) which differences are found when no touch operation is performed from (ii) differences between the respective pairs of the sense lines 33 adjacent to each other (i.e., a distribution of difference values in the entire touch panel 3*c*) which differences are found when a touch operation is performed. Namely, it is preferable that (i) such the difference signal operation is performed before and after a touch operation and (ii) subtraction is performed between difference value signals obtained before and after the touch operation. For example, the non-touch operation information storage section 61 stores an estimated value of a distribution of differences $(\partial sC)_{kj,P}$ found in an initial state where no touch operation is performed (when no touch operation is performed). Then, the calibration section 62 subtracts (i) the estimated value of the distribution of the differences $(\partial sC)_{kj,P}$ found when no touch operation is performed, which estimated value is stored in the non-touch operation information storage section 61, from (ii) an estimated value of a distribution of differences $(\partial sC)_{kj}$ found when a touch operation is performed. Thus, the calibration section 62 subtracts (i) the distribution of the differences between capacitances found when no touch operation is performed which distribution is stored in the non-touch operation information storage section from (ii) the distribution of differences between the capacitances found when a touch operation is performed (i.e., the difference value signal found when a touch operation is performed—the difference value signal found when no touch operation is performed). This makes it possible to cancel an offset inherent in the touch panel 3*c*.

Thus, the touch panel system 1*j* is free from a difference component resulting from a variation in capacitances which variation is inherent in the touch panel 3*c*. Consequently, only a difference component resulting from the touch operation is detected. In the case of the M sequence, an error component ($\partial_{ij}$; =−1/N if else i≠j) mixes therein, which does not occur in the case of the orthogonal sequence. However, this error component results only from the touch operation. Therefore, if N is increased (e.g., N=63 or 127), a degree of deterioration of SNR becomes smaller.

Embodiment 12

Figure 23:
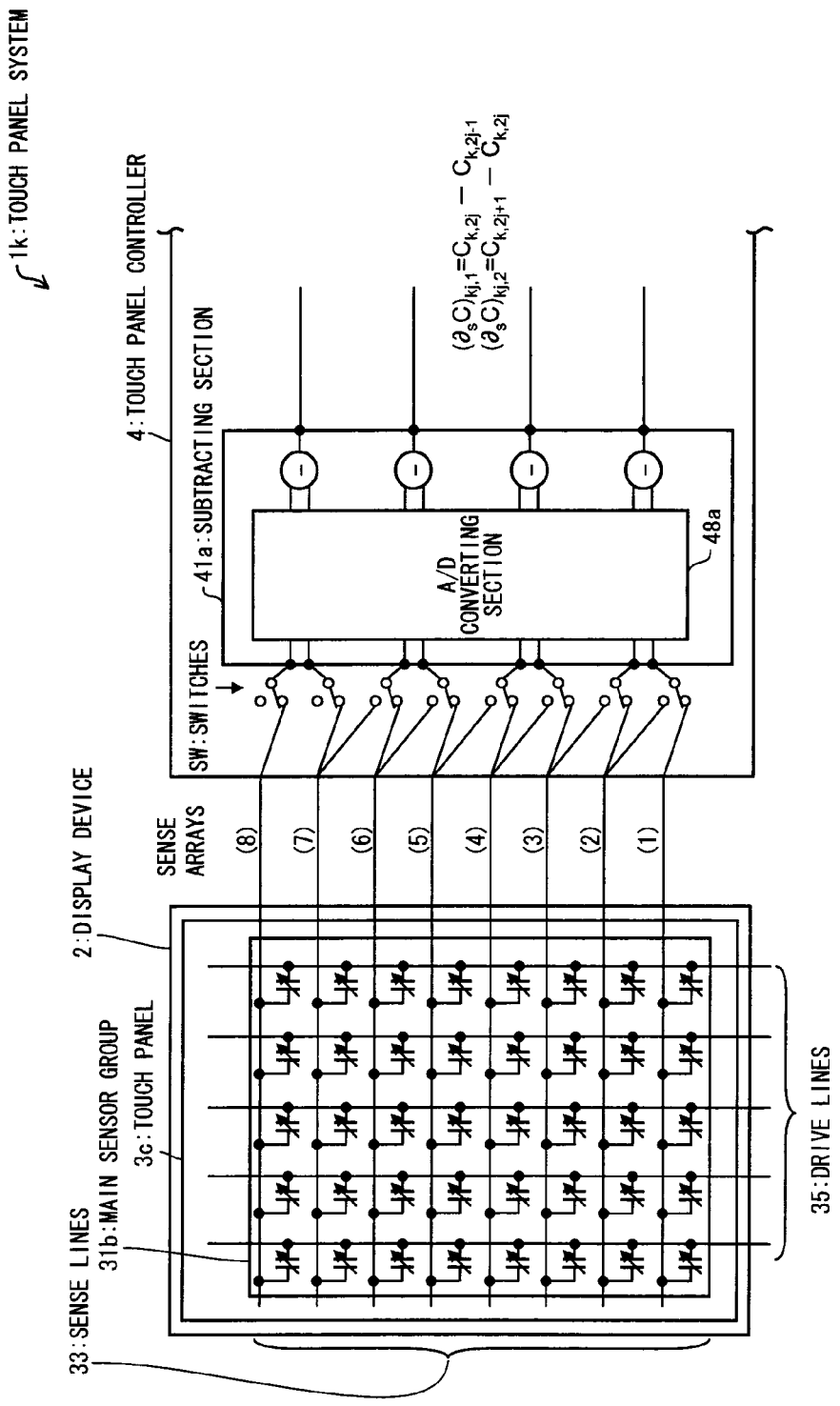
FIG. 23 is a view schematically illustrating a basic configuration of another touch panel system according to the present invention.

FIG. 23 is a view schematically illustrating a basic configuration of a touch panel system 1*k* of the present embodiment. The touch panel system 1*k* includes a subtracting section 41*a* having a different configuration.

Output signals supplied from sense lines 33 of a touch panel 3*c* are analog signals. Therefore, the subtracting section 41*a* includes an analog-to-digital converting section (first analog-to-digital converting section) 48*a* and a digital subtracter (not illustrated).

With this configuration, output signals (analog signals) supplied from the touch panel 3*c* are converted into digital signals by the analog-to-digital converting section 48*a* of the subtracting section 41*a*. The digital subtracter performs, by use of the digital signals thus converted, subtracting operations in the same manner as in the touch panel systems 1*i* and 1*j* shown in FIGS. 20 and 22, respectively.

Thus, the touch panel system 1*k* can remove a noise by (i) converting, into digital signals, analog signals outputted by the touch panel 3*c* and thereafter (ii) performing subtracting operations.

Embodiment 13

Figure 24:
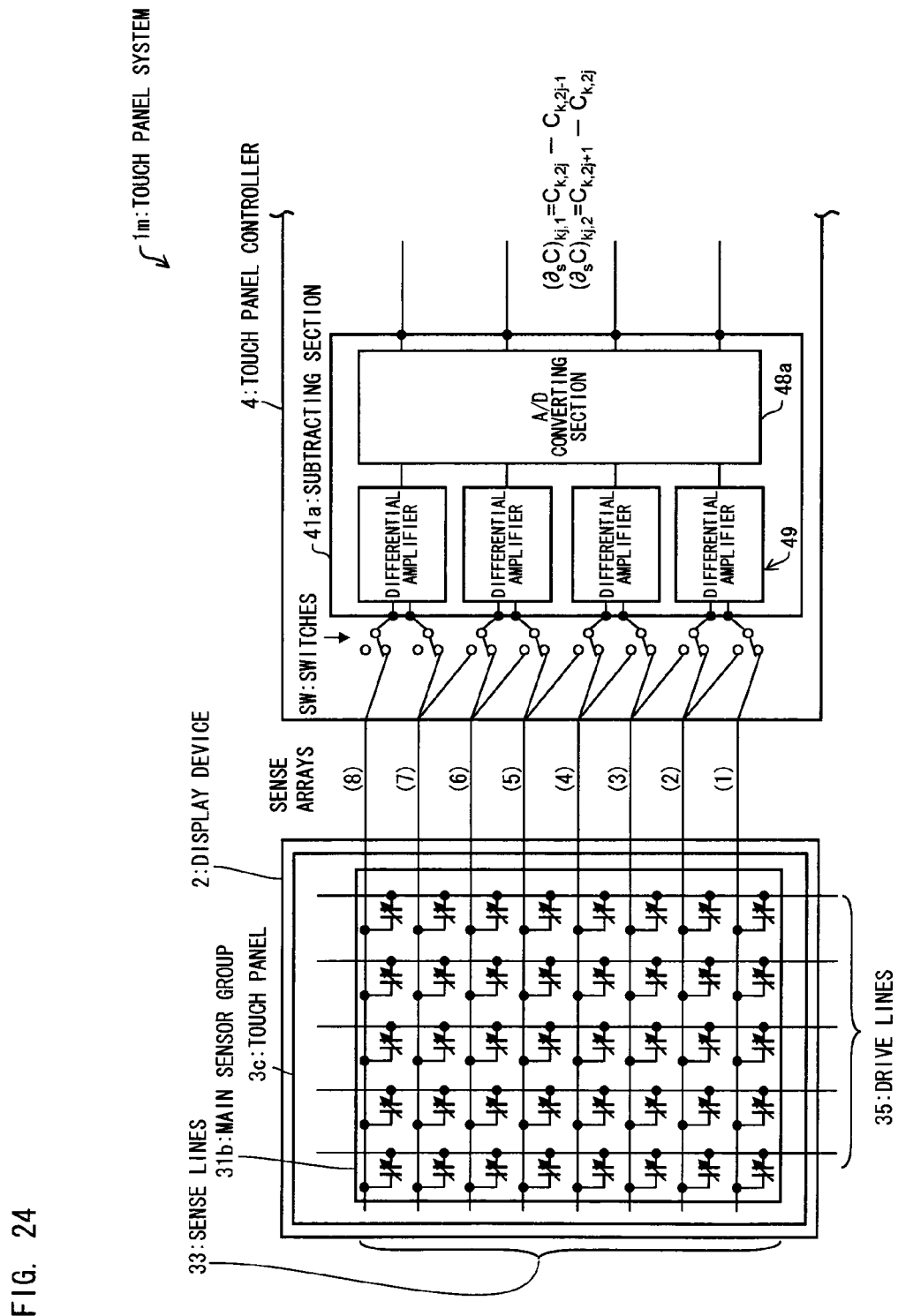
FIG. 24 is a view schematically illustrating a basic configuration of another touch panel system according to the present invention.

FIG. 24 is a view schematically illustrating a basic configuration of a touch panel system 1*m* of the present embodiment. The touch panel system 1*m* includes a subtracting section 41*a* having a different configuration.

Output signals supplied from sense lines 33 of a touch panel 3*c* are analog signals. Therefore, the subtracting section 41*a* includes a differential amplifier 49 and an analog-to-digital converting section 48*a* (second analog-to-digital converting section).

With this configuration, in the same manner as in the touch panel system 1*i* shown in FIG. 20, the differential amplifier 49 performs subtracting operations on output signals (analog signals) supplied from the touch panel 3*c*, without converting the analog signals into digital signals. The analog-to-digital converting section 48*a* converts, into a digital signal, an analog signal thus obtained by the subtracting operations.

Thus, the touch panel system 1*m* can remove a noise by (i) performing subtracting operations on analog signals outputted by the touch panel 3*c*, without converting the analog signals into digital signals, and thereafter (ii) converting the resulting signal into a digital signal.

Embodiment 14

Figure 25:
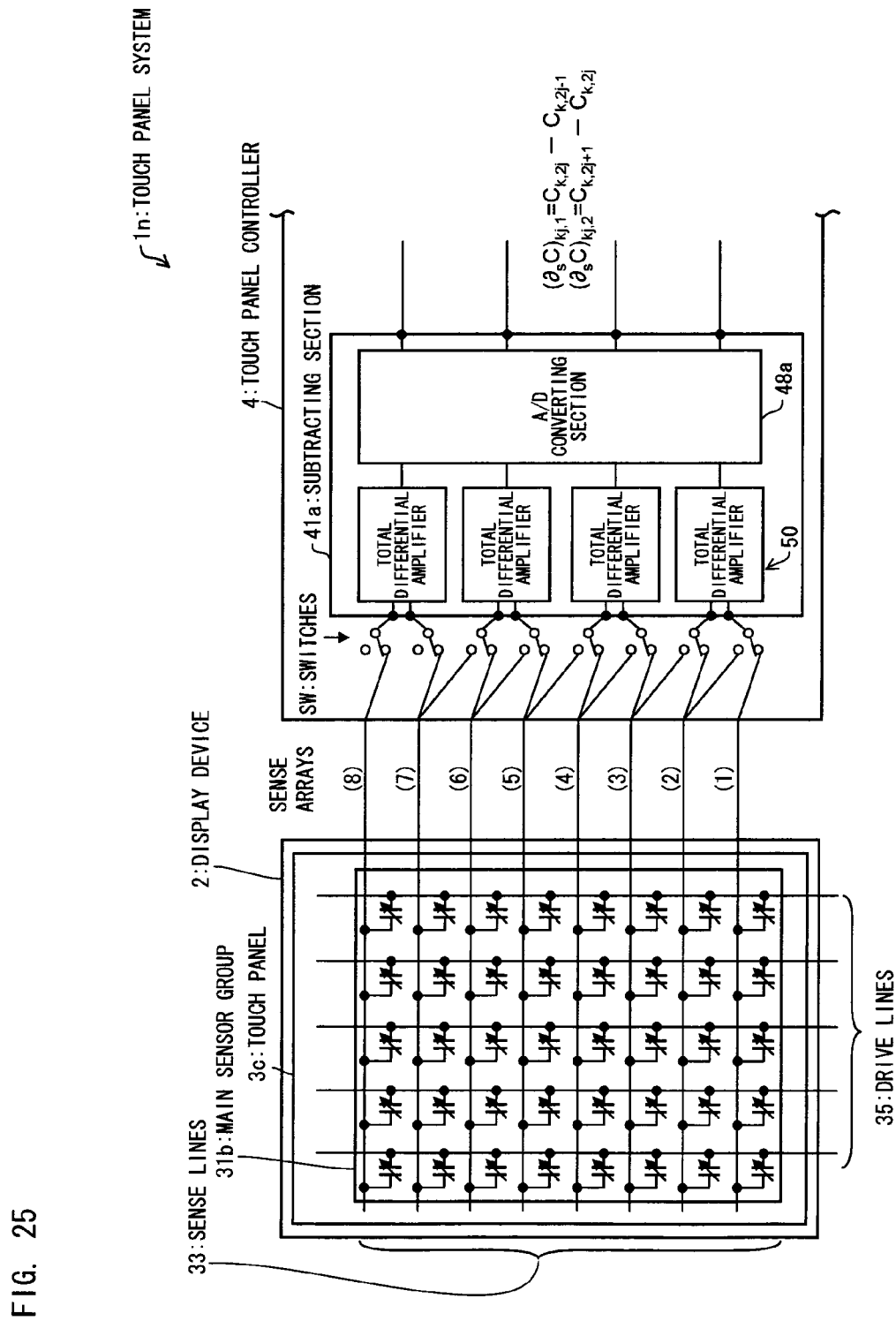
FIG. 25 is a view schematically illustrating a basic configuration of another touch panel system according to the present invention.

FIG. 25 is a view schematically illustrating a basic configuration of a touch panel system in of the present embodiment. The touch panel system in includes a subtracting section 41*a* having a different configuration. The touch panel system 1*n* includes a total differential amplifier 50 instead of the differential amplifier 49 in the touch panel system 1*m* shown in FIG. 24.

Output signals supplied from sense lines 33 of a touch panel 3*c* are analog signals. Therefore, the subtracting section 41*a* includes the total differential amplifier 50 and an analog-to-digital converting section 48*a*.

With this configuration, in the same manner as in the touch panel system 1*i* shown in FIG. 20, the total differential amplifier 50 performs subtracting operations on output signals (analog signals) from the touch panel 3*c*, without converting the analog signals into digital signals. The analog-to-digital converting section 48*a* converts, into a digital signal, an analog signal thus obtained by the subtracting operations.

Thus, the touch panel system in can remove a noise by (i) performing subtracting operations on analog signals outputted by the touch panel 3*c*, without converting the analog signals into digital signals, and thereafter (ii) converting the resulting signal into a digital signal.

Embodiment 15

Figure 26:
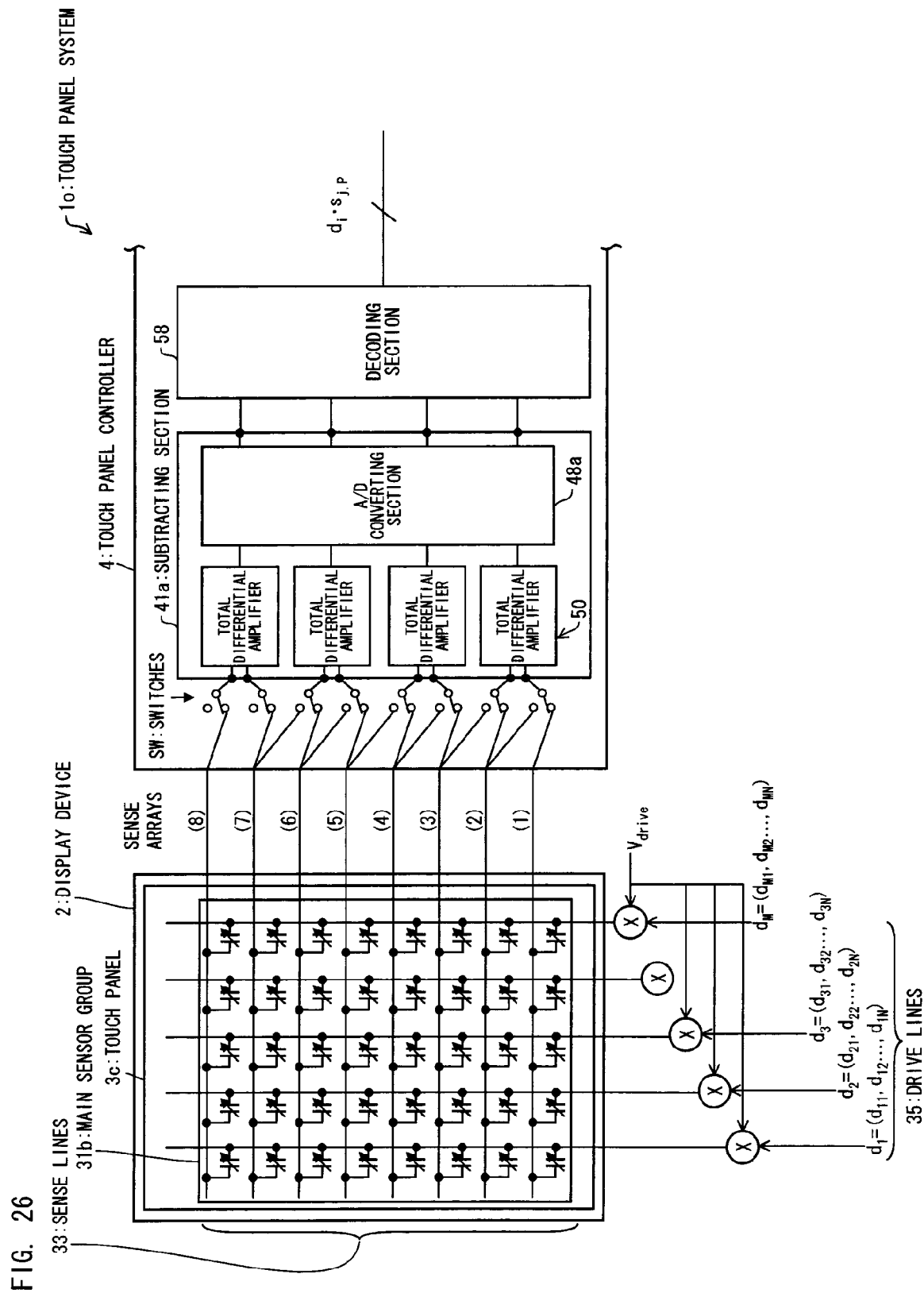
FIG. 26 is a view schematically illustrating a basic configuration of another touch panel system according to the present invention.

FIG. 26 is a view schematically illustrating a basic configuration of a touch panel system 1*o* of the present embodiment. The touch panel system 1o includes a subtracting section 41a having a different configuration. The touch panel system 1o includes a total differential amplifier 50 instead of the differential amplifier 49 in the touch panel system 1m shown in FIG. 26.

Output signals supplied from sense lines 33 of a touch panel 3c are analog signals. Therefore, the subtracting section 41a includes the total differential amplifier 50 and an analog-to-digital converting section 48a.

With this configuration, in the same manner as in the touch panel system 1i shown in FIG. 20, the total differential amplifier 50 performs subtracting operations on output signals (analog signals) from the touch panel 3c, without converting the analog signals into digital signals. The analog-to-digital converting section 48a converts, into a digital signal, an analog signal thus obtained by the subtracting operations.

Further, the touch panel system 1o employs, as a driving method for the touch panel 3c, the orthogonal sequence driving method shown in FIGS. 10, 12, and 22. According to this configuration, as shown in FIG. 10, a voltage for driving four drive lines is applied as follows: In the second driving through the fourth driving, +V is applied twice and −V is also applied twice, i.e., the number of times of application of +V is equal to that of V. On the other hand, in the first driving, +V is applied four times. Accordingly, an output value of an output sequence Y1 of the first driving is greater than that of each of output sequences Y2 through Y4 of the second driving through the fourth driving. Therefore, adding a dynamic range to the output values of the output sequences Y2 through Y4 of the second driving through the fourth driving causes saturation of the output sequence Y1 of the first driving.

In order to address this, the subtracting section 41a of the touch panel system 1o includes the total differential amplifier 50.

Further, employed as the total differential amplifier 50 is the one whose input common-mode voltage range is rail to rail. Namely, the total differential amplifier 50 has a wide common-mode input range. Consequently, the total differential amplifier 50 can operate in a voltage range from a power source voltage (Vdd) to GND. Furthermore, a difference between input signals supplied to the total differential amplifier 50 is amplified. Therefore, regardless of the type of the orthogonal sequence driving method employed in the touch panel 3c which is combined with the touch panel system 1o, an output signal from the total differential amplifier 50 is free from the problem of output saturation. Note that one example of the total differential amplifier 50 is as previously described with reference to FIG. 17.

Thus, the touch panel system 1o can remove a noise by (i) performing subtracting operations on analog signals outputted by the touch panel 3c, without converting the analog signals into digital signals, and thereafter (ii) converting the resulting signal into a digital signal. Furthermore, since the touch panel system 1o includes the total differential amplifier 50 capable of rail-to-rail operation, an output signal from the total differential amplifier 50 is free from the problem of output saturation.

Embodiment 16

Next, the following will describe a method for detecting a touch operation, which method is employed in the touch panel systems of the above-described embodiments. The following descriptions deal with, as an example, the touch panel system 1j of FIG. 22. However, the touch panel systems of other embodiments perform the same operation. The touch panel system 1j includes a judging section 59 (touch detecting section) for determining the presence or absence of a touch operation based on a comparison of (i) a difference between signals of sense lines 33 adjacent to each other which difference is found by the subtracting section 41a and the decoding section 58, and (ii) positive and negative threshold values. Note that the judging section 59 is supplied with (i) a signal (a distribution of differences between capacitances) having been subjected to a calibration process by the calibration section 62 or (ii) a signal (a distribution of differences between capacitances) having not been subjected to a calibration process by the calibration section 62. In the case where the signal having not been subjected to the calibration process by the calibration section 62 is inputted to the judging section 59, a distribution of differences between the capacitances which has been obtained as a result of the decoding process by the decoding section 58 is directly inputted to the judging section 59. The following will describe the case where the signal having not been subjected to the calibration process by the calibration section 62 is inputted to the judging section 59. However, the same operation is performed also in the case where the signal having been subjected to the calibration process is inputted to the judging section 59.

Figure 27:
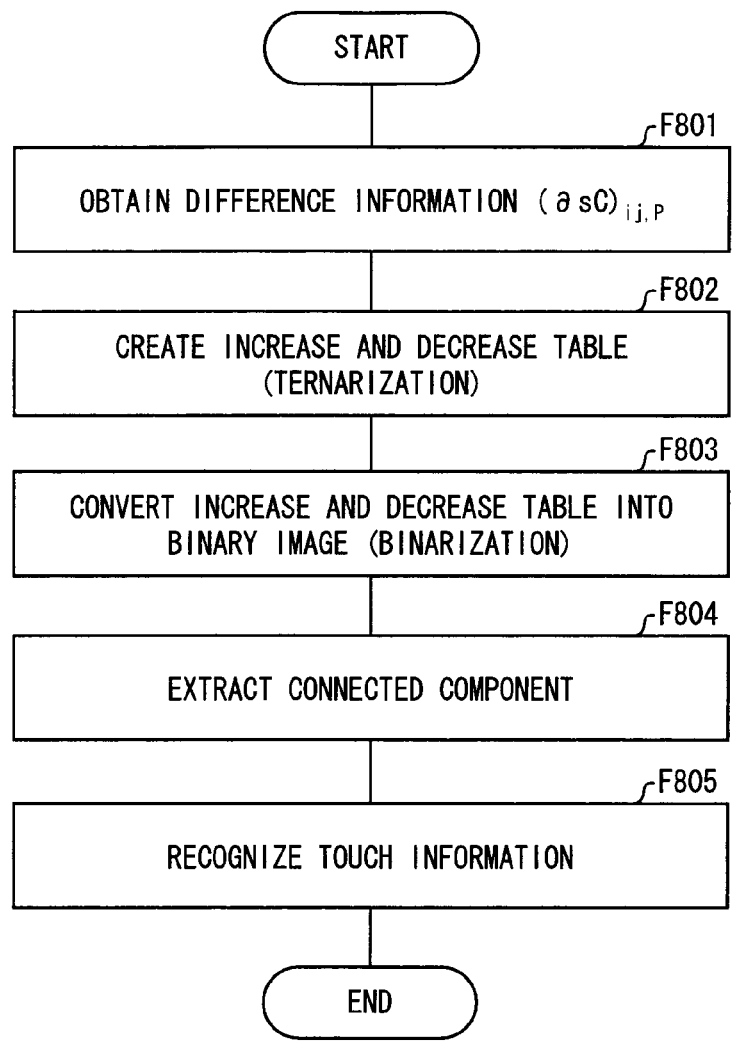
FIG. 27 is a flow chart illustrating a basic process of a judging section in the touch panel system shown in FIG. 22.

FIG. 27 is a flow chart illustrating a basic process of the judging section 59 in the touch panel system 1j shown in FIG. 22. FIG. 28 is a view schematically illustrating a method of recognizing touch information in the flow chart shown in FIG. 27.

As shown in FIG. 27, the judging section 59 first obtains values of differences in signals between respective pairs of sense lines adjacent to each other (distribution of differences) "$(\partial sC)_{ij,P}$" which values are found by the subtracting section 41a and the decoding section 59 (F801). Next, the judging section 59 compares the values of the differences with a positive threshold value THp and a negative threshold value THm, each of which is stored in the judging section 59, so as to create an increase and decrease table (F802). This increase and decrease table is, for example, a ternary increase and decrease table as shown in FIG. 28A.

Next, the ternary increase and decrease table is converted into a binary image (i.e., binarized) (F803). For example, in a case where the increase and decrease table shown in FIG. 28A is scanned in the order from a sense line S1 to a sense line S7 (in a direction toward the right in FIG. 28), the following operation is carried out: In the increase and decrease table, if the value "+" is scanned, the value therein and subsequent value(s) are all converted into "1" until the value "−" is scanned next. Meanwhile, if the value "−" is scanned, the scanning is performed in a direction opposite to the scanning direction (in a direction toward the left in FIG. 28) and the value therein is surely converted into "1". In this manner, binarized data as shown in FIG. 28B is obtained.

Next, in order to extract touch information from the binarized data, a connected component is extracted (F804). For example, in FIG. 28B, if the values "1" are arranged side by side on drive lines adjacent to each other and on a single sense line, (i) a connected component including one of such the values "1" and (ii) a connected component including the other one of such the values "1" are regarded as a single connected component, which is set as a candidate of a touched position. Namely, each of the boxed parts including the values "1" in FIG. 28C is regarded as a single connected component, and is extracted as a candidate of a touched position.

Lastly, based on the extracted candidates of the touched position, touch information (the touch size, the touched position, etc.) is recognized (F805).

Thus, based on a difference between signals of sense lines 33 adjacent to each other from which difference a noise signal has been removed, the judging section 59 determines the presence or absence of a touch operation. This makes it possible to accurately determine the presence or absence of the touch operation.

Furthermore, in the above-described example, based on a comparison of (i) the differences in signals between the respective pairs of sense lines 33 adjacent to each other which differences are found by the subtracting section 41a and (ii) the positive and negative threshold values (THp, THm), the judging section 59 creates the increase and decrease table indicating, in ternary, the distribution of the differences in signals between the sense lines 33, and converts the increase and decrease table into the binary image. Namely, the differences in signals between the respective pairs of sense lines 33 adjacent to each other from which differences the noise signal has been removed are inputted to the judging section 59. The judging section 59 compares (i) the differences in signals between the respective pairs of sense lines 33 adjacent to each other and (ii) the positive and negative threshold values (THp, THm) stored in the judging section 59, so as to create the increase and decrease table indicating, in ternary, the distribution of the differences in signals between the sense lines 33. Further, the judging section 59 binarizes the increase and decrease table, so that the increase and decrease table is converted into the binary image. Consequently, from the binary image thus converted, the candidates of the touched position are extracted. Thus, by recognizing the touch information (the size, position, etc. of the touch) based on the binary image, it is possible not only to determine the presence or absence of the touch operation but also to recognize the touch information more accurately.

Embodiment 17

Figure 29:
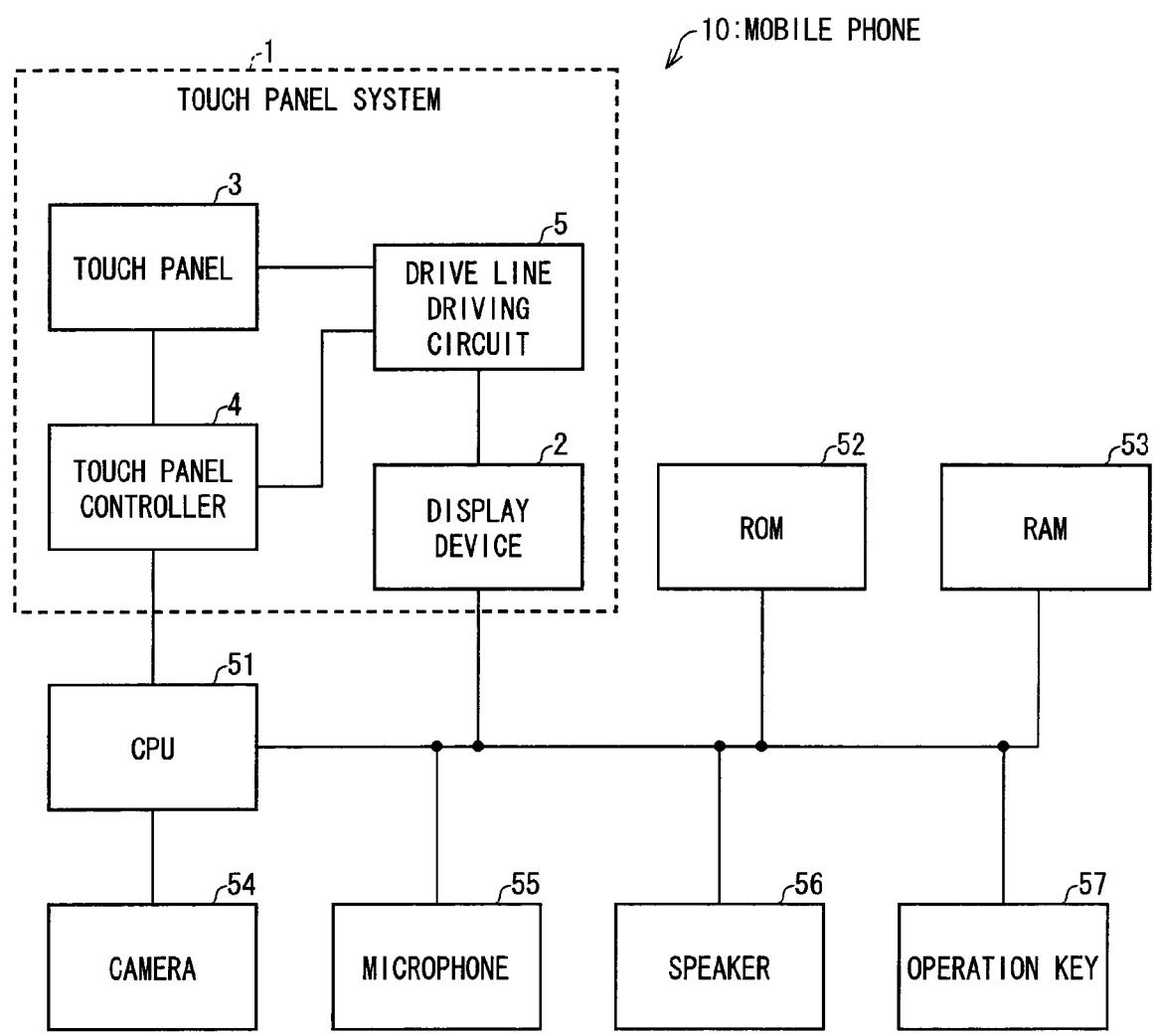
FIG. 29 is a functional block diagram illustrating a configuration of a mobile phone including the touch panel system.

FIG. 29 is a functional block diagram illustrating a configuration of a mobile phone 10 including a touch panel system 1. The mobile phone (electronic device) 10 includes a CPU 51, a RAM 53, a ROM 52, a camera 54, a microphone 55, a speaker 56, an operation key 57, and the touch panel system 1. These elements are connected with each other via data bus.

The CPU 51 controls operation of the mobile phone 10. The CPU 51 executes, for example, a program stored in the ROM 52. The operation key 57 receives an instruction entered by a user of the mobile phone 10. The RAM 53 stores, in a volatile manner, data generated as a result of the CPU 51's executing the program or data inputted via the operation key 57. The ROM 52 stores data in an involatile manner.

Further, the ROM 52 is a ROM into which data can be programmed and from which data can be erased, for example, an EPROM (Erasable Programmable Read-Only Memory) or a flash memory. The mobile phone 10 may be configured to include an interface (IF) (not illustrated in FIG. 29) which allows the mobile phone 10 to be connected with another electronic device via a wire.

The camera 54 takes an image of a subject in response to the user's operation on the operation key 57. The obtained image data of the subject is stored in the RAM 53 or an external memory (e.g., a memory card). The microphone 55 accepts an inputted voice of the user. The mobile phone 10 digitalizes the inputted voice (analog data). Then, the mobile phone 10 transmits the digitalized voice to a receiver (e.g., to another mobile phone). The speaker 56 outputs, for example, sounds based on music data stored in the RAM 53.

The touch panel system 1 includes a touch panel 3, a touch panel controller 4, a chive line driving circuit 5, and a display device 2. The CPU 51 controls operation of the touch panel system 1. The CPU 51 executes, for example, a program stored in the ROM 52. The RAM 53 stores, in a volatile manner, data generated as a result of the CPU 51's executing the program. The ROM 52 stores data in an involatile manner.

The display device 2 displays an image stored in the ROM 52 or the RAM 53. The display device 2 is stacked on the touch panel 3 or includes the touch panel 3.

The first characteristics can also be expressed as below:

[1] A touch panel system including: a touch panel including a plurality of sensors; and a touch panel controller for receiving signals from the sensors so as to read data, the plurality of sensors including (i) a main sensor for inputting a signal in response to a touch operation performed by a user and (ii) a sub sensor provided on a surface of the touch panel on which surface the main sensor is provided, and the touch panel controller including subtracting means for (i) receiving a signal supplied from the main sensor and a signal supplied from the sub sensor and (ii) subtracting, from the signal supplied from the main sensor, the signal supplied from the sub sensor.

[2] The touch panel system described in [1], wherein the sub sensor is not touched by the user in the touch operation, and detects a noise generated in the sensor.

[3] The touch panel system described in [1] or [2], wherein the main sensor and the sub sensor are provided so as to be adjacent to each other.

[4] A touch panel system including: a display device; a touch panel which is provided on an upper section or the like of a display screen of the display device and which includes a plurality of sensor groups including sensors arranged in a matrix; and a touch panel controller for receiving signals from the sensor groups so as to read data, the sensor groups including (i) a main sensor group for inputting a signal in response to a touch operation performed by a user and (ii) a sub sensor group provided on a surface of the touch panel on which surface the main sensor group is provided, and the touch panel controller including subtracting means for (i) receiving a signal supplied from the main sensor group and a signal supplied from the sub sensor group and (ii) subtracting, from the signal supplied from the main sensor group, the signal supplied from the sub sensor group.

[5] The touch panel system described in [4], wherein the sub sensor group is not touched by the user in the touch operation, and detects a noise generated in the sensor group.

[6] The touch panel system described in [4] or [5], wherein the main sensor group and the sub sensor group are provided so as to be adjacent to each other.

[7] The touch panel system described in any of [1] through [6], wherein the display device is a liquid crystal display, a plasma display, an organic electroluminescence display, or a field emission display.

[8] An electronic device including a touch panel system described in any of [1] through [7].

According to each of the above configurations, the touch panel includes the main sensor section for detecting a touch operation and the sub sensor section for detecting a noise, and a difference between a signal of the main sensor section and a signal of the sub sensor section is found by the subtracting section. This removes a noise signal from the output signal which is supplied from the main sensor section, thereby extracting a signal derived from the touch operation itself, which signal is generated in response to the touch operation. Therefore, it is possible to reliably remove (cancel) a wide variety of noises reflected in the touch panel. Thus, a noise component which is the subject of removal is not limited to an AC signal component in a signal including noises, but is all noise components reflected in the touch panel. Namely, it is possible to provide a touch panel system and an electronic device each of which is capable of canceling basically all noise components.

<<Second Characteristics>>

(1) Configuration of Touch Panel System 1r

Figure 30:
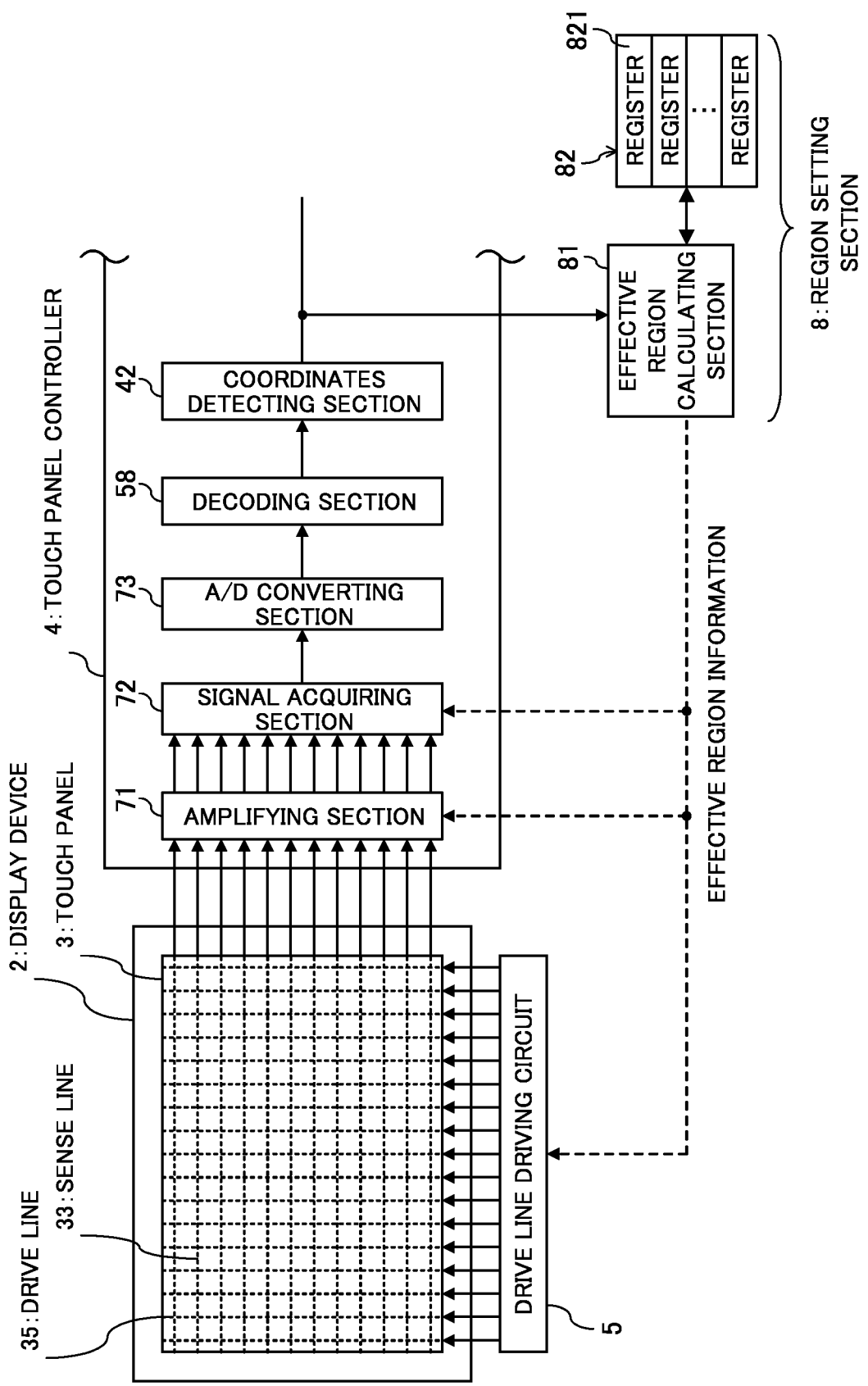
FIG. 30 is a block diagram illustrating a basic configuration of another touch panel system according to the present invention.

FIG. 30 is a view schematically illustrating a basic configuration of another touch panel system 1r according to the present invention. A basic configuration of the touch panel system 1r is substantially the same as those of the touch panel systems 1 and 1a to 1o according to the first characteristics. The following will describe the touch panel system 1r, focusing on differences between the touch panel system 1r and the touch panel systems 1, 1a to 1o according to the first characteristics. For convenience of explanation, members having the same functions as those of the touch panel systems 1 and 1a to 1o according to the first characteristics are given the same reference signs, and explanations thereof are omitted here.

As shown in FIG. 30, a touch panel system 1r includes a display device 2, a touch panel 3, a touch panel controller 4, a drive line driving circuit 5, and a region setting section 8 for setting an effective region in the touch panel 3 based on touch information (touch size, touched position, etc.) generated by the touch panel controller 4 and generating effective region information.

The drive line driving circuit 5 acquires effective region information and grasps an effective region set by the region setting section 8. Then, the drive line driving circuit 5 drives each of the drive lines 35 based on the effective region set by the region setting section 8. A specific example of a method of driving the drive lines 35 through the drive line driving circuit 5 will be described below.

The touch panel controller 4 includes an amplifying section 71 for amplifying a signal of the sense line 33 (the amplifying section 71 may be the differential amplifier 49 or total differential amplifier 50 described in the first characteristics, for example), a signal acquiring section 72 for acquiring the signal amplified by the amplifying section 71 and outputting the acquired signal in a time division, an analog-to-digital converting section 73 for converting an analog signal outputted from the signal acquiring section 72 into a digital signal (the analog-to-digital converting section 73 may be the analog-to-digital converting section 48 or 48a described in the first characteristics, for example), a decoding section 58 for obtaining a distribution of differences between capacitances based on the digital signal obtained by the conversion in the analog-to-digital converting section 73, and a coordinates detecting section 42 for generating touch information based on the distribution of differences between capacitances obtained by the decoding section 58.

Each of the amplifying section 71 and the signal acquiring section 72 acquires effective region information to grasp an effective region set by the region setting section 8. Then, the amplifying section 71 amplifies the signal of the sense line 33 based on the effective region set by the region setting section 8. Moreover, the signal acquiring section 72 selects the signal of the sense line 33 amplified by the amplifying section 71 and outputs the signal in a time division based on the effective region set by the region setting section 8. A specific example of the methods of amplifying and acquiring the signal through the amplifying section 71 and the signal acquiring section 72 will be described below.

The analog-to-digital converting section 73 converts an analog signal outputted from the signal acquiring section 72 into a digital signal having a predetermined number of bits. Although the number of the bits of the digital signal to be generated by the analog-to-digital converting section 73 is optional, it is preferable that the number of the bits should be equal to or larger than 12 and be equal to or smaller than 16, for example, in consideration of accuracy of the processings (detection accuracy of the touched position) in the decoding section 58 and the coordinates detecting section 42 in a subsequent stage.

The region setting section 8 includes an effective region calculating section 81 for setting an effective region in the touch panel 3 to generate effective region position information based on the touch information, and a storing section 82 for storing a necessary parameter for the calculation in the effective region calculating section 81.

The effective region calculating section 81 is constituted by a CPU (e.g., CPU 43 described above), for example, and acquires touch information to grasp a touched position on the touch panel 3 which is calculated by the touch panel controller 4. The effective region calculating section 81 sets an effective region in the touch panel 3 to generate effective region information based on the touched position on the touch panel 3 which is calculated by the touch panel controller 4. The storing section 82 includes a register 821 for storing a necessary parameter for the calculation of the effective region calculating section 81. A specific example of the calculation content in the effective region calculating section 81 (a method of setting an effective region) will be described below.

(2) First Operation Example of Touch Panel System

Figure 31:
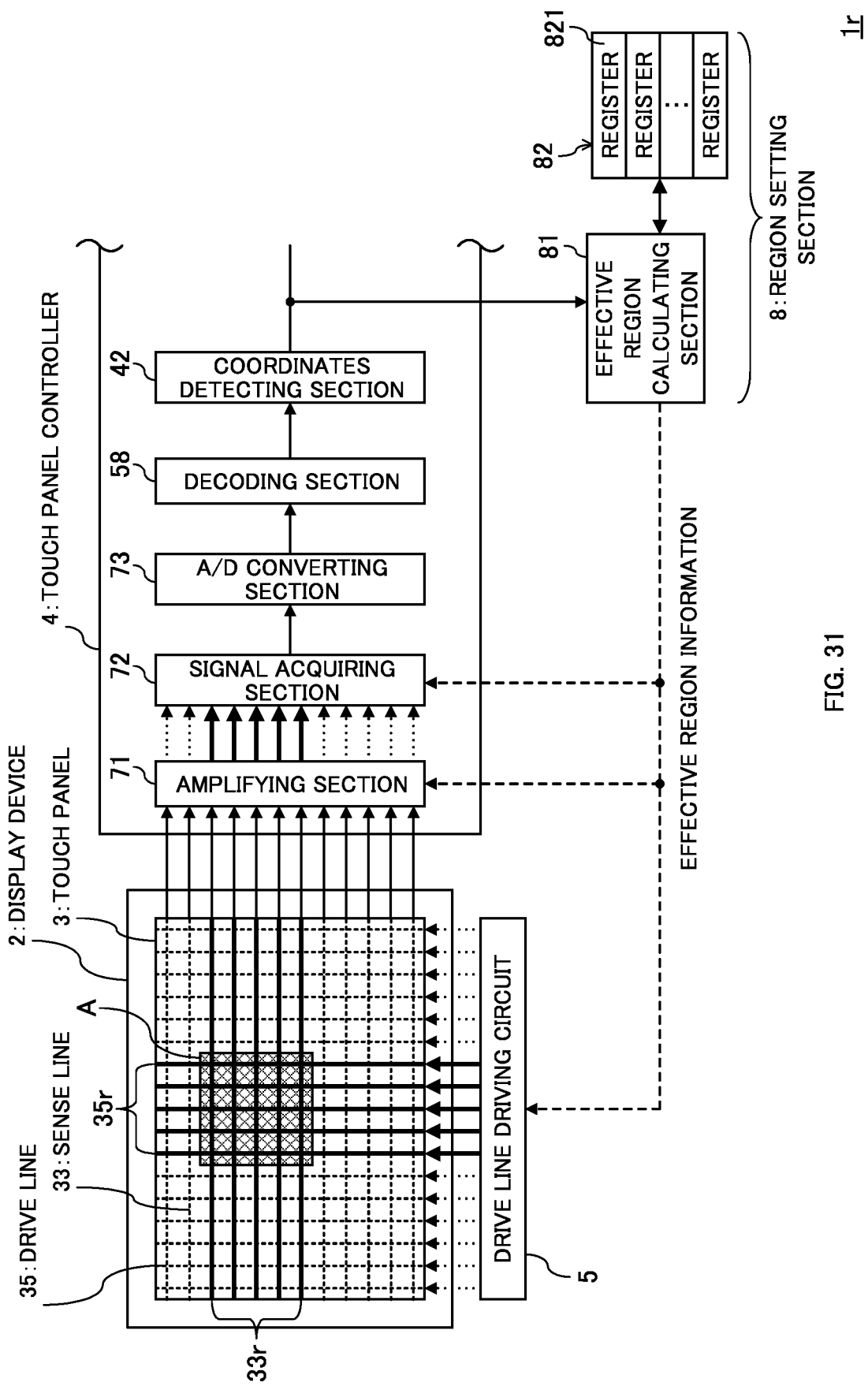
FIG. 31 is a block diagram illustrating an example of an effective region.

Next, a first operation example of the touch panel system 1r shown in FIG. 30 will be described with reference to the drawings. First of all, an example of the effective region to be set in the touch panel 3 by the region setting section 8 will be described with reference to the drawings. FIG. 31 is a block diagram showing an example of the effective region.

An effective region A illustrated in FIG. 31 is set in a partial region of the touch panel 3. Moreover, each of a drive line 35r and a sense line 33r (thick solid lines in the drawing) passes through the effective region A. In other words, each of the capacitances constituted by the drive line 35r and the sense line 33r has at least a part included in the effective region A.

For example, in the case in which the effective region A shown in FIG. 31 is set, the drive line driving circuit 5 applies a driving signal to each of the drive lines 35r passing through the effective region A. On the other hand, the drive line driving circuit 5 does not apply the driving signal to each of the drive lines which do not pass through the effective region A.

Figure 32A:
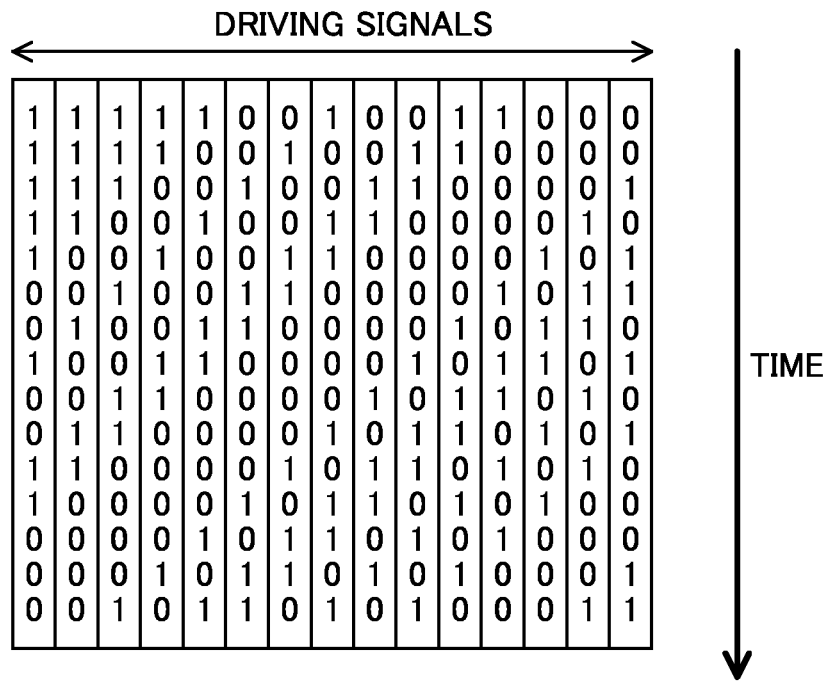
FIG. 32 is a diagram illustrating an example of a specific method of driving a drive line through a drive line driving circuit according to the first operation example.

A specific example of a method of driving the drive line 35 through the drive line driving circuit 5 will be described with reference to the drawings. FIG. 32 is a diagram showing an example of a specific method of driving a drive line through a drive line driving circuit according to a first operation example. FIG. 32A shows the case in which the whole surface of the touch panel 3 is set as an effective region, and FIG. 32B shows the case in which the effective region is set in a part of the touch panel 3 (the case in which the effective region A shown in FIG. 31 is set).

In the case in which the whole surface of the touch panel 3 is set as the effective region as shown in FIG. 32A, the drive line driving circuit 5 applies a driving signal to all of the drive lines 35. For example, the drive line driving circuit 5 applies a peculiar driving signal which is set every drive line 35. The driving signal is constituted by a combination of a high level ("1") and a low level ("0") and has a signal level changed with respect to a time direction. In addition, this driving signal may be the code sequence described in the first characteristics. Moreover, the low level of the driving signal may be "−1".

Figure 32B:
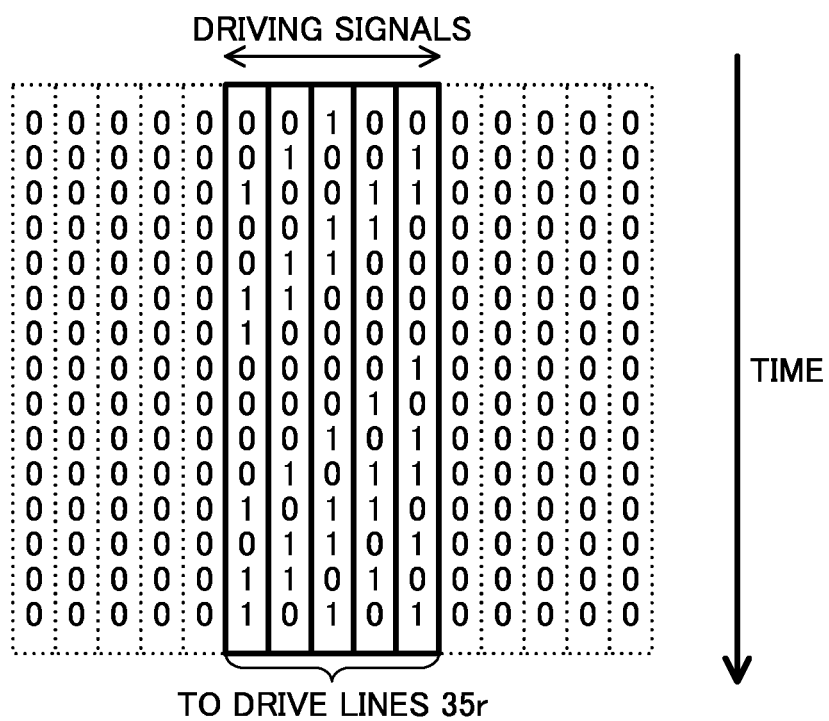

On the other hand, in the case in which the effective region A is set in a part of the touch panel 3 as shown in FIG. 32B, the drive line driving circuit 5 applies a driving signal to the drive line 35r passing through the effective region A. At this time, the drive line driving circuit 5 applies the above described peculiar driving signal to the drive line 35r. Moreover, the drive line driving circuit 5 grounds each of the drive lines which do not pass through the effective region A and thus prevents the signal level of the drive line from being changed on a time basis.

In the example shown in FIG. 32B, accordingly, the driving signal to be applied to the drive line 35r passing through the effective region A is set to be the same as the driving signal to be applied to the drive line 35r in the case shown in FIG. 32A. In the example shown in FIG. 32B, furthermore, the signal level of the drive line which does not pass through the effective region A has an invariable value of "0" with respect to the time direction. The signal level of the drive line which does not pass through the effective region A is not restricted to be "0" if it is invariable with respect to the time direction, and may be "1" or a combination of "1" and "0" (for example, one of two drive lines which are adjacent to each other may be "0" and the other may be "1").

When the drive line driving circuit 5 selectively drives the drive line 35r passing through the effective region A, thus, the drive line 35 can be prevented from being uselessly driven. Therefore, power consumption taken for driving the drive line 35 can be reduced, and furthermore, an occurrence of a noise can be suppressed, resulting in an enhancement in detection sensitivity for a touch operation. By restrictively driving the drive line 35r, moreover, it is possible to enhance detection accuracy of the touched position by the touch panel controller 4.

Furthermore, the drive line driving circuit 5 controls the drive line 35 as shown in FIG. 32 so that the touch panel controller 4 (particularly, the decoding section 58) can easily identify a fluctuation in a signal of the sense line 33 caused by the touch operation.

Figure 33:
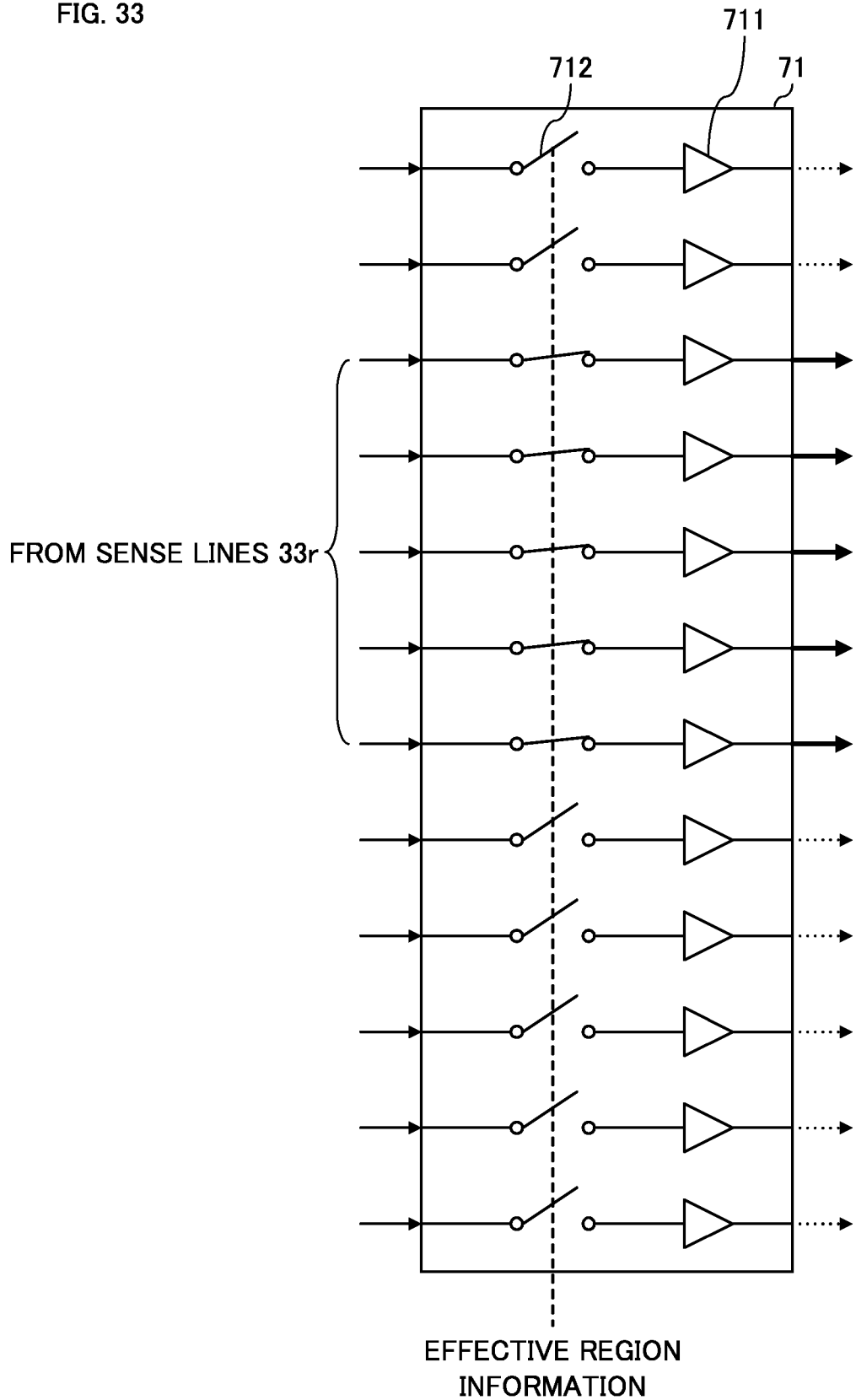
FIG. 33 is a block diagram illustrating an example of a specific operation of an amplifying section according to the first operation example.

Furthermore, in the case in which the effective region A shown in FIG. 31 is set, for example, the amplifying section 71 selectively amplifies a signal of the sense line 33r passing through the effective region A. A specific operation example of the amplifying section 71 will be described with reference to the drawings. FIG. 33 is a block diagram showing an example of the specific operation of the amplifying section 71 according to a first operation example.

As shown in FIG. 33, the amplifying section 71 includes an amplifier 711 corresponding to each of the sense lines 33 and an opening/closing switch 712 for controlling whether a signal of the sense line 33 is to be supplied to the amplifier 711 or not. The respective opening/closing switches 712 are controlled depending on effective region information.

More specifically, the opening/closing switch 712 to which the signal of the sense line 33r passing through the effective region A is to be supplied is brought into a conduction status. Consequently, the signal of the sense line 33r passing through the effective region A is amplified by the amplifier 711 and is thus outputted from the amplifying section 71. On the other hand, the opening/closing switch 712 to which the signal of the sense line not passing through the effective region A is to be supplied is brought into a non-conduction status. Consequently, the signal of the sense line not passing through the effective region A is neither amplified by the amplifier 711 nor outputted from the amplifying section 71.

Thus, the amplifying section 71 selectively amplifies the signal of the sense line 33r passing through the effective region A, so that a power consumption taken for amplifying the signal can be reduced. A structure for selectively amplifying the signal of the sense line 33r is not limited to the amplifier 711 and the opening/closing switch 712 which are illustrated but other structures may be employed as long as the same effect can be obtained. For example, it is also possible to include a switch capable of changing over an activity/nonactivity of the amplifier 711 in place of (or in addition to) the opening/closing switch 712.

Figure 34:
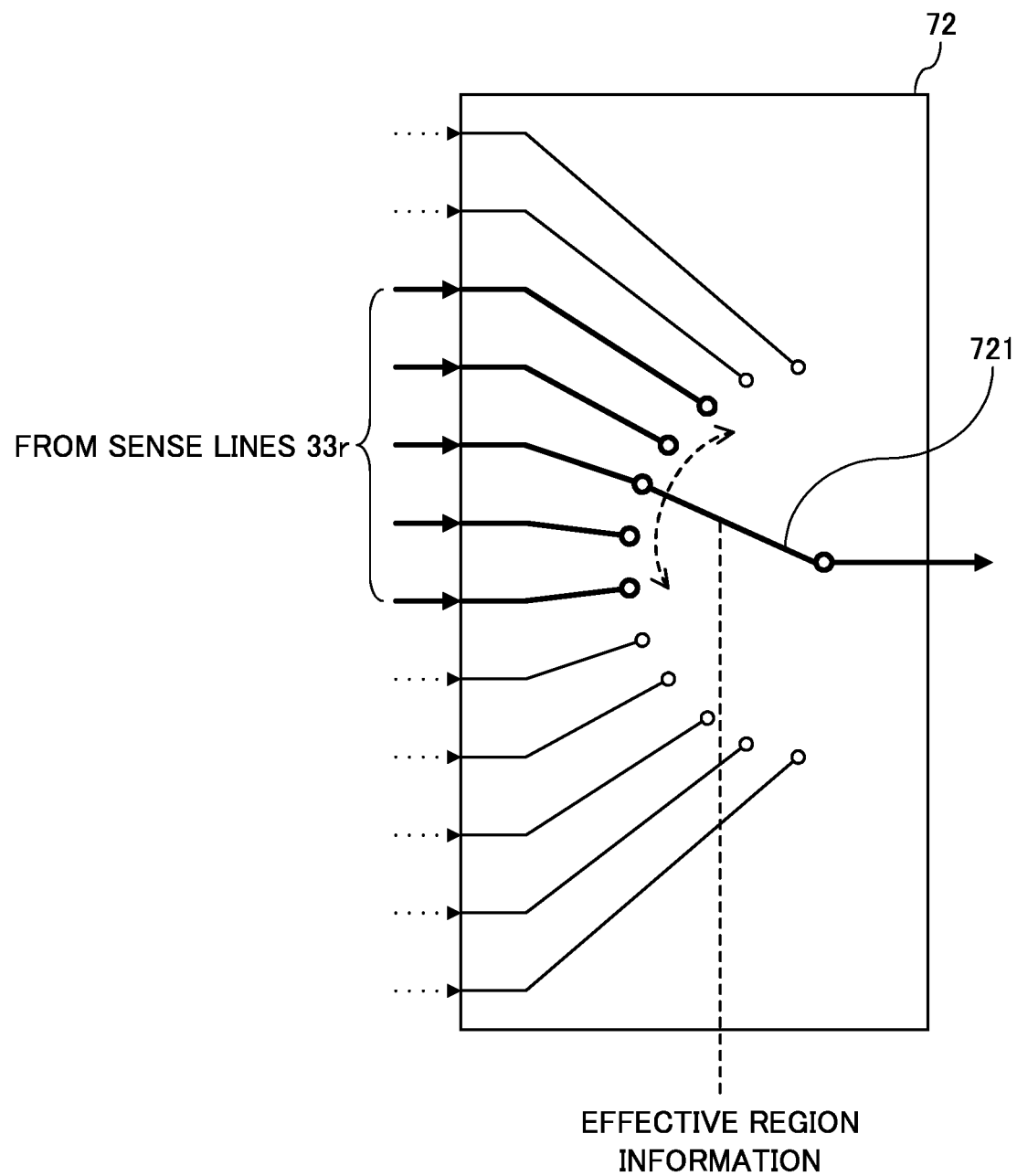
FIG. 34 is a block diagram showing an example of a specific operation of a signal acquiring section according to the first operation example.

Moreover, the signal acquiring section 72 selectively acquires the signal of the sense line 33r passing through the effective region A and outputs the signal in a time division. A specific operation example of the signal acquiring section 72 will be described with reference to the drawings. FIG. 34 is a block diagram showing an example of a specific operation of the signal acquiring section according to the first operation example.

As shown in FIG. 34, the signal acquiring section 72 includes a branch switch 721 for selecting one of terminals corresponding to the respective sense lines 33 and connecting the terminal to a subsequent stage. The branch switch 721 is controlled depending on the effective region information.

More specifically, the branch switch 721 can be connected to the terminal which corresponds to the sense line 33r passing through the effective region A. Consequently, the signal of the sense line 33r passing through the effective region A amplified by the amplifying section 71 is outputted to the subsequent stage. On the other hand, the branch switch 721 is not connected to the terminal corresponding to the sense line which does not pass through the effective region A. Consequently, the signal of the sense line which does not pass through the effective region A is not outputted to the subsequent stage.

Thus, the signal acquiring section 72 selectively acquires the signal of the sense line 33r passing through the effective region A and outputs the signal in a time division. Consequently, it is possible to prevent a useless signal from being outputted to the subsequent stage of the signal acquiring section 72. Therefore, it is possible to reduce power consumption taken for a processing in the subsequent stage of the signal acquiring section 72 (the analog-to-digital converting section 73, the decoding section 58 and the coordinates detecting section 42, for example). The structure for selectively acquiring the signal and outputting the signal in a time division is not restricted to the branch switch 721 which is illustrated but other structures may be employed as long as the same effects can be obtained.

The analog-to-digital converting section 73 converts an analog signal outputted by the signal acquiring section 72 into a digital signal, the decoding section 58 obtains a distribution of differences between capacitances in the touch panel 3 (the effective region A) based on the digital signal, and the coordinates detecting section 42 refers to the distribution of differences between capacitances, thereby detecting a touched position on the touch panel 3 (the effective region A) to generate touch information.

Thus, the touch panel controller 4 selectively processes the signal of the sense line 33r passing through the effective region A. Therefore, it is possible to prevent a useless processing for the signal. Accordingly, it is possible to reduce the power consumption taken for the processing of the signal. By restrictively processing the signal of the sense line 33r passing through the effective region A, moreover, it is possible to enhance detection accuracy of the touched position.

As described above, the touch panel controller 4 carries out an operation based on the effective region A set by the region setting section 8. On the other hand, the region setting section 8 updates the effective region A set in the touch panel 3 to set a new effective region based on the touched position detected by the touch panel controller 4.

Figure 35:
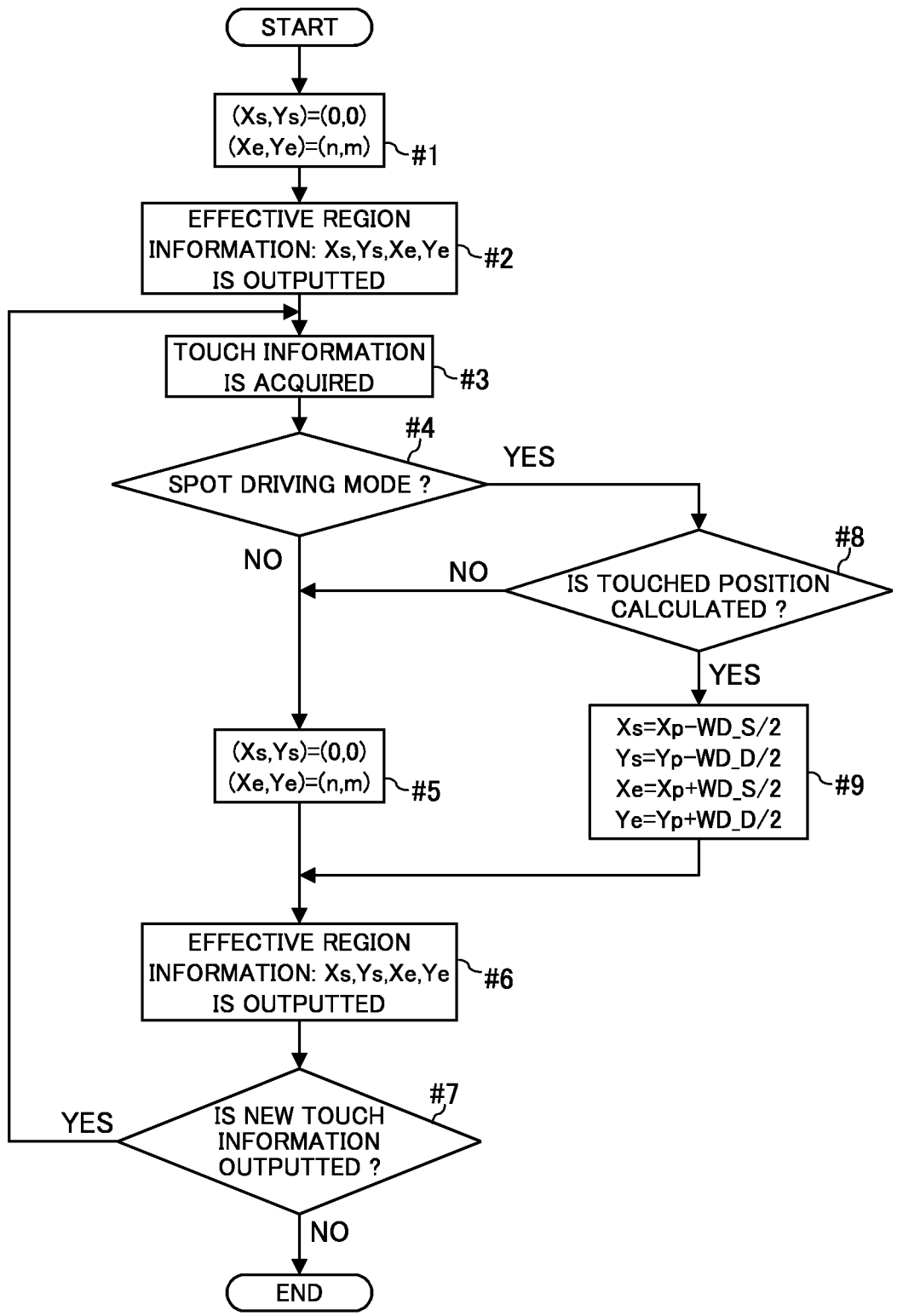
FIG. 35 is a flow chart showing an example of a specific operation of a region setting section according to the first operation example.

An example of a specific serial operation of the region setting section 8 will be described below with reference to the drawings. FIG. 35 is a flow chart showing an example of the specific operation of the region setting section according to the first operation example. Moreover, FIG. 36 is a diagram showing an example of a method of setting an effective region according to the first operation example.

Figure 36:
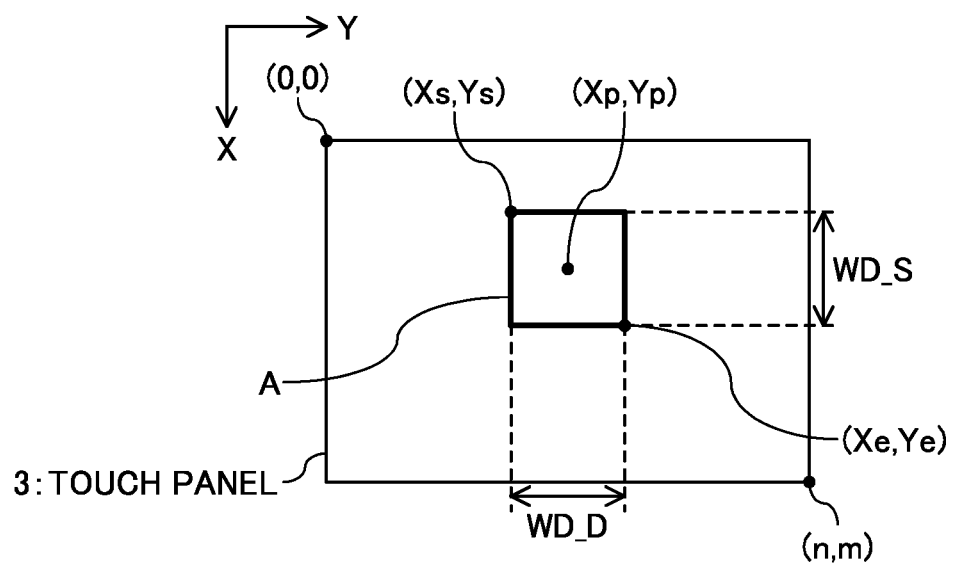
FIG. 36 is a diagram showing an example of a method of setting an effective region according to the first operation example.

For convenience of the description, as shown in FIG. 36, a position in an alignment direction of the sense line 33 (a vertical direction in the drawing, an X direction) is represented by X and a position in an alignment direction of the drive line 35 (a transverse direction in the drawing, a Y direction) is represented by Y, and a position in the touch panel 3 is expressed in coordinates of (X, Y). Moreover, the coordinates of a left upper corner of the touch panel 3 are set to be (0, 0) and coordinates of a right lower corner thereof are set to be (n, m). It is assumed that n and m are natural numbers, at least one of which is equal to or greater than two, and n sense lines 33 and m drive lines 35 are provided in the touch panel 3. Furthermore, coordinates of a left upper corner of the effective region A are set to be (Xs, Ys) and coordinates of a right lower corner of the effective region A are set to be (Xe, Ye).

Moreover, FIG. 36 illustrates the case in which the effective region A centered around a touched position (Xp, Yp) has a length in the X direction set to be WD_S and a length in the Y direction set to be WD_D. The details of a method of setting the effective region A will be described below.

As shown in FIG. 35, the effective region calculating section 81 calculates effective region information in which (Xs, Ys)=(0, 0) and (Xe, Ye)=(n, m) in order to set the whole surface of the touch panel 3 as an effective region at a start of the operation of the touch panel system 1r (Step #1). Then, the effective region calculating section 81 outputs the effective region information thus calculated (Step #2).

Next, the effective region calculating section 81 acquires the touch information generated by the touch panel controller 4 (Step #3). At this time, the effective region calculating section 81 confirms the parameter stored in the register 821 of the storing section 82, thereby ascertaining whether there is employed a "spot driving mode" (a first mode) for setting a new effective region based on the touched position or a "whole surface detecting mode" (a second mode) for continuously setting the whole surface of the touch panel 3 as a new effective region (Step #4).

The "spot driving mode" and the "whole surface detecting mode" can be changed over according to an instruction (operation) of a user, for example. For this reason, the user can operate the touch panel system 1r in either the "spot driving mode" for reducing power consumption and enhancing detection sensitivity for a touch operation or the "whole surface detecting mode" for detecting the touched position without omission from the whole surface of the touch panel 3 depending on an installation environment, a usage environment or the like of the touch panel system, for example. The touch panel system 1r may have such a structure as to automatically select these modes and to carry out an operation depending on a factor other than the instruction of the user.

In the case of the "whole surface detecting mode" (Step #4, NO), the effective region calculating section 81 calculates effective region information in which (Xs, Ys)=(0, 0) and (Xe, Ye)=(n, m) in order to set the whole surface of the touch panel 3 as a new effective region (Step #5). Then, the effective region calculating section 81 outputs the effective region information thus calculated (Step #6).

If new touch information is outputted (Step #7, YES), thereafter, the processing returns to the Step #3 in which the touch information is acquired. On the other hand, if the new touch information is not outputted (Step #7, NO), the operation is ended.

If the "spot driving mode" is employed (Step #4, YES) and the touched position on the touch panel 3 is not calculated (Step #8, NO), the effective region calculating section 81 carries out the same operation as that in the case of the "whole surface detecting mode" (Steps #5 to #7). Consequently, the whole surface of the touch panel 3 is set as the effective region. Even if the touch operation is subsequently performed for any position on the touch panel 3, therefore, the touch panel controller 4 can detect the touch operation and detect the touched position.

On the other hand, if the "spot driving mode" is employed (Step #4, YES) and the touched position on the touch panel 3 is calculated (Step #8, YES), the effective region calculating section 81 calculates new effective region information in which Xs=Xp−WD_S/2, Ys=Yp−WD_D/2, Xe=Xp+WD_S/2 and Ye=Yp+WD_D/2 as shown FIG. 36 in order to set a new effective region including the touched position (Step #9). Then, the effective region calculating section 81 outputs the effective region information thus calculated (Step #6). Consequently, the effective region calculating section 81 can set a new effective region A having a high possibility of an inclusion of a position in which the touched position is to be detected subsequently.

If the new touch information is outputted (Step #7, YES), thereafter, the processing returns to the Step #3 in which the touch information is acquired. On the other hand, if the new touch information is not outputted (Step #7, NO), the operation is ended.

As described above, in the touch panel system 1r according to the present example, an effective region to be a region in which the touched position is to be detected is set restrictively in the touch panel 3 based on the touched position which is detected. By avoiding useless detection, therefore, it is possible to reduce power consumption and to enhance detection sensitivity for a touch operation.

The operations of the touch panel controller 4 and the operation of the region setting section 8 (the operations of the Steps #3 to #9 in FIG. 35) are repetitively carried out at a predetermined frame rate (for example, 120 Hz).

Although the effective region calculating section 81 successively confirms, in the operation, whether the "spot driving mode" or the "whole surface detecting mode" is employed (Step #4), moreover, the confirmation does not need to be successively carried out. For example, operations depending on the respective modes may be carried out until the effective region calculating section 81 performs the confirmation after the Step #2 and some instruction is then inputted from a user or the like.

A size of the effective region to be set by the region setting section 8 (for example, WD_D and WD_S) may have a fixed value or a variable value. In the case in which the size of the effective region is set to have the variable value, if the region setting section 8 sets a new effective region having a size corresponding to a moving speed of the touched position, there can be increased a possibility of an inclusion of the subsequent touched position in a new effective region. Therefore, this is preferable.

Figure 37:
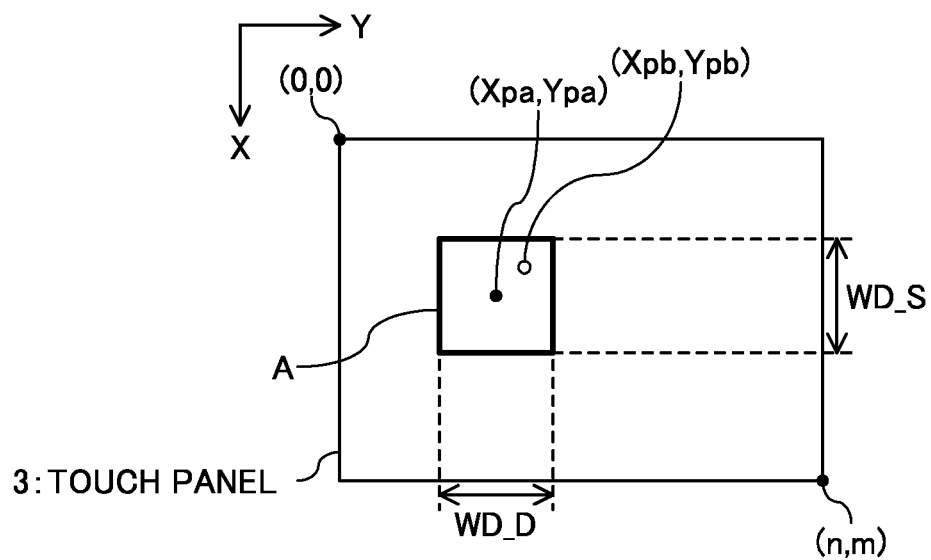
FIG. 37 is a diagram showing another example of the method of setting an effective region according to the first operation example.

An example of a specific method of setting an effective region in this case will be described with reference to FIG. 37. FIG. 37 is a diagram showing another example of the method of setting an effective region according to the first operation example. FIG. 37 illustrates the case in which a touched position in a current frame is (Xpa, Ypa) and a touched position in a next frame is (Xpb, Ypb). Moreover, a moving speed in the X direction of the touched position in the current frame is represented by Vx, a moving speed in the Y direction is represented by Vy and a frame rate is represented by f.

The region setting section 8 sets a new effective region in such a manner that the touched position (Xpb, Ypb) in the next frame is included therein based on the touched position (Xpa, Ypa) and the moving speed (Vx, Vy) in the current frame. In other words, the region setting section 8 sets a new effective region in order to obtain WD_S≥2×Vx/f and WD_D≥2×Vy/f. For example, if Vy=1000 mm/s and f=120 Hz are set, WD_D≥16.7 mm is obtained.

In the region setting section 8, furthermore, a fluctuation amount of the touched position may be obtained by storing the touched position acquired sequentially in the storing section 82 or the like, and the moving speed of the touched position in the current frame may be obtained based on the fluctuation amount.

Furthermore, the region setting section 8 does not always need to set an effective region centered around the touched position. For example, in the case in which the touched position is detected in the vicinity of an edge of the touch panel 3, the region setting section 8 may set an effective region in which the touched position leans to the edge side. Moreover, the region setting section 8 may set an effective region based on a moving direction of the touched position. For example, the region setting section 8 may set an effective region in which the touched position leans in an opposite direction to the moving direction of the touched position.

(3) Second Operation Example of Touch Panel System

In the touch panel system 1r shown in FIG. 30, the touch panel controller 4 detects the touched position based on the distribution of differences between capacitances in the touch panel 3. Even if a plurality of touched positions is present on the touch panel 3, consequently, it is possible to detect the respective touched positions separately (which is multi-touch compatible). Therefore, an operation example (a second operation example) of the touch panel system 1r corresponding to multi-touch will be described below.

Referring to the second operation example, the touch panel controller 4 can detect the touched positions and the region setting section 8 can set an effective region based on the touched positions. However, a basic operation thereof is common to the first operation example. For this reason, in the following description of the second operation example, detailed explanation of common sections to those in the first operation example will be omitted in proper consideration of the description of the first operation example.

Figure 38:
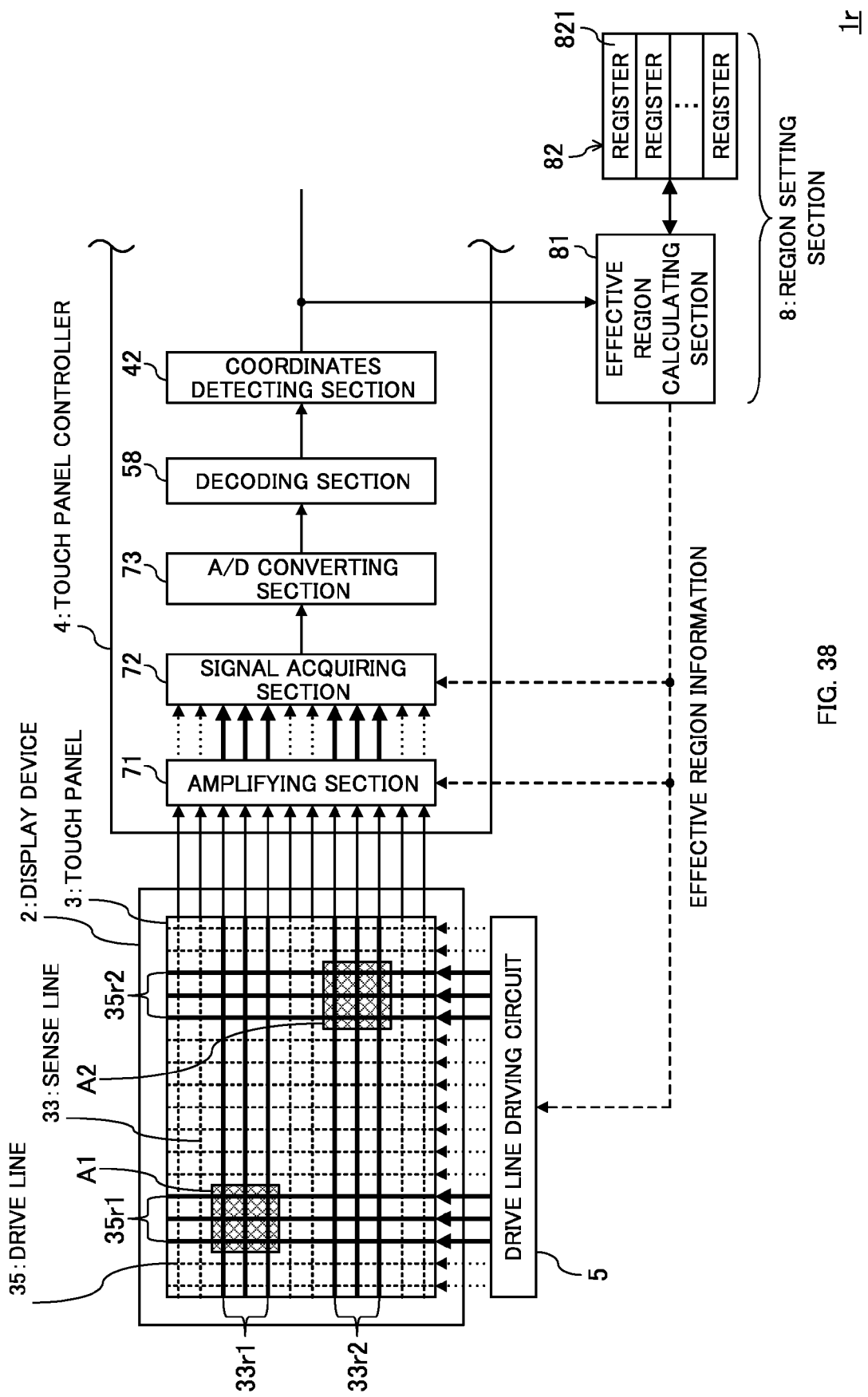
FIG. 38 is a block diagram showing an example of an effective region to be set in a touch panel according to a second operation example.

First of all, an example of the effective region to be set in the touch panel 3 by the region setting section 8 will be described with reference to the drawings. FIG. 38 is a block diagram showing an example of an effective region to be set in the touch panel 3 according to the second operation example. FIG. 38 illustrates effective regions A1 and A2 to be set in the case in which two touched positions are placed apart from each other on the touch panel 3.

Each of the effective regions A1 and A2 illustrated in FIG. 38 is set in a partial region of the touch panel 3. Moreover, each of a drive line 35r1 and a sense line 33r1 (thick solid lines in the drawing) passes through the effective region A1 and each of a drive line 35r2 and a sense line 33r2 (thick solid lines in the drawing) passes through the effective region A2. In other words, each of the detecting regions X constituted by the drive line 35r1 and the sense line 33r1 has at least a part included in the effective region A1, and each of the detecting regions X constituted by the drive line 35r2 and the sense line 33r2 has at least a part included in the effective region A2.

In the case in which the effective regions A1 and A2 shown in FIG. 38 are set in the touch panel 3, for example, the drive line driving circuit 5 applies a driving signal to each of the drive line 35r1 passing through the effective region A1 and the drive line 35r2 passing through the effective region A2. On the other hand, the drive line driving circuit 5 does not apply the driving signal to each of the drive lines which pass through neither of the effective regions A1 and A2.

Figure 39:
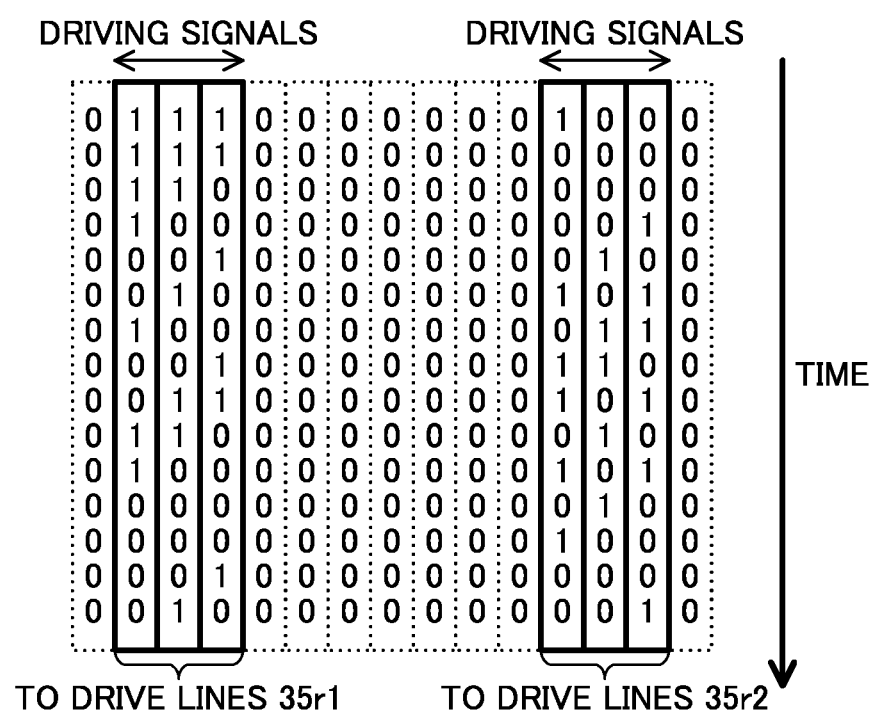
FIG. 39 is a diagram showing an example of a specific method of driving a drive line through a drive line driving circuit according to the second operation example.

A specific example of a method of driving the drive line 35 through the drive line driving circuit 5 according to the second operation example will be described with reference to the drawings. FIG. 39 is a diagram showing an example of a specific method of driving a drive line through the drive line driving circuit according to the second operation example.

As shown in FIG. 39, the drive line driving circuit 5 applies the above described peculiar driving signal (see FIG. 32) to each of the drive line 35r1 passing through the effective region A1 and the drive line 35r2 passing through the effective region A2. Furthermore, the drive line driving circuit 5 grounds each of the drive lines which pass through neither of the effective regions A1 and A2 to prevent a signal level of the drive line from being changed on a time basis.

Also in the multi-touch, thus, when the drive line driving circuit 5 selectively drives the drive lines 35r1 and 35r2 passing through the effective regions A1 and A2, respectively, the drive line 35 can be prevented from being uselessly driven. Therefore, power consumption taken for driving the drive line 35 can be reduced, and furthermore, an occurrence of a noise can be suppressed, resulting in an enhancement in detection sensitivity for a touch operation. By restrictively driving the drive lines 35r1 and 35r2, moreover, it is possible to enhance detection accuracy of the touched position in the touch panel controller 4.

Figure 40:
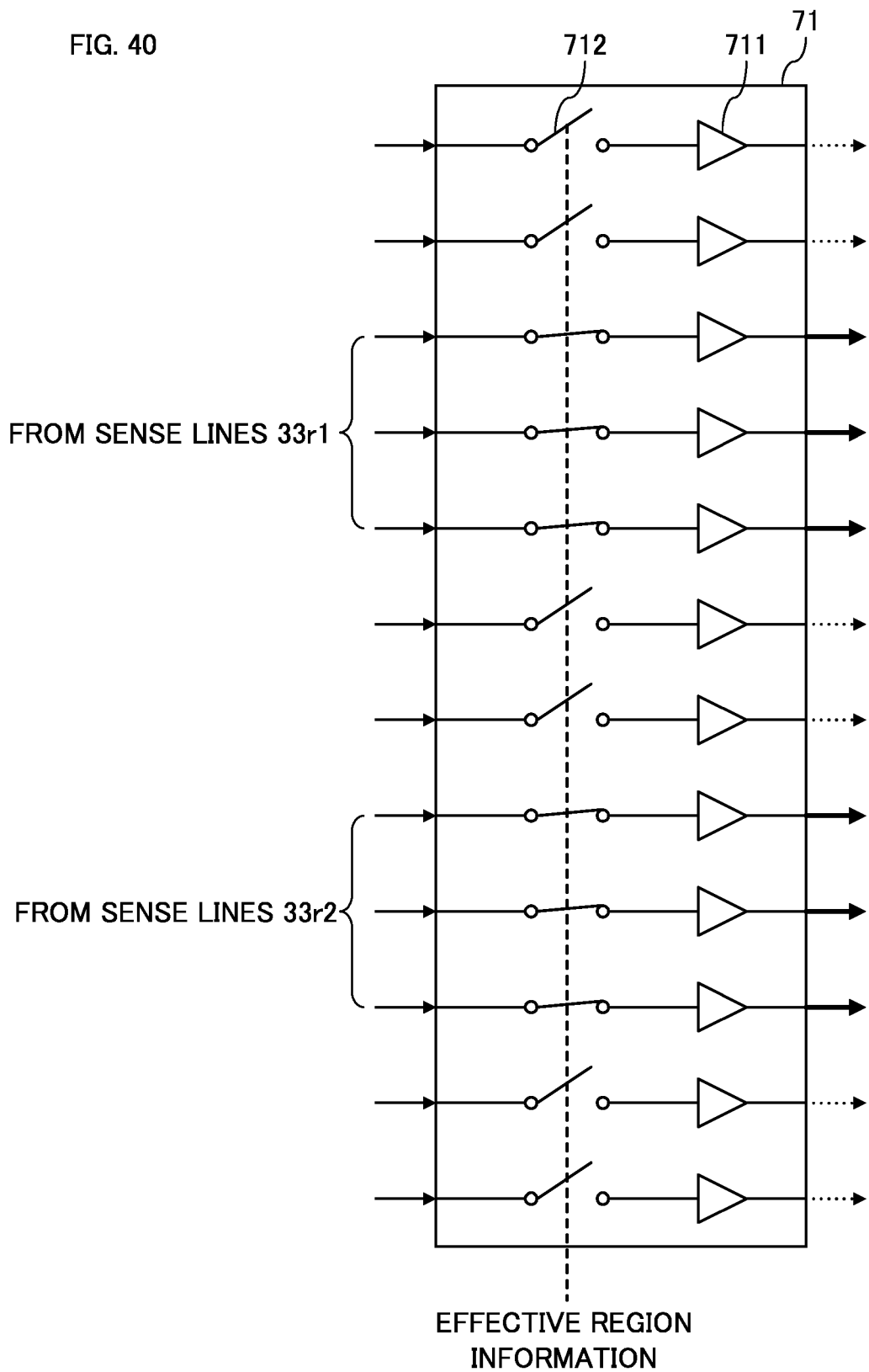
FIG. 40 is a block diagram showing an example of a specific operation of an amplifying section according to the second operation example.

Furthermore, in the case in which the effective regions A1 and A2 shown in FIG. 38 are set in the touch panel 3, for example, the amplifying section 71 selectively amplifies the respective signals of the sense line 33r1 passing through the effective region A1 and the sense line 33r2 passing through the effective region A2. A specific operation example of the amplifying section 71 will be described with reference to the drawings. FIG. 40 is a block diagram showing an example of the specific operation of the amplifying section according to the second operation example. The amplifying section 71 shown in FIG. 40 is the same as the amplifying section 71 described in the first operation example (see FIG. 33).

As shown in FIG. 40, the opening/closing switch 712 to which each of the signals of the sense line 33r1 passing through the effective region A1 and the sense line 33r2 passing through the effective region A2 is to be supplied is brought into a conduction status. Consequently, each of the signals of the sense line 33r1 passing through the effective region A1 and the sense line 33r2 passing through the effective region A2 are amplified by the amplifier 711 and are thus outputted from the amplifying section 71. On the other hand, the opening/closing switch 712 to which the signal of the sense line passing through neither of the effective regions A1 and A2 is to be supplied is brought into a non-conduction status. Consequently, the signal of the sense line passing through neither of the effective regions A1 and A2 is not amplified by the amplifier 711 and is not outputted from the amplifying section 71.

Thus, the amplifying section 71 selectively amplifies the signals of the sense lines 33r1 and 33r2 passing through the effective regions A1 and A2, respectively, so that power consumption taken for amplifying the signal of the sense line 33 can be reduced.

Figure 41:
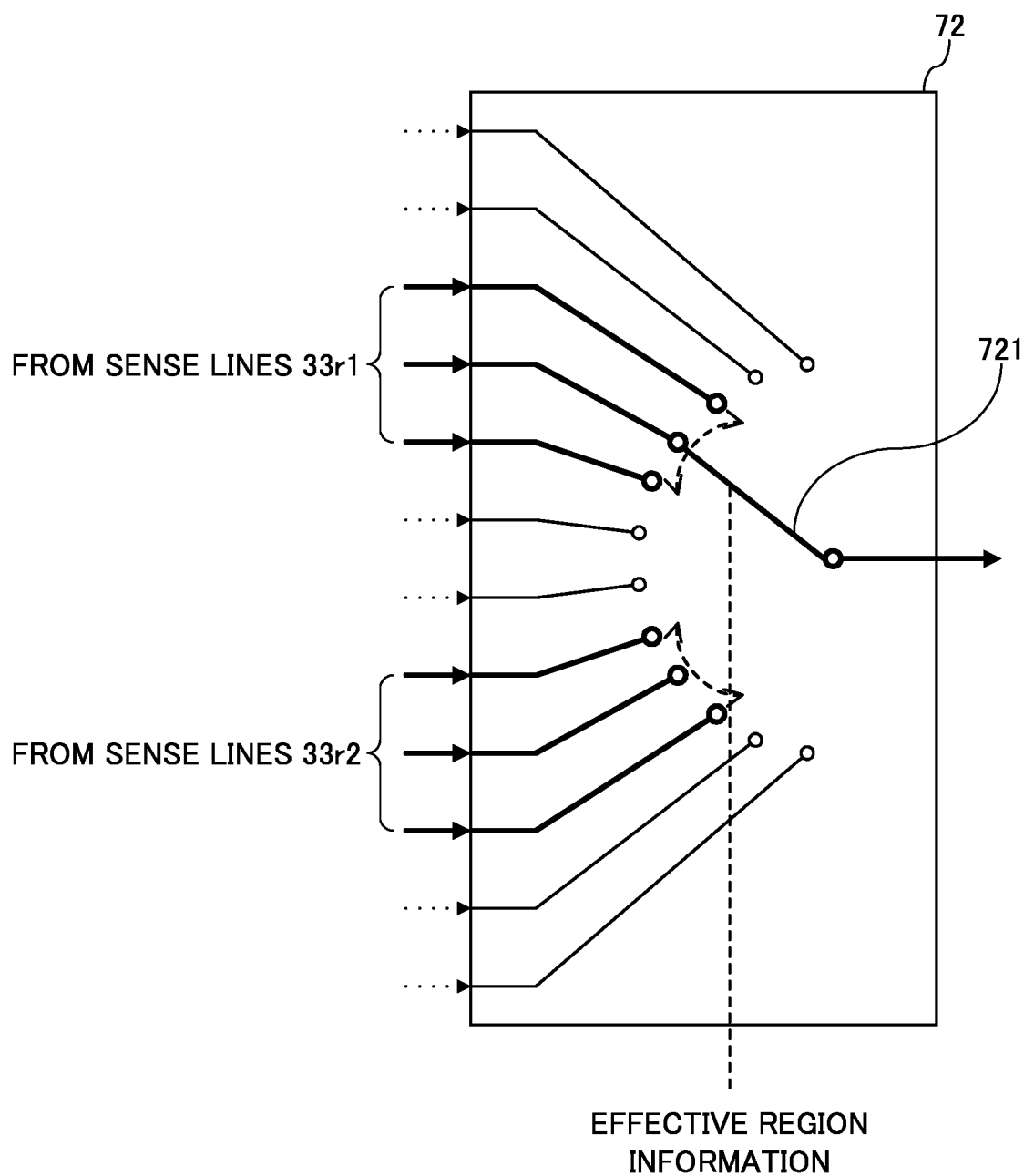
FIG. 41 is a block diagram showing an example of a specific operation of a signal acquiring section according to the second operation example.

Moreover, the signal acquiring section 72 selectively acquires the signal of the sense line 33r1 passing through the effective region A1 and the signal of the sense line 33r2 passing through the effective region A2 and outputs the signals in a time division. A specific operation example of the signal acquiring section 72 will be described with reference to the drawings. FIG. 41 is a block diagram showing an example of the specific operation of the signal acquiring section according to the second operation example. The signal acquiring section 72 shown in FIG. 41 is the same as the signal acquiring section 72 described in the first operation example (see FIG. 34).

As shown in FIG. 41, the branch switch 721 can be connected to the terminals which correspond to the sense line 33r1 passing through the effective region A1 and the sense line 33r2 passing through the effective region A2, respectively. Consequently, the respective signals of the sense line 33r1 passing through the effective region A1 and the sense line 33r2 passing through the effective region A2 which are amplified by the amplifying section 71 are outputted to a subsequent stage. On the other hand, the branch switch 721 is not connected to the terminal corresponding to the sense line which passes through neither of the effective regions A1 and A2. Consequently, the signal of the sense line which passes through neither of the effective regions A1 and A2 is not outputted to the subsequent stage.

Thus, the signal acquiring section 72 selectively acquires the signals of the sense lines 33r1 and 33r2 passing through the effective regions A1 and A2, respectively and then outputs them in a time division. Consequently, it is possible to prevent a useless signal from being outputted to the subsequent stage of the signal acquiring section 72. Therefore, it is possible to reduce power consumption taken for a processing in the subsequent stage of the signal acquiring section 72 (for example, the analog-to-digital converting section 73, the decoding section 58 and the coordinates detecting section 42).

The analog-to-digital converting section 73 converts an analog signal outputted by the signal acquiring section 72 into a digital signal, the decoding section 58 obtains a distribution of differences between capacitances in the touch panel 3 (the effective regions A1 and A2) based on the digital signal, and the coordinates detecting section 42 refers to the distribution of differences between capacitances, thereby detecting the touched position on the touch panel 3 (the effective regions A1 and A2) to generate touch information. At this time, the decoding section 58 and the coordinates detecting section 42 can detect the touched position for a region through which the drive line 35r1 and the sense line 33r2 pass and a region through which the drive line 35r2 and the sense line 33r1 pass in addition to the effective regions A1 and A2.

Also in the multi-touch, thus, the touch panel controller 4 selectively processes the signals of the sense lines 33r1 and 33r2 passing through the effective regions A1 and A2, respectively, so that it is possible to prevent a useless processing for the signals. Accordingly, it is possible to reduce the power consumption taken for the processing of the signals. By restrictively processing the signals of the sense lines 33r1 and 33r2 passing through the effective regions A1 and A2, respectively, moreover, it is possible to enhance detection accuracy of the touched position.

Figure 42:
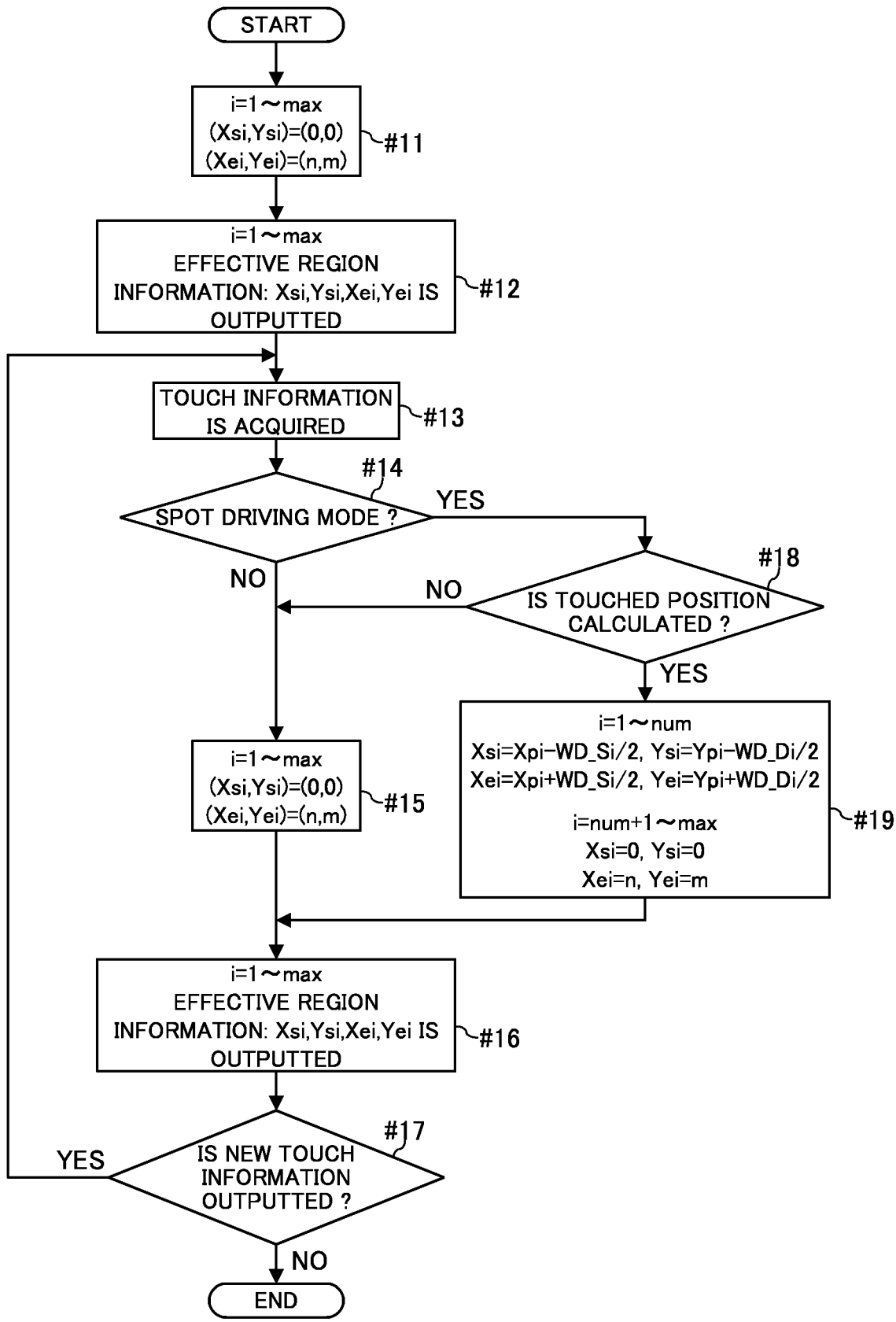
FIG. 42 is a flow chart showing an example of a specific operation of a region setting section according to the second operation example.
Figure 43:
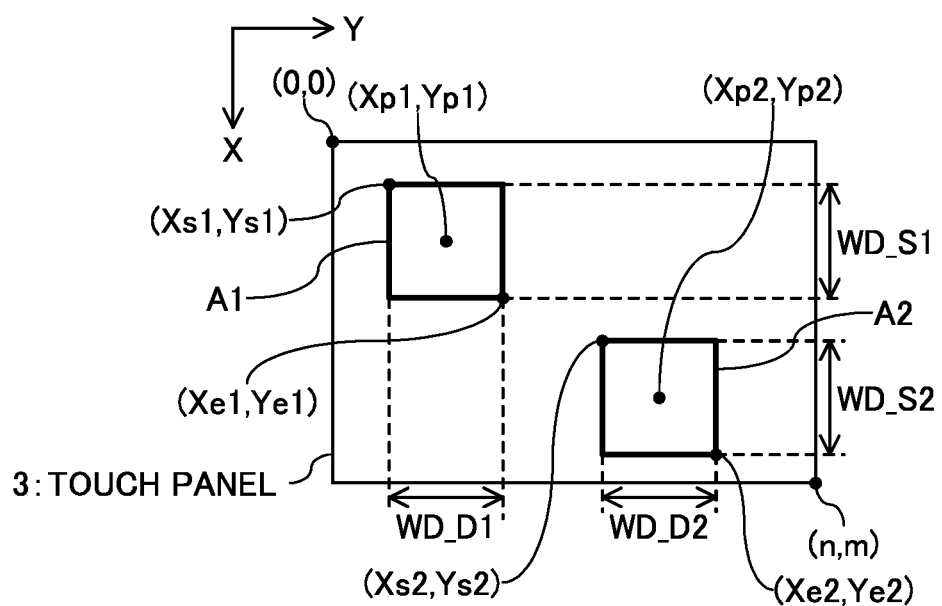
FIG. 43 is a diagram showing an example of a method of setting an effective region according to the second operation example.

Next, a specific serial operation example in which the region setting section 8 sets (updates) an effective region will be described with reference to the drawings. FIG. 42 is a flow chart showing an example of the specific operation of the region setting section according to the second operation example. Moreover, FIG. 43 is a diagram showing an example of a method of setting an effective region according to the second operation example. In the same manner as the description of the first operation example (see FIG. 36), a position in an alignment direction of the sense line 33 (a vertical direction of FIG. 43, an X direction) is represented by X and a position in an alignment direction of the drive line 35 (a transverse direction of FIG. 43, a Y direction) is represented by Y, and a position in the touch panel 3 is expressed in coordinates of (X, Y) and furthermore, the coordinates of a left upper corner of the touch panel 3 are set to be (0, 0) and coordinates of a right lower corner thereof are set to be (n, m). Moreover, coordinates of a left upper corner of the effective region Ai are set to be (Xsi, Ysi) and coordinates of a right lower corner of the effective region Ai are set to be (Xei, Yei).

The character i represents a number for identifying an effective region and effective region information and takes a value which is equal to or greater than one and is equal to or smaller than max (max is a natural number which is equal to or greater than two). In other words, max represents an upper limit of the number of the effective regions which can be set by the region setting section 8, and may be the number which is equal to that of the touched positions that can be detected by the touch panel controller 4, for example. When the upper limit (max) is set to the number of the effective regions which can be set by the region setting section 8, thus, it is possible to suppress an excessive increase in a calculation amount of the region setting section 8 or an excessive increase in a total area of the effective regions set by the region setting section 8, which is preferable.

FIG. 43 illustrates the case in which the effective region A1 centered around a touched position (Xp1, Yp1) has a length in the X direction set to be WD_S1 and a length in the Y direction set to be WD_D1, and furthermore, the effective region A2 centered around a touched position (Xp2, Yp2) has a length in the X direction set to be WD_S2 and a length in the Y direction set to be WD_D2. The details of a method of setting the effective regions A1 and A2 will be described below.

As shown in FIG. 42, the effective region calculating section 81 calculates effective region information in which (Xs1, Ys1)=(0, 0) and (Xe1, Ye1)=(n, m) in order to set the whole surface of the touch panel 3 as an effective region at a start of the operation of the touch panel system 1r. At this time, the effective region calculating section 81 may calculate effective region information about residual i=2 to max as an optional value. In the present example, however, it is assumed that the effective region information is calculated as (Xsi, Ysi)=(0, 0) and (Xei, Yei)=(n, m) in the same manner as the effective region information about i=1 (Step #11).

Next, the effective region calculating section 81 outputs the effective region information about i=1 to max calculated at the Step #11 (Step #12). Although each section of the touch panel controller 4 drives the drive line 35 or processes the signal of the sense line 33 based on the effective region A1 corresponding to the effective region information about i=1, it disregards the effective region information about i=2 to max.

Next, the effective region calculating section 81 acquires the touch information generated by the touch panel controller 4 (Step #13). At this time, the effective region calculating section 81 confirms the parameter stored in the register 821 of the storing section 82, thereby ascertaining whether there is employed a "spot driving mode" (a first mode) or a "whole surface detecting mode" (a second mode) (Step #14).

In the case of the "whole surface detecting mode" (Step #14, NO), the effective region calculating section 81 calculates effective region information in which (Xs1, Ys1)=(0, 0) and (Xe1, Ye1)=(n, m) in order to set the whole surface of the touch panel 3 as a new effective region. At this time, the effective region calculating section 81 may calculate the effective region information about residual i=2 to max as an optional value. In the present example, however, it is assumed that the effective region information is calculated as (Xsi, Ysi)=(0, 0) and (Xei, Yei)=(n, m) in the same manner as the effective region information about i=1 (Step #15).

Next, the effective region calculating section 81 outputs the effective region information about i=1 to max calculated at the Step #15 (Step #16). Although each section of the touch panel controller 4 drives the drive line 35 or processes the signal of the sense line 33 based on the effective region A1 corresponding to the effective region information about i=1, it disregards the effective region information about i=2 to max.

If new touch information is outputted (Step #17, YES), thereafter, the processing returns to the Step #13 in which the touch information is acquired. On the other hand, if the new touch information is not outputted (Step #17, NO), the operation is ended.

If the "spot driving mode" is employed (Step #14, YES) and the touched position on the touch panel 3 is not detected (Step #18, NO), the effective region calculating section 81 carries out the same operation as that in the case of the "whole surface detecting mode" (Steps #15 to #17). Consequently, the whole surface of the touch panel 3 is set as the effective region. No matter where the subsequent touched position is on the touch panel 3, therefore, the touch panel controller 4 can detect the touched position.

On the other hand, if the "spot driving mode" is employed (Step #14, YES) and the touched position on the touch panel 3 is detected (Step #18, YES), the effective region calculating section 81 calculates new effective region information about i=1 to num (num=2 in the example of FIG. 43) in which $Xsi=Xpi-WD\_Si/2$, $Ysi=Ypi-WD\_Di/2$, $Xei=Xpi+WD\_Si/2$ and $Yei=Ypi+WD\_Di/2$ as shown in FIG. 43, for example, in order to set a new effective region including the touched position. In other words, num is the number of the effective regions to be set by the effective region calculating section 8 and may be the number which is equal to that of the touched positions which are calculated by the touch panel controller 4, for example. At this time, the effective region calculating section 81 may calculate effective region information about residual i=num+1 to max as an optional value. In the present example, however, it is assumed that the effective region information is calculated as (Xsi, Ysi)=(0, 0) and (Xei, Yei)=(n, m) (Step #19).

Next, the effective region calculating section 81 outputs the effective region information about i=1 to max calculated at the Step #19 (Step #16). Although each section of the touch panel controller 4 drives the drive line 35 or processes the signal of the sense line 33 based on effective regions A1 to Anum corresponding to the effective region information about i=1 to num, respectively, it disregards the effective region information about i=num+1 to max. Consequently, the effective region calculating section 81 can set the new effective regions A1 to Anum having a high possibility that a touched position is subsequently included.

If the new touched position is outputted (Step #17, YES), thereafter, the processing returns to the Step #13 in which the touch information is acquired. On the other hand, if the new touch information is not outputted (Step #17, NO), the operation is ended.

As described above, in the touch panel system 1r according to the present example, the region setting section 8 can set the effective region also in the case in which the touch panel controller 4 detects a plurality of touched positions (in the multi-touch). In the touch panel system 1r according to the present example, the effective regions to be regions in which the touched positions are to be detected are set restrictively in the touch panel 3 based on of the respective touched positions which are detected. By avoiding useless detection, therefore, it is possible to reduce power consumption and to enhance detection sensitivity for a touch operation.

In the touch panel system 1r according to the present example, moreover, the effective regions corresponding to the respective touched positions which are detected are set respectively. Therefore, it is possible to provide a clearance (a region which is not the effective region) between the respective effective regions to be set by the region setting section 8. For this reason, it is possible to reduce a total area of the effective regions to be set by the region setting section 8.

The above described operations of the touch panel controller 4 and the operation of the region setting section 8 (the operations of the Steps #13 to #19 in FIG. 42) are repetitively carried out in a predetermined frame rate (for example, 120 Hz).

Although the effective region calculating section 81 successively confirms, in the operation, whether the "spot driving mode" or the "whole surface detecting mode" is employed (Step #14), moreover, the confirmation does not need to be successively carried out. For example, the effective region calculating section 81 may perform the confirmation after the Step #12, and then operations depending on the respective modes may be carried out until some instruction is inputted from a user or the like.

Moreover, when the "spot driving mode" is employed, the effective region calculating section 81 may set the whole surface of the touch panel 3 as a new effective region in a predetermined timing (for example, every predetermined frame number) irrespective of whether the touched position is detected by the touch panel controller 4 or not. More specifically, it is decided whether a predetermined timing comes or not before the execution of the Step #18, and the Step #15 may be carried out if the predetermined timing comes and the Step #18 may be carried out if not so in FIG. 42, for example.

Consequently, the whole surface of the touch panel 3 is set as the effective region in the predetermined timing even if a touch operation is performed in another place on the touch panel 3 after the region setting section 8 starts an operation for sequentially setting the effective region depending on the touched position to be sequentially detected by the touch panel controller 4 (spot driving). Therefore, the touch panel controller 4 can detect the touched position.

Although a size of the effective region to be set by the region setting section 8 (for example, $WD\_D_1$ and $WD\_Si$) may be equal, it may be made different every effective region (every Although the size of the effective region to be set by the region setting section 8 (for example, $WD\_D_1$ and $WD\_Si$) may have a fixed value, moreover, it may have a variable value. In the case in which the size of the effective region is set to have the variable value, as described in the first operation example (see FIG. 37), if the region setting section 8 can set a new effective region having a size corresponding to a moving speed of the touched position, there can be increased a possibility of an inclusion of a position in which the touched position is to be detected subsequently in the new effective region. Therefore, this is preferable.

Figure 44:
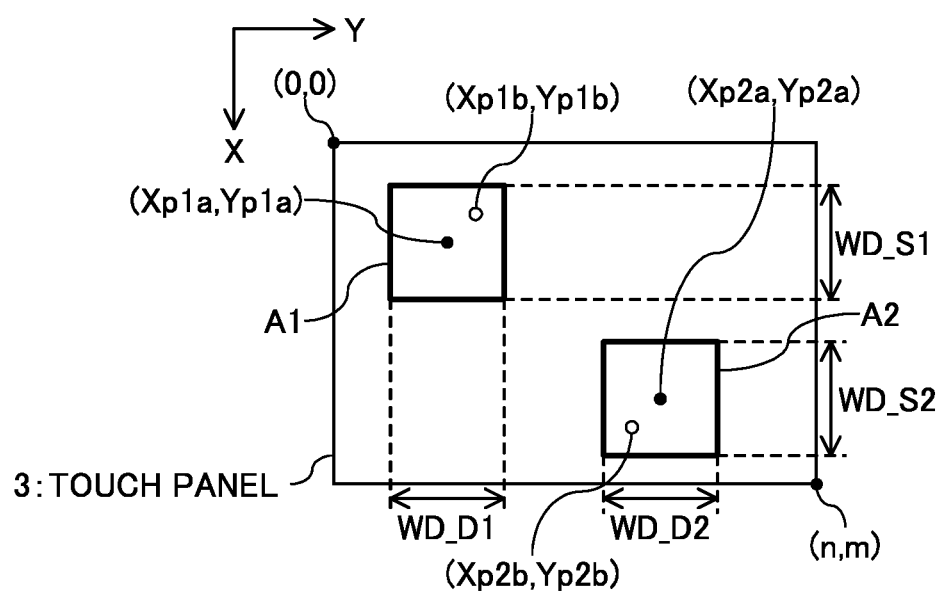
FIG. 44 is a diagram showing another example of the method of setting an effective region according to the second operation example.

An example of a specific method of setting an effective region in this case will be described with reference to FIG. 44. FIG. 44 is a diagram showing another example of the method of setting an effective region according to the second operation example. FIG. 44 illustrates the case in which a first touched position in a current frame is (Xp1a, Yp1a) and a second position in the current frame is (Xp2a, Yp2a), and the first touched position in a next frame is (Xp1b, Yp1b) and the second touched position in the next frame is (Xp2b, Yp2b). Moreover, a moving speed in the X direction of the first touched position in the current frame is represented by Vx1, a moving speed in the Y direction is represented by Vy1, a moving speed in the X direction of the second touched position in the current frame is represented by Vx2, a moving speed in the Y direction is represented by Vy2, and a frame rate is represented by f.

The region setting section 8 sets a new effective region in such a manner that the first touched position (Xp1b, Yp1b) in the next frame is included therein based on the first touched position (Xp1a, Yp1a) and the moving speed (Vx1, Vy1) in the current frame. In other words, the region setting section 8 sets a new effective region so that it has WD_S1≥2×Vx1/f and WD_D1≥2×Vy1/f. Similarly, the region setting section 8 sets a new effective region in such a manner that the second touched position (Xp2b, Yp2b) in the next frame is included therein based on the second touched position (Xp2a, Yp2a) and the moving speed (Vx2, Vy2) in the current frame. In other words, the region setting section 8 sets a new effective region so that it has WD_S2>2×Vx2/f and WD_D2≥2×Vy2/f.

In the region setting section 8, furthermore, fluctuation amounts of the respective touched positions may be obtained by storing the respective touched positions obtained sequentially in the storing section 82, and the moving speeds of the respective touched positions in the current frame may be obtained based on the fluctuation amounts.

Furthermore, the region setting section 8 does not always need to set effective regions centered around the touched positions, respectively. For example, in the case in which a certain touched position is detected in the vicinity of an edge of the touch panel 3, the region setting section 8 may set an effective region in which the certain touched position leans to the edge side. Moreover, the region setting section 8 may set an effective region based on a moving direction of the touched position. For example, the region setting section 8 may set an effective region in which a certain touched position leans in an opposite direction to the moving direction of the certain touched position.

Figure 45:
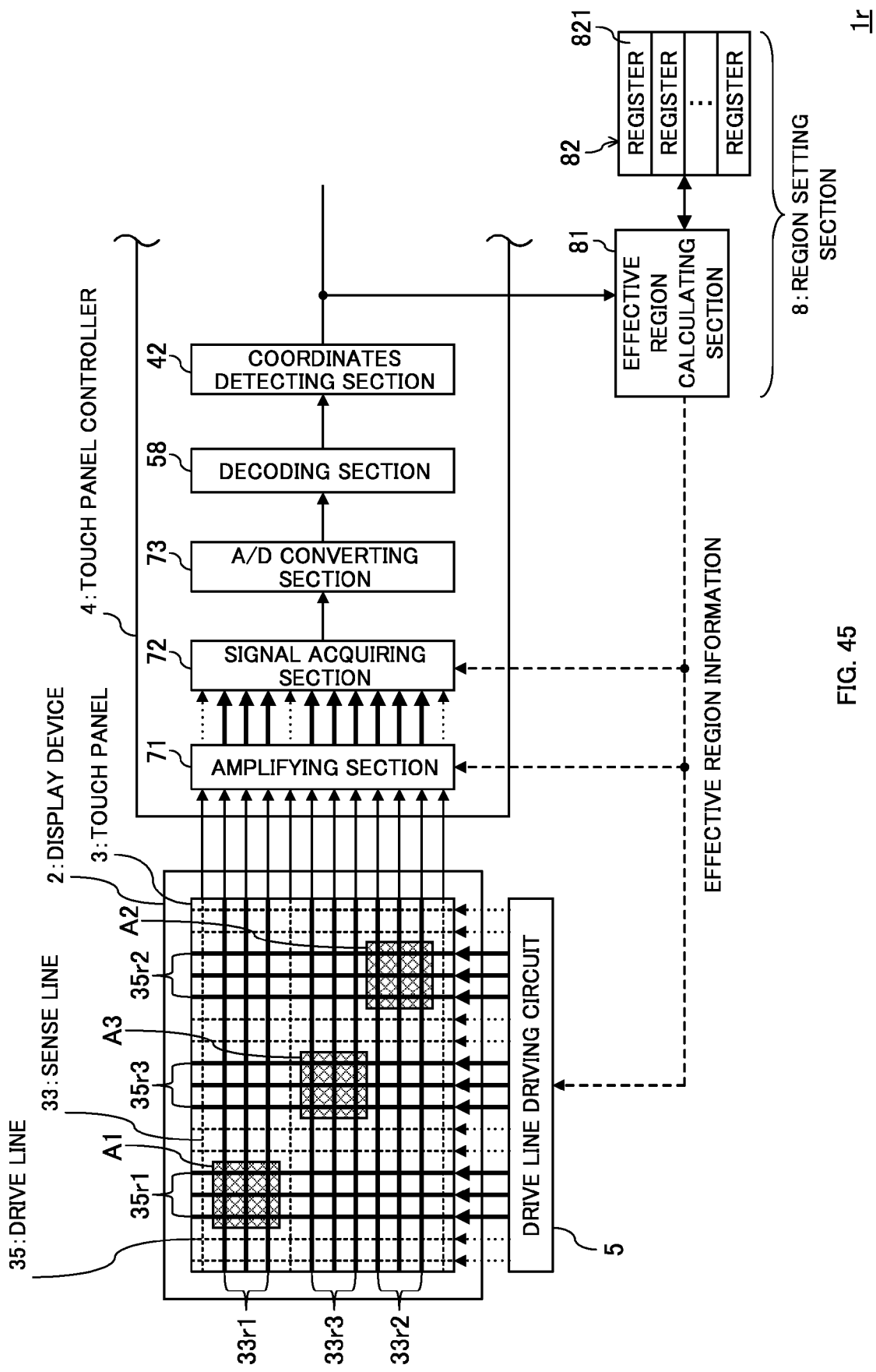
FIG. 45 is a block diagram showing another example of the effective region to be set in the touch panel 3 according to the second operation example.

In the description of the second operation example, moreover, there has been mainly illustrated the case in which two touched positions are apart from each other on the touch panel 3. Even if three touched positions or more are present on the touch panel 3, however, the touch panel system 1r shown in FIG. 30 can be operated in the same manner. This will be described with reference to the drawings. FIG. 45 is a block diagram showing another example of the effective region to be set in the touch panel in the second operation example. FIG. 45 illustrates the case in which three touched positions are apart from each other on the touch panel 3.

Even if the three touched positions are present on the touch panel 3 as shown in FIG. 45, the region setting section 8 can set effective regions A1 to A3 corresponding to the respective touched positions (see FIG. 42). At this time, the drive line driving circuit 5 only have to selectively drive a drive line 35r1 passing through the effective region A1, a drive line 35r2 passing through the effective region A2 and a drive line 35r3 passing through the effective region A3. At this time, moreover, the touch panel controller 4 only have to selectively process the signals of the sense line 33r1 passing through the effective region A1, the sense line 33r2 passing through the effective region A2 and the sense line 33r3 passing through the effective region A3. The drive lines 35r1 to 35r3 and the sense lines 33r1 to 33r3 are displayed in thick solid lines of the drawing.

Even if the number of the touched positions on the touch panel 3 fluctuates, thus, the drive line which is to be driven or the sense line whose signal is to be processed only fluctuates depending on a change in the effective region set by the region setting section 8. Accordingly, the touch panel system 1r shown in FIG. 30 can deal with a multi-touch in which three touched positions or more are present on the touch panel 3 in the same manner as in the case in which two touched positions are present (see FIGS. 38 to 44).

Figure 46:
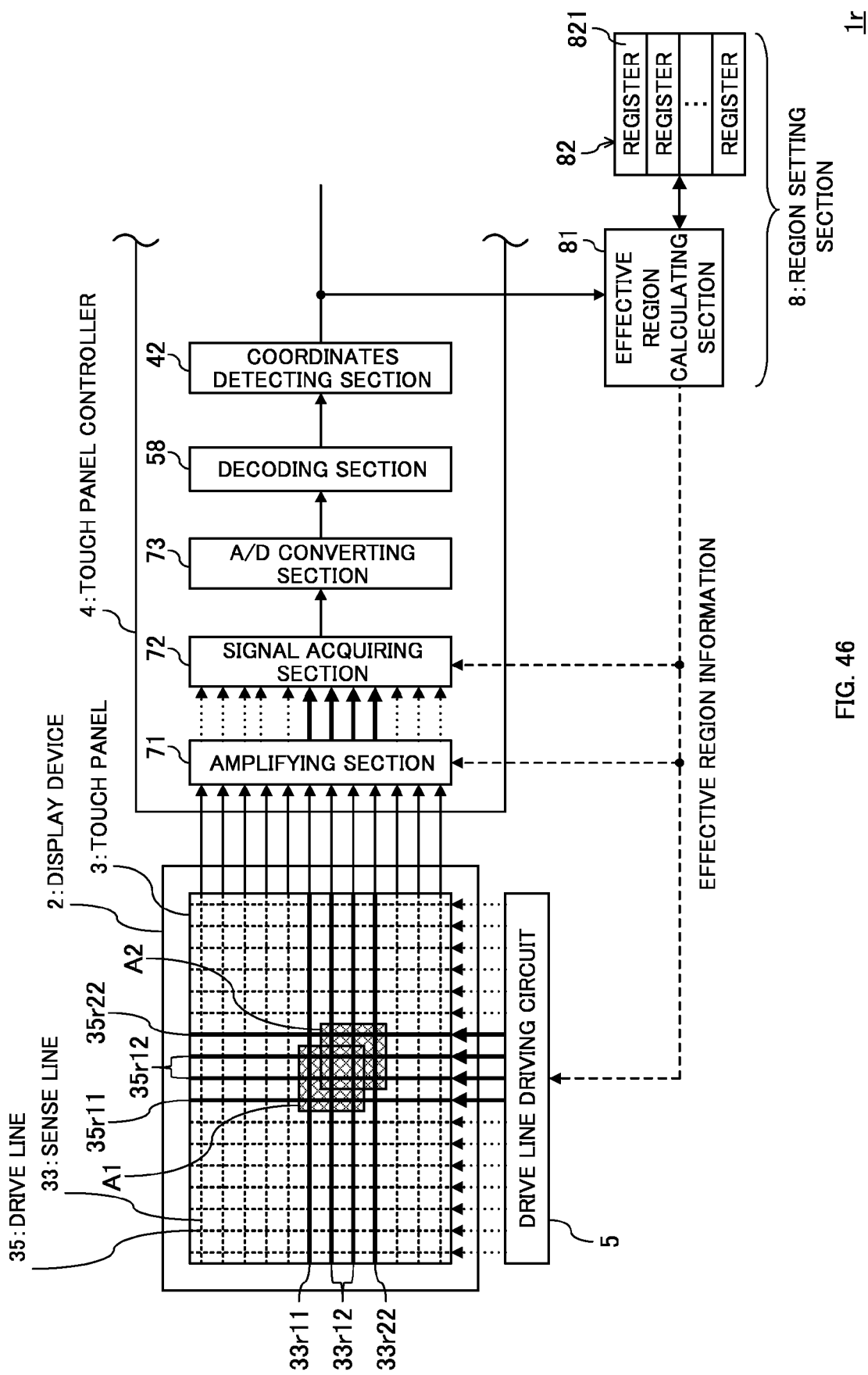
FIG. 46 is a block diagram showing another example of the effective region to be set in the touch panel 3 according to the second operation example.

Although there has been illustrated the case in which the touched positions are apart from each other on the touch panel 3 in the description of the second operation example, there might be the case in which the touched positions are close to each other on the touch panel 3. An operation example of the touch panel system 1r shown in FIG. 30 in this case will be described with reference to the drawing. FIG. 46 is a block diagram showing another example of the effective region to be set in the touch panel according to the second operation example. FIG. 46 illustrates the case in which two touched positions are close to each other on the touch panel 3.

In the case in which the touched positions are close to each other on the touch panel 3 as shown in FIG. 46, the region setting section 8 can set the effective regions A1 and A2 having parts overlapping with each other. At this time, the drive line driving circuit 5 selectively drives a drive line 35r11 passing through only the effective region A1, a drive line 35r22 passing through only the effective region A2, and a drive line 35r12 passing through both of the effective regions A1 and A2. At this time, moreover, the touch panel controller 4 selectively processes signals of a sense line 33r11 passing through only the effective region A1, a sense line 33r22 passing through only the effective region A2 and a sense line 33r12 passing through both of the effective regions A1 and A2. The drive lines 35r11, 35r22 and 35r12 and the sense lines 33r11, 33r22 and 33r12 are displayed in thick solid lines of the drawing.

Figure 47:
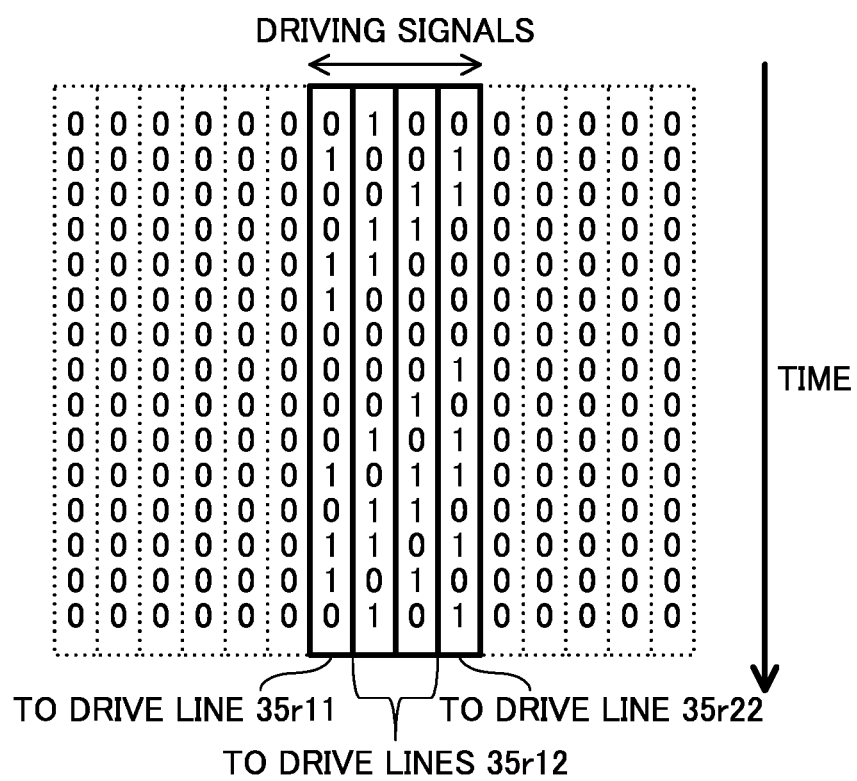
FIG. 47 is a diagram showing another example of the specific method of driving a drive line through the drive line driving circuit according to the second operation example.

A specific example of a method of driving the drive line 35 through the drive line driving circuit 5 in this case will be described with reference to the drawings. FIG. 47 is a diagram showing another example of the specific method of driving the drive line through the drive line driving circuit according to the second operation example. FIG. 47 shows an assumption of the case in which the effective regions A1 and A2 illustrated in FIG. 46 are set.

As shown in FIG. 47, the drive line driving circuit 5 applies the above described peculiar driving signal (see FIG. 32) to each of the drive line 35r11 passing through only the effective region A1, the drive line 35r22 passing through only the effective region A2 and the drive line 35r12 passing through both of the effective regions A1 and A2. Furthermore, the drive line driving circuit 5 grounds each of the drive lines which pass through neither of the effective regions A1 and A2 to prevent a signal level of the drive line from being changed on a time basis.

Figure 48:
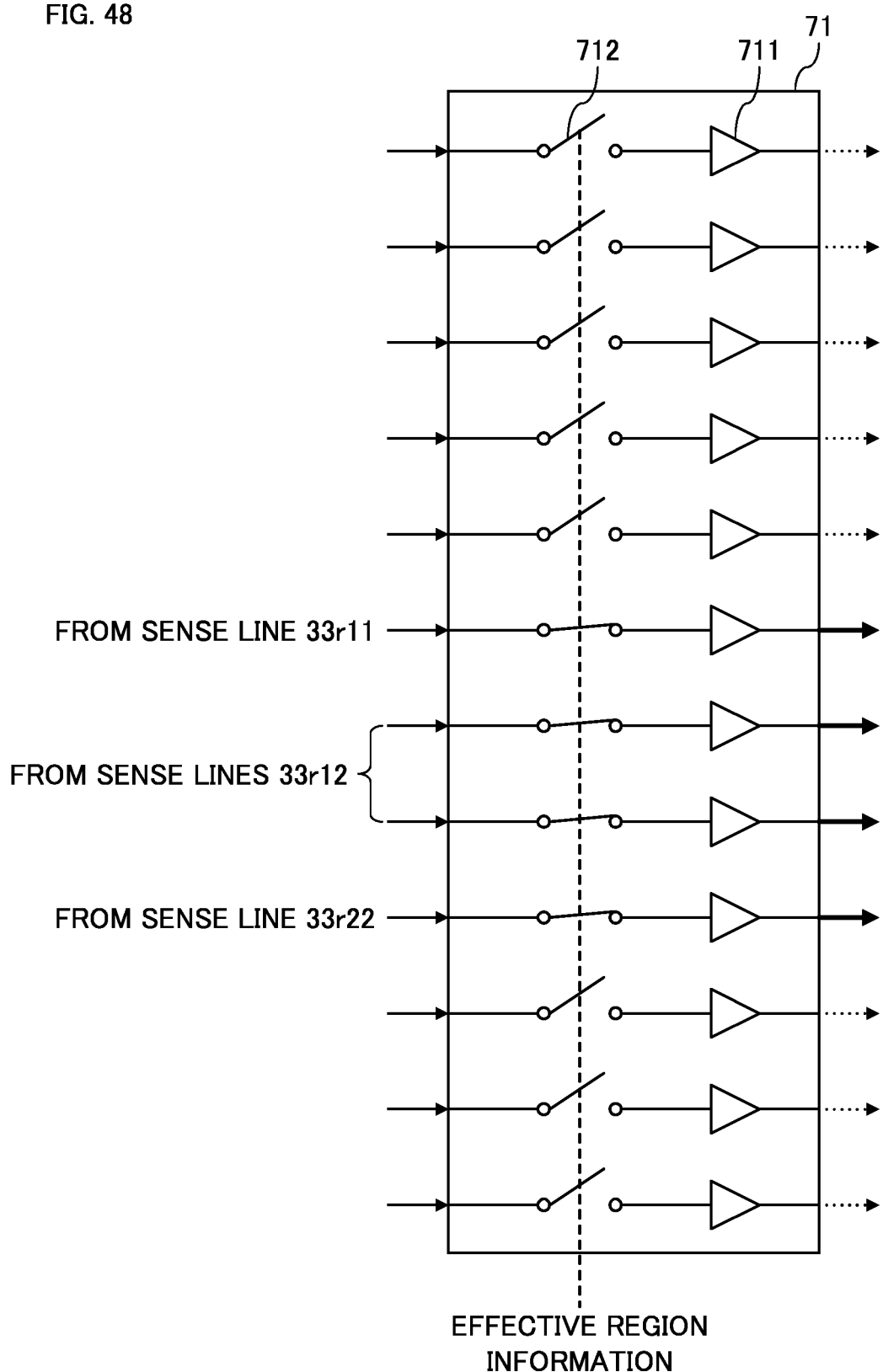
FIG. 48 is a block diagram showing another example of the specific operation of the amplifying section according to the second operation example.

Moreover, a specific operation example of the amplifying section 71 in this case will be described with reference to the drawing. FIG. 48 is a block diagram showing another example of the specific operation of the amplifying section according to the second operation example. The amplifying section 71 shown in FIG. 48 is the same as the amplifying section 71 illustrated in FIG. 40. Furthermore, FIG. 48 shows an assumption of the case in which the effective regions A1 and A2 illustrated in FIG. 46 are set.

As shown in FIG. 48, the opening/closing switch 712 to which each of the signals of the sense line 33r11 passing through only the effective region A1, the sense line 33r22 passing through only the effective region A2 and the sense line 33r12 passing through both of the effective regions A1 and A2 is to be supplied is brought into a conduction status. Consequently, the respective signals of the sense line 33r11 passing through only the effective region A1, the sense line 33r22 passing through only the effective region A2 and the sense line 33r12 passing through both of the effective regions A1 and A2 are amplified by the amplifier 711 and are thus outputted from the amplifying section 71. On the other hand, the opening/closing switch 712 to which the signal of the sense line passing through neither of the effective regions A1 and A2 is to be supplied is brought into a non-conduction status. Consequently, the signal of the sense line not passing through the effective region A is not amplified by the amplifier 711 and is not outputted from the amplifying section 71.

Figure 49:
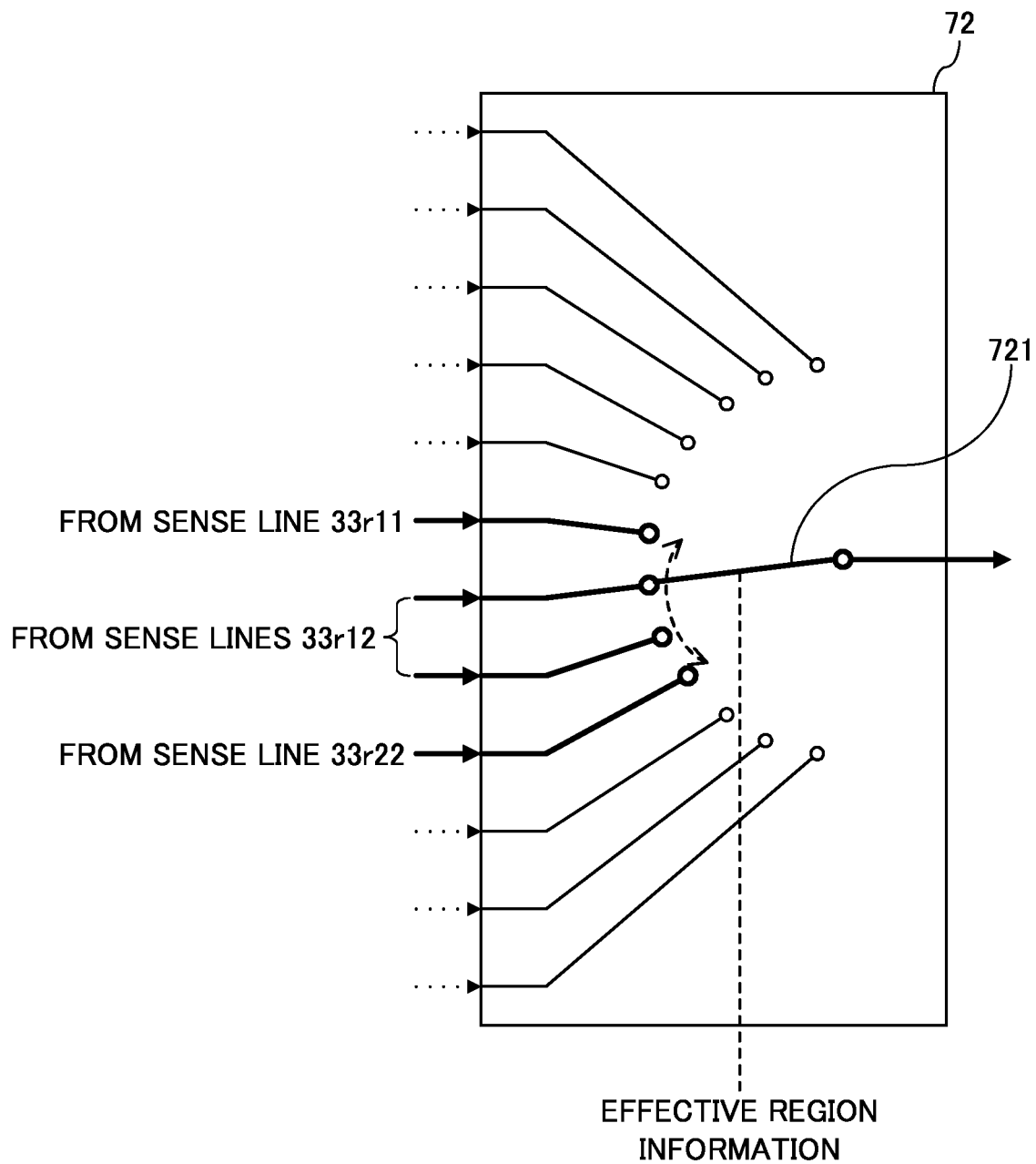
FIG. 49 is a block diagram showing another example of the specific operation of the signal acquiring section according to the second operation example.

Moreover, a specific operation example of the signal acquiring section 72 in this case will be described with reference to the drawing. FIG. 49 is a block diagram showing another example of the specific operation of the signal acquiring section according to the second operation example. The signal acquiring section 72 shown in FIG. 49 is the same as the signal acquiring section 72 illustrated in FIG. 41. Furthermore, FIG. 49 shows an assumption of the case in which the effective regions A1 and A2 illustrated in FIG. 46 are set.

As shown in FIG. 49, the branch switch 721 can be connected to the terminals which correspond to the sense line 33r11 passing through only the effective region A1, the sense line 33r22 passing through only the effective region A2 and the sense line 33r12 passing through both of the effective regions A1 and A2, respectively. Consequently, the respective signals of the sense line 33r11 passing through only the effective region A1, the sense line 33r22 passing through only the effective region A2 and the sense line 33r12 passing through both of the effective regions A1 and A2 which are amplified by the amplifying section 71 are outputted to a subsequent stage. On the other hand, the branch switch 721 is not connected to the terminal corresponding to the sense line which passes through neither of the effective regions A1 and A2. Consequently, the signal of the sense line which passes through neither of the effective regions A1 and A2 is not outputted to the subsequent stage.

Even if the touched positions detected on the touch panel 3 are close to each other, thus, the drive line which is to be driven or the sense line whose signal is to be processed only fluctuates depending on a change in the effective region set by the region setting section 8. Accordingly, the touch panel system 1r shown in FIG. 30 can deal with a multi-touch in the case in which the touched positions on the touch panel 3 are close to each other in the same manner as in the case in which the touched positions are apart from each other (see FIGS. 38 to 44).

As described above, in a situation in which the touched positions on the touch panel 3 are close to each other, the region setting section 8 substantially sets the effective region including the respective touched positions. The region setting section 8 may calculate effective region information so as to set a comprehensive effective region including the respective touched positions in the case in which the touched positions on the touch panel 3 are close to each other.

Irrespective of whether or not the touched positions on the touch panel 3 are close to each other, moreover, the region setting section 8 may set the effective region based on the touched positions which are detected by the touch panel controller 4. More specifically, for example, the region setting section 8 may set a comprehensive effective region including the respective touched positions which are detected by the touch panel controller 4.

(4) Others

[1] Although there has been illustrated the structure in which both of the amplifying section 71 and the signal acquiring section 72 selectively process the signal of the sense line 33 based on the effective region information, it is also possible to employ a structure in which one of them carries out a selective processing. Also in the case in which one of these processings is carried out, it is possible to reduce power consumption.

[2] Although there has been illustrated the case in which the operation (first operation) for selectively driving the drive line 35 though the drive line driving circuit 5 and the operation (second operation) for selectively processing the signal of the sense line 33 through the touch panel controller 4 are carried out together, one of the operations may be performed. Also in the case in which one of these operations is carried out, it is possible to reduce power consumption and to enhance detection sensitivity for a touch operation.

[3] Although there has been illustrated the projected capacitive touch panel system as an embodiment according to the present invention, the present invention can also be applied to a touch panel system of any type, such as another projected capacitive type, a surface capacitive type, or an optical type as long as it is a touch panel system which can perform selective driving or selective processing.

<<Variant and the Like>>

The present invention is not limited to the respective embodiments in the first characteristics and the second characteristics described above, but may be altered by a skilled person within the scope of the claims. An embodiment based on a proper combination of technical means disclosed in the embodiments 1 to 17 of the first characteristics and the second characteristics is encompassed in the technical scope of the present invention. Namely, the embodiments 1 to 17 of the first characteristics and the second characteristics disclosed in this application are just examples in all respects, and provide no limitations. The scope of the present invention is indicated by the claims, rather than by the descriptions of the embodiments 1 to 17 of the first characteristics and the second characteristics. Any meanings equivalent to the claims and all modifications made in the scope of the claims are included within the scope of the present invention.

The present invention is applicable to various kinds of electronic devices including touch panels, for example, to televisions, personal computers, mobile phones, digital cameras, portable game devices, electronic photo frames, personal digital assistants, electronic books, home electronic appliances, ticket vending machines, automatic teller machines, and car navigation systems. Moreover, the present invention is also applicable to large-scale electronic devices such as display surfaces of large-scale display devices, or electronic whiteboards.

Although the present invention has been described in terms of the preferred embodiment, it will be appreciated that various modifications and alternations might be made by those skilled in the art without departing from the spirit and scope of the invention. The invention should therefore be measured in terms of the claims which follow.

What is claimed is:
1. A touch panel system comprising:
a touch panel including a plurality of sense lines, and a plurality of drive lines provided so as to intersect the sense lines and form capacitances with the sense lines;

a drive line driving circuit for driving the drive lines in parallel;

a touch panel controller for processing signals of the sense lines and generating touch information; and a region setting section for setting an effective region in the touch panel based on the touch information, wherein the touch panel controller includes:

a subtracting section for finding differences in signals between respective pairs of the sense lines adjacent to each other;

a decoding section for calculating a distribution of differences between the capacitances by calculating an inner product of each of code sequences for driving the drive lines in parallel and each of difference output sequences, the difference output sequences being calculated by the subtracting section and corresponding to the code sequences; and a touch detecting section for generating the touch information based on the distribution of differences between the capacitances calculated by the decoding section, the region setting section updates the effective region set in the touch panel to set a new effective region based on the touch information, and there is carried out at least one of:

a first operation in which the drive line driving circuit selectively drives the drive line passing through the effective region set currently; and a second operation in which the touch panel controller selectively processes the signal of the sense line passing through the effective region set currently.

2. The touch panel system according to claim 1, further comprising a switch for switching a signal to be supplied to the subtracting section so that the subtracting section finds a first difference in signals between a sense line Sn and a sense line Sn+1 or a second difference in signals between the sense line Sn and a sense line Sn−1, wherein the first difference is expressed by (Sn+1)−Sn, and the second difference is expressed by Sn−(Sn−1), and the sense line Sn is selected from the plurality of sense lines, and the sense line Sn+1 and the sense line Sn−1 are two sense lines adjacent to the sense line Sn.

3. The touch panel system according to claim 2, wherein the switch includes two terminals and is arranged such that one of the two terminals is selected, the code sequences for driving the drive lines in parallel are the following code sequences (a component is 1 or −1) for driving the first drive line through the Mth drive line in parallel, $$d_1 = (d_{11}, d_{12}, \ldots, d_{1N})$$
$$d_2 = (d_{21}, d_{22}, \ldots, d_{2N})$$
$$\vdots$$
$$d_M = (d_{M1}, d_{M2}, \ldots, d_{MN}),$$

the difference output sequences "$S_{j,P}$ (j=1, . . . , [L/2], P=1,2) (L indicates the number of sense lines, [n]=an integer part of n)", which correspond to the code sequences, are defined as follows, $S_{j,1}$: an output sequence for $d_1$ through $d_M$ when the switch selects one of the two terminals $S_{j,2}$: an output sequence for $d_1$ through $d_M$ when the switch selects the other one of the two terminals, and the decoding section calculates an inner product of each of the code sequences for driving the drive lines in parallel and each of the difference output sequences which correspond to the code sequences.

4. The touch panel system according to claim 2, wherein the subtracting section includes a first analog-to-digital converting section for converting analog signals into digital signals; and the subtracting section finds the first difference and the second difference by converting analog signals supplied from the sense lines into digital signals through the first analog-to-digital converting section, and thereafter finding differences between the digital signals.

5. The touch panel system according to claim 2, wherein the subtracting section includes a second analog-to-digital converting section for converting analog signals into digital signals; and the subtracting section finds the first difference and the second difference by finding differences between analog signals supplied from the sense lines, and thereafter converting the differences between the analog signals into digital signals through the second analog-to-digital converting section.

6. The touch panel system according to claim 5, wherein the subtracting section includes a total differential amplifier for finding the first difference and the second difference by finding the differences between the analog signals supplied from the respective pairs of the sense lines adjacent to each other.

7. The touch panel system according to claim 1, further comprising:

a non-touch operation information storage section for storing a first distribution of differences between the capacitances, the first distribution being calculated by the decoding section when no touch operation is performed; and a calibration section for subtracting the first distribution stored in the non-touch operation information storage section from a second distribution of differences between the capacitances, the second distribution being calculated by the decoding section when a touch operation is performed.

8. The touch panel system according to claim 1, wherein the touch detecting section determines the presence or absence of a touch operation based on a comparison of (i) the differences in signals between the respective pairs of the sense lines adjacent to each other which differences are found by the subtracting section and (ii) positive and negative threshold values.

9. The touch panel system according to claim 8, wherein the touch detecting section creates an increase and decrease table which indicates, in ternary, a distribution of differences between the capacitances, based on the comparison of: the differences in signals between the respective pairs of the sense lines adjacent to each other which differences are found by the subtracting section; and the positive and negative threshold values, and the touch detecting section converts the increase and decrease table into a binary image, so as to generate the touch information.

10. The touch panel system according to claim 2, further comprising an adding section for adding up the differences found by the subtracting section, wherein the touch panel includes at least one sub sense line, the subtracting section further finds a third difference in signals between the sub sense line and the sense line adjacent to the sub sense line, and the adding section adds up the first difference, the second difference, and the third difference.

11. The touch panel system according to claim 10, wherein the subtracting section includes a third analog-to-digital converting section for converting analog signals into digital signals, and the subtracting section converts, into digital signals, analog signals supplied from the sense lines or the sub sense line through the third analog-to-digital converting section, and thereafter finds differences between the digital signals, so as to find the first difference, the second difference, and the third difference.

12. The touch panel system according to claim 10, wherein the subtracting section includes a fourth analog-to-digital converting section for converting analog signals into digital signals, the subtracting section finds differences between analog signals supplied from the sense lines or the sub sense line, and thereafter converts the differences between the analog signals into digital signals through the fourth analog-to-digital converting section, so as to find the first difference, the second difference, and the third difference.

13. The touch panel system according to claim 12, wherein the subtracting section further includes a total differential amplifier for finding the first difference, the second difference, and the third difference by finding differences between analog signals supplied from the sense lines or the sub sense line.

14. The touch panel system according to claim 13, wherein the total differential amplifier has an input common-mode voltage range which is rail to rail.

15. The touch panel system according to claim 10, wherein the adding section adds the first difference, the second difference, and the third difference in such a manner that individual adding operations are carried out in the order of increasing distance between a sense line involved in a certain adding operation and the sub-sense line, and the adding section uses a result of one adding operation in a next adding operation.

16. The touch panel system according to claim 10, wherein the sub sense line is configured not to detect a touch operation performed with respect to the touch panel.

17. The touch panel system according to claim 10, wherein the sub sense line is provided in a region of the touch panel in which region no touch operation is performed.

18. The touch panel system according to claim 1, wherein the drive line driving circuit applies peculiar code sequences, each of which is set for each of the drive lines, to each of the drive lines passing through the effective region, and does not apply the code sequences to each of the drive lines not passing through the effective region.

19. The touch panel system according to claim 1, wherein the touch panel controller further includes an amplifying section for selectively amplifying the signal of the sense line passing through the effective region.

20. The touch panel system according to claim 1, wherein the touch panel controller further includes a signal acquiring section for selectively acquiring the signal of the sense line passing through the effective region and outputting the signal in a time division.

21. The touch panel system according to claim 1, wherein the region setting section sets a new effective region including a touched position which is a part of the touch information.

22. The touch panel system according to claim 1, wherein the region setting section sets a new effective region having a size corresponding to a moving speed of a touched position which is a part of the touch information.

23. The touch panel system according to claim 1, wherein the region setting section sets a new effective region which is the whole surface of the touch panel when the touch panel controller does not detect any touch operation.

24. The touch panel system according to claim 1, wherein the region setting section sets a new effective region based on a touched position which is a part of the touch information when a first mode is selected, and the region setting section continuously sets a new effective region which is the whole surface of the touch panel when a second mode is selected.

25. The touch panel system according to claim 1, wherein, when the touch information includes a plurality of touched positions, the region setting section sets a new effective region based on the plurality of touched positions.

26. The touch panel system according to claim 25, wherein, when setting the new effective region based on the plurality of touched positions, the region setting section sets a plurality of new effective regions corresponding to the touched positions, respectively.

27. The touch panel system according to claim 26, wherein an upper limit is set to the number of the new effective regions set by the region setting section.

28. The touch panel system according to claim 25, wherein the region setting section sets the new effective region which is the whole surface of the touch panel at every predetermined timing.

29. The touch panel system according to claim 1, wherein the code sequences are orthogonal sequences or M sequences.

30. The touch panel system according to claim 1, further comprising a display device, wherein the touch panel is provided on a front surface of the display device.

31. The touch panel system according to claim 30, wherein the display device is a liquid crystal display, a plasma display, an organic electroluminescence display, or a field emission display.

32. An electronic device comprising the touch panel system according to claim 1.

* * * * *